(12) United States Patent
Ciliberti, III

(10) Patent No.: US 11,157,519 B2
(45) Date of Patent: Oct. 26, 2021

(54) SYSTEM AND METHOD FOR ENTERPRISE ASSET MANAGEMENT AND FAILURE REPORTING

(71) Applicant: Vito Anthony Ciliberti, III, South Bend, IN (US)

(72) Inventor: Vito Anthony Ciliberti, III, South Bend, IN (US)

( * ) Notice: Subject to any disclaimer, the term of this patent is extended or adjusted under 35 U.S.C. 154(b) by 524 days.

(21) Appl. No.: 15/810,168

(22) Filed: Nov. 13, 2017

(65) Prior Publication Data
US 2018/0068007 A1    Mar. 8, 2018

Related U.S. Application Data

(63) Continuation of application No. 13/753,495, filed on Jan. 29, 2013, now abandoned.

(51) Int. Cl.
*G06F 16/28*   (2019.01)
*G06Q 10/06*   (2012.01)

(52) U.S. Cl.
CPC ....... *G06F 16/284* (2019.01); *G06Q 10/0631* (2013.01); *Y02P 90/80* (2015.11)

(58) Field of Classification Search
CPC ... G06F 16/284; G06Q 10/0631; Y02P 90/86; Y02P 90/80
See application file for complete search history.

(56) References Cited

U.S. PATENT DOCUMENTS

| | | | | |
|---|---|---|---|---|
| 2003/0198180 A1* | 10/2003 | Cambron | ............... | H04J 3/14 370/216 |
| 2005/0007249 A1* | 1/2005 | Eryurek | ............... | G05B 23/027 340/511 |
| 2006/0241907 A1* | 10/2006 | Armstrong | ......... | G05B 23/0218 702/182 |
| 2007/0035398 A1* | 2/2007 | Vesel | ................ | G05B 23/0216 340/572.1 |
| 2009/0077055 A1* | 3/2009 | Dillon | .................. | G06F 16/337 |
| 2012/0123951 A1* | 5/2012 | Hyatt | .................... | G06Q 10/10 705/305 |

* cited by examiner

*Primary Examiner* — Alford W Kindred
*Assistant Examiner* — Lin Lin M Htay
(74) *Attorney, Agent, or Firm* — Crump Law P.C.

(57) ABSTRACT

An information (ERP/EAM) system and equipment taxonomy for representing and managing of equipment, equipment subunits and component parts thereof across an enterprise that maps materialized physical objects to functional physical objects within a hierarchy of functional locations within the enterprise for all enterprise assets in accordance with applicable industry standards. The ERP/EAM system and the equipment taxonomy also provide multi-leveled failure reporting.

9 Claims, 60 Drawing Sheets

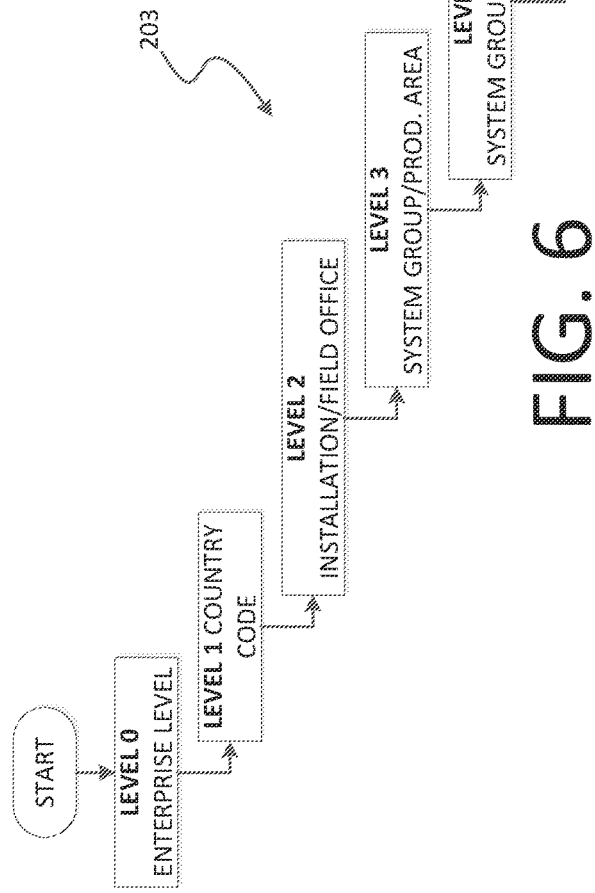

| CHARACTERISTICS: CLASS ID PE_RO_PU — 510 | |
|---|---|
| FUNCTIONAL PHYSICAL OBJECT | MATERIALIZED PHYSICAL OBJECT |
| COINCIDENT | COINCIDENT |
| BODY TYPE | BODY TYPE |
| DESIGN DISCHARGE PRESSURE | DESIGN DISCHARGE PRESSURE |
| DESIGN SUCTION PRESSURE | DESIGN SUCTION PRESSURE |
| ENVIR: SUBMERGED OR DRY-MOUNT | ENVIR: SUBMERGED OR DRY-MOUNT |
| NUMBER OF STAGES | NUMBER OF STAGES |
| SEPARATE PUMP COOLING SYSTEM? | SEPARATE PUMP COOLING SYSTEM? |
| PUMP DESIGN TYPE | PUMP DESIGN TYPE |
| BEARING SUPPORT TYPE | BEARING SUPPORT TYPE |
| COUPLING TYPE | COUPLING TYPE |
| SHAFT ORIENTATION | SHAFT ORIENTATION |
| RPM OR STROKES PER MINUTE | RPM OR STROKES PER MINUTE |
| POWER TRANSMISSION TYPE | POWER TRANSMISSION TYPE |
| GENERAL | GENERAL |
| DRIVER ID | PROCESS AND INSTR. DIAGRAM NO. |
| PROCESS AND INSTR. DIAGRAM NO. | RELEVANT STANDARDS AND REGS |
| RELEVANT STANDARDS AND REGS | |
| USE/LOCATION DATA | ATTRIBUTE DATA |
| INDUSTRY | MANUFACTURER OF ASSET |
| BUSINESS CATEGORY | MANUFACTURER MODEL NUMBER |
| INSTALLATION CATEGORY | RADIAL BEARING TYPE |
| PLANT/UNIT CATEGORY | THRUST BEARING TYPE |
| OPERATION CATEGORY | |
| NORMAL OPERATING MODE | |
| AMBIENT CONDITIONS | |
| NUMBER OF REDUNDANT UNITS | |
| RISK RATING | |
| UTILIZATION OF RATED CAPACITY | |
| EQUIPMENT APPLICATION/SERVICE | |
| FLUID CORROSIVE/EROSIVE | |
| FLUID HANDLED | |

| CODE GROUP | 420 CG SHORT TEXT |  |
|---|---|---|
| FM000100 | MECHANICAL FAILURE | |

| CODE | SHORT TEXT | Long Text |
|---|---|---|
| 1.0 | GENERAL | 1.0 GENERAL: A FAILURE RELATED TO SOME MECHANICAL DEFECT, BUT WHERE NO FURTHER DETAILS ARE KNOWN. |
| 1.1 | LEAKAGE | 1.1 LEAKAGE: EXTERNAL AND INTERNAL LEAKAGE, EITHER LIQUIDS OR GASES. IF THE FAILURE MODE AT EQUIPMENT UNIT LEVEL IS LEAKAGE, A MORE CAUSAL-ORIENTED FAILURE MECHANISM SHOULD BE USED WHEREVER POSSIBLE. |
| 1.2 | VIBRATION | 1.2 VIBRATION: ABNORMAL VIBRATION. IF THE FAILURE MODE AT EQUIPMENT LEVEL IS VIBRATION, A MORE CAUSAL-ORIENTED FAILURE MECHANISM THE FAILURE CAUSE (ROOT CAUSE) SHOULD BE RECORDED USED WHEREVER POSSIBLE. |
| 1.3 | CLEARANCE/ALIGNMENT FAILURE | 1.3 CLEARANCE/ALIGNMENT FAILURE: FAILURE CAUSED BY FAULTY CLEARANCE OR ALIGNMENT. |
| 1.4 | DEFORMATION | 1.4 DEFORMATION: DISTORTION, BENDING, BUCKLING, DENTING, YIELDING, SHRINKING, BLISTERING, CREEPING, ETC. |
| 1.5 | LOOSENESS | 1.5 LOOSENESS: DISCONNECTION, LOOSE ITEMS. |
| 1.6 | STICKING | 1.6 STICKING: STICKING, SEIZURE, JAMMING DUE TO REASONS OTHER THAN DEFORMATION OR CLEARANCE/ALIGNMENT FAILURES. |

(430 points to code 1.0)

| FM000200 | MATERIAL FAILURE |
| FM000300 | INSTRUMENT FAILURE |
| FM000400 | ELECTRICAL FAILURE |
| FM000500 | EXTERNAL INFLUENCE |
| FM000600 | MISCELLANEOUS |

VIEW/EDIT CORRECTIVE ACTIVITIES AND DETECTION METHODS

CODE GROUP: 420 — CODE GROUP DESCRIPTION: CORRECTIVE MAINTENANCE
- MACM0001
- MADM0001 — DETECTION METHOD

| CODE | CODE SHORT TEXT | CODE LONG TEXT |
|---|---|---|
| 0001 | PERIODIC MAINTENANCE | 0001 PERIODIC MAINTENANCE: FAILURE DISCOVERED DURING PREVENTIVE SERVICE, REPLACEMENT OR OVERHAUL OF AN ITEM WHEN EXECUTING THE PREVENTIVE MAINTENANCE PROGRAMME. |
| 0002 | FUNCTIONAL TESTING | 0002 FUNCTIONAL TESTING: FAILURE DISCOVERED BY ACTIVATING AN INTENDED FUNCTION AND COMPARING THE RESPONSE AGAINST A PREDEFINED STANDARD. THIS IS ONE TYPICAL METHOD FOR |
| 0003 | INSPECTION | 0003 INSPECTION: FAILURE DISCOVERED DURING PLANNED INSPECTION, E.G. VISUAL INSPECTION, NON-DESTRUCTIVE TESTING. |
| 0004 | PERIODIC CONDITION | 0004 PERIODIC CONDITION MONITORING: FAILURES REVEALED DURING A PLANNED, SCHEDULED CONDITION MONITORING OF A PREDEFINED FAILURE MODE, EITHER MANUALLY OR AUTOMATICALLY. |
| 0005 | CONTINUOUS CONDITION | 0005 CONTINUOUS CONDITION MONITORING: FAILURES REVEALED DURING A CONTINUOUS CONDITION MONITORING OF A PREDEFINED FAILURE MODE. |
| 0006 | PRODUCTION INTERFERENCE | 0006 PRODUCTION INTERFERENCE: FAILURE DISCOVERED BY PRODUCTION UPSET, REDUCTION, ETC. |
| 0007 | CASUAL OBSERVATION | 0007 CASUAL OBSERVATION: CASUAL OBSERVATION DURING ROUTINE OR CASUAL OPERATOR CHECKS, MAINLY BY SENSES (NOISE, SMELL, SMOKE, LEAKAGE, APPEARANCE ETC.). |
| 0008 | CORRECTIVE MAINTENANCE | 0008 CORRECTIVE MAINTENANCE: FAILURE OBSERVED DURING CORRECTIVE MAINTENANCE. |
| 0009 | ON DEMAND | 0009 ON DEMAND: FAILURE DISCOVERED DURING AN ON-DEMAND ATTEMPT TO ACTIVATE AN EQUIPMENT UNIT (E.G. SAFETY VALVE FAIL TO CLOSE ON ESD-SIGNAL, FAIL TO START A GAS TURBINE ON |
| 0010 | OTHER | 0010 OTHER: OTHER OBSERVATION METHOD AND/OR COMBINATION OF SEVERAL METHODS. |

430

| EQUIPMENT UNIT | VESSELS | | | |
|---|---|---|---|---|
| SUBUNIT | EXTERNAL ITEMS | INTERNAL ITEMS | CONTROL AND MONITORING | MISCELLANEOUS |
| MAINTAINABLE ITEMS | • SUPPORT<br>• BODY/SHELL<br>• VALVES<br>• PIPING | • BODY/SHELL<br>• PLATES, TRAYS, VANES, PADS<br>• NOZZLE<br>• SAND-TRAP SYSTEM<br>• HEATER<br>• CORROSION PROTECTION<br>• DISTRIBUTOR<br>• COIL | • ACTUATING DEVICE<br>• CONTROL UNIT<br>• INTERNAL POWER SUPPLY<br>• MONITORING<br>• SENSORS<br>• VALVES<br>• WIRING<br>• PIPING<br>• SEALS | • OTHERS |

FIG. 23

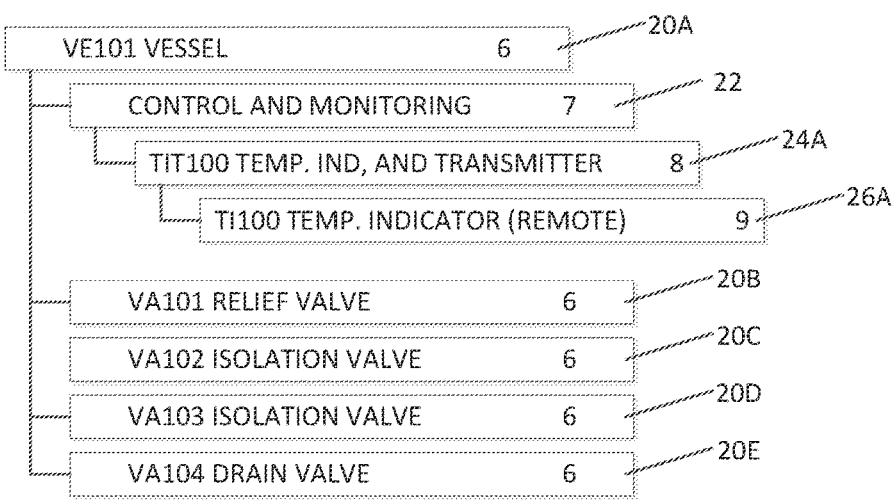

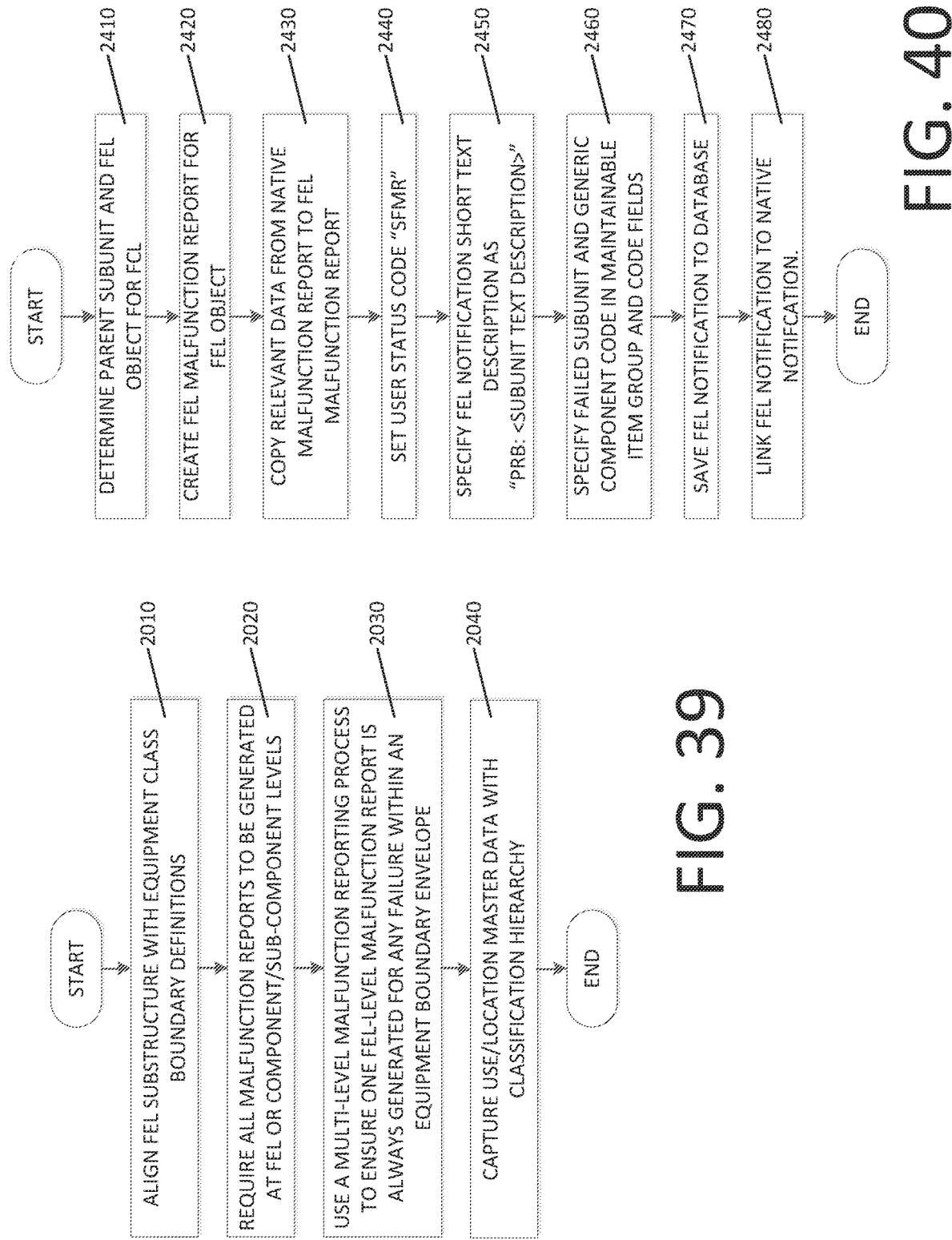

SYSTEM AND METHOD FOR ENTERPRISE ASSET MANAGEMENT AND FAILURE REPORTING

This is a continuation of prior pending U.S. patent application Ser. No. 13/753,495 filed on Jan. 29, 2013.

This invention relates to an information system used as part of an enterprise resource planning (ERP) software system, and in particular, an information system for managing enterprise equipment assets within the operations and maintenance life-cycle phase of capital facilities.

BACKGROUND OF THE INVENTION

Enterprise resource planning (ERP) systems are integrated hardware and software solutions for managing information relating to all business and operational activities across an enterprise, which includes all installations, locations, facilities, plants, business units, etc. ERP systems facilitate, integrate and manage the flow of information across all business functions, including finance/accounting, manufacturing, sales and service, customer relationship management, and risk and asset management inside the boundaries of an enterprise. ERP systems collect, store, organize and manage millions of data records from all sources in an enterprise and include powerful analytical tools for tracking, assembling and analyzing information for operational decisions. ERP systems are powerful tools and adaptable to meet the unique needs of each enterprise. The fully integrated nature and adaptability of ERP systems necessitates extremely complex data architectures and methodologies. Moreover, the implementation and usage of conventional ERP systems is equally complex. While a powerful tool for large enterprises, the complexity of ERP systems can hinder implementation and use of the implemented ERP solutions can often be a detriment to the day to day operations and activities within those enterprises.

ERP systems commonly provide Enterprise Asset Management (EAM) as part of their functionality suite. EAM refers to the management of capital facilities over four lifecycle phases: 1) conceptualization and design, 2) construction and commissioning, 3) operations and maintenance, and 4) decommissioning and disposal. EAM capabilities within ERP systems are used to improve asset utilization and performance, minimize safety and environmental issues, reduce capital costs, reduce asset-related operating costs, and extend asset life and subsequently improve ROA (return on assets) for all assets within an enterprise.

Within the third life-cycle phase, corporate ERP systems are used to integrate equipment failure and maintenance data with many other corporate data repositories, including risk assessment data, materials management, engineering and construction, accounting, HR, and financials. With proper architecture and methods, companies can query millions of records simultaneously for high-quality information with which to make operational decisions. Unfortunately issues associated with data architecture, methodology, and usage greatly diminish the effectiveness of the new ERP tools, in many cases rendering those systems into electronic equivalents of manual filing systems. Consequently, data merging and assessment remain a data mining exercise for most enterprises. Most enterprises that implement ERP/EAM systems do so with the intent of getting an enterprise-wide view of equipment reliability and performance (failure metrics); however, due to issues mentioned above, most are unable to report failure metrics for even individual pieces of equipment. The quality of enterprise decision-making suffers as a result, which in turn leads to less than optimal operational performance, and safety and environmental incidents.

SUMMARY OF THE INVENTION

The present invention seeks to provide an information solution for managing enterprise equipment assets within the operations and maintenance life-cycle phase of capital facilities. The ERP/EAM system of this invention employs an equipment taxonomy that maps materialized physical objects to functional physical objects within a hierarchy of functional locations within the enterprise for all enterprise assets in accordance with applicable industry standards. The equipment taxonomy of this invention enables corporate-wide failure reporting for equipment and improved preventive maintenance and risk assessment processes.

The ERP/EAM system provides a comprehensive equipment taxonomy that logically represents equipment assets across an enterprise and serves as an enterprise-wide data infrastructure for standard equipment failure data collection, merging, and assessment processes. The ERP/EAM system greatly improves quality and accessibility of equipment reliability data with standard data collection processes and by structuring data in relational format. Integrated and comprehensive data structures enable fast and comprehensive analyses. Whereas non-relational failure data (typical of traditional solutions) must be analyzed one record at a time, the ERP/EAM system of this invention can simultaneously query millions of failure event records. The ERP/EAM system aids companies in maximizing production throughput and minimizing hazards through integrated equipment reliability data. With ERP/EAM, companies can quickly identify and address bad actor and pattern equipment failures that affect production or cause hazards. Whereas traditional solutions account for only actual equipment repair costs, ERP/EAM gives companies the tools to account for all consequences related to each equipment failure: production loss, health, safety, and environmental incidents, and repair costs. The ERP/EAM system also allows companies to account for potential "near-miss" consequences.

The above described features and advantages, as well as others, will become more readily apparent to those of ordinary skill in the art by reference to the following detailed description and accompanying drawings.

BRIEF DESCRIPTION OF THE DRAWINGS

The present invention may take form in various system and method components and arrangements of system and method components. The drawings are only for purposes of illustrating exemplary embodiments and are not to be construed as limiting the invention. The drawings illustrate the present invention, in which:

FIG. 6 is a graphic representing the Functional Area Location Hierarchy;

FIG. 7 is a table illustrating the Functional Location Hierarchy with corresponding FEL Category values, sample Functional Location IDs and associated schema, and asset object descriptions;

Figure 8:
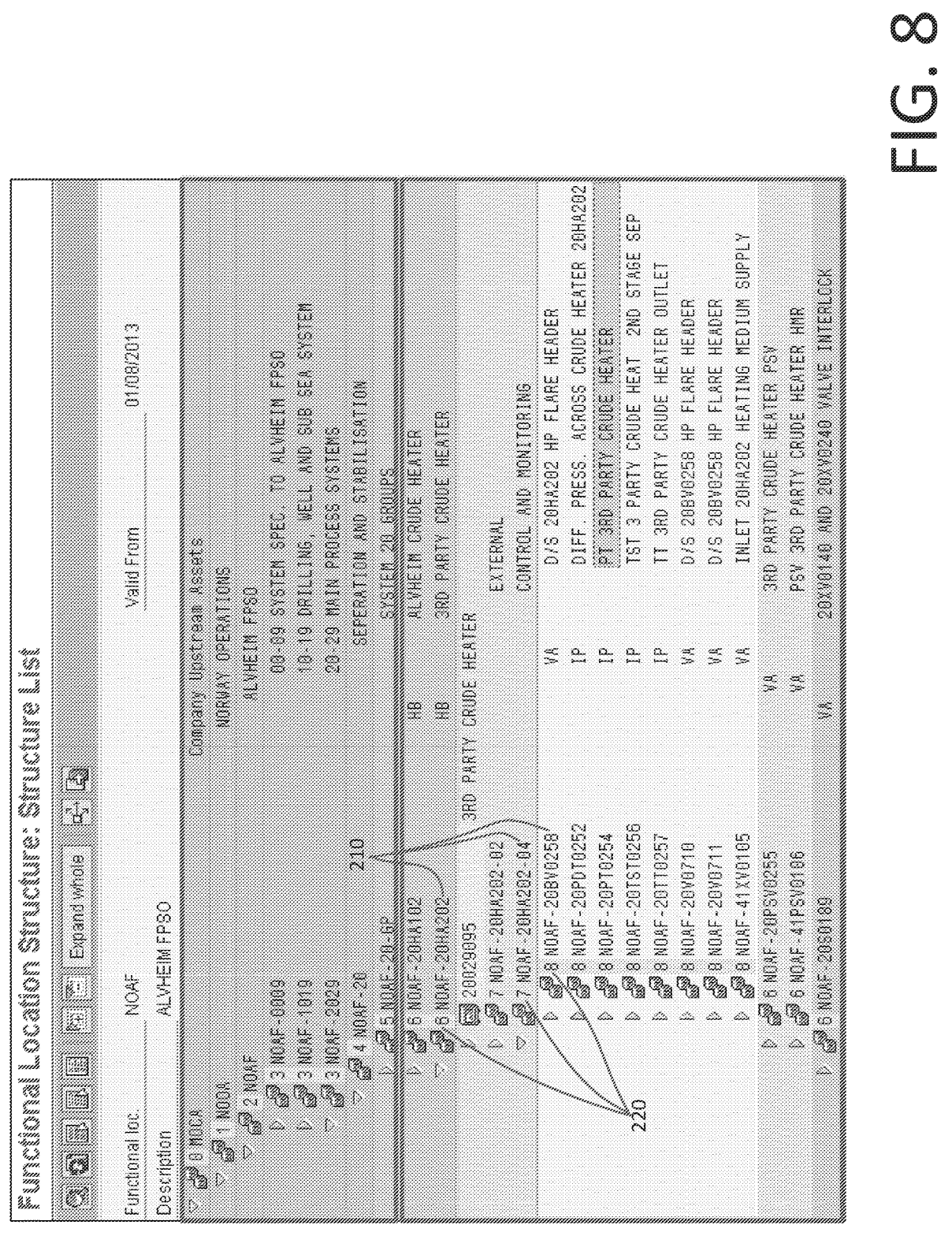

FIG. 8 is an exemplary screen display in a structural display format showing data from the Functional Location Data Set;

FIG. 12 is a table of exemplary equipment characteristics of an equipment object, namely a rotary pump;

FIGS. 16-19 are portions of exemplary screen displays that illustrate examples of "general" Catalog Code Groups and Code Sets;

FIG. 23 is a table of functional items and attributes of the vessel of FIG. 21;

FIG. 24 is a graphic representation of the structure of the vessel of FIG. 21 under the Functional Location Hierarchy used by the Equipment Taxonomy;

FIGS. 26-38 are exemplary GUI screen displays of the ERP/EAM system of FIG. 1 showing various key data fields;

FIG. 39 is a flowchart of system requirements for malfunction reporting imposed by the ERP/EAM system of FIG. 1;

FIG. 40 is a flowchart of an exemplary set of programmatic steps performed by the ERP/EAM system of FIG. 1 during malfunction reporting;

FIGS. 42-57 are exemplary GUI displays illustrating the generation of a Malfunction Report within the ERP/EAM system for FIG. 1;

FIGS. 69-74 are exemplary GUI displays from the ERP/EAM system of FIG. 1 showing exemplary error messages.

DESCRIPTION OF THE PREFERRED EMBODIMENT

Figure 1:
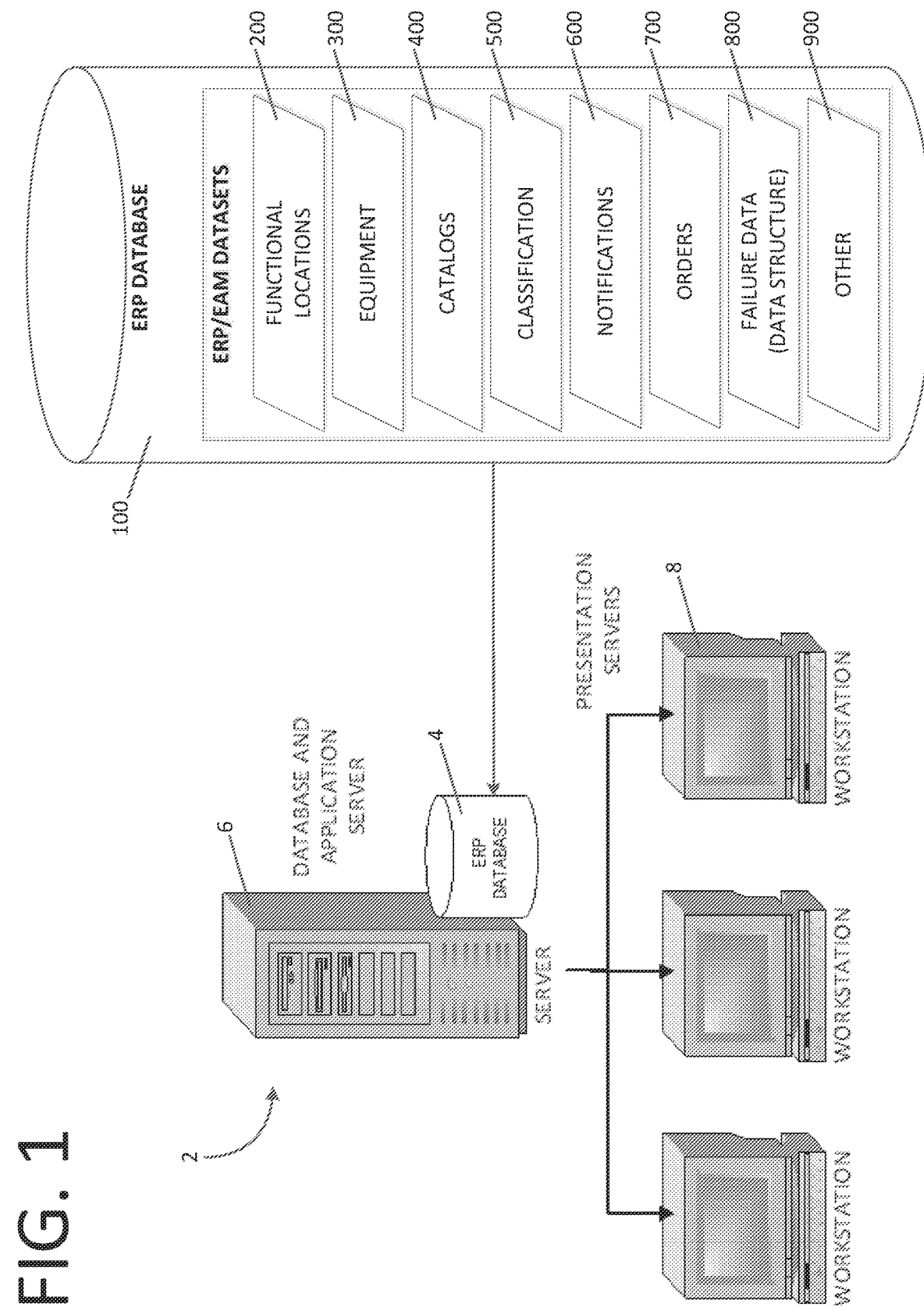
FIG. 1 is a schematic of an exemplary ERP/EAM system of this invention.

In the following detailed description of the preferred embodiments, reference is made to the accompanying drawings that form a part hereof, and in which is shown by way of illustration specific preferred embodiments in which the invention may be practiced. These embodiments are described in sufficient detail to enable those skilled in the art to practice the invention, and it is understood that other embodiments may be utilized and that logical, structural, mechanical, electrical, and chemical changes may be made without departing from the spirit or scope of the invention. To avoid detail not necessary to enable those skilled in the art to practice the invention, the description may omit certain information known to those skilled in the art. The following detailed description is, therefore, not to be taken in a limiting sense, and the scope of the present invention is defined only by the appended claims.

The following is a glossary of terms as used in the description of the preferred embodiment:

Availability Before Malfunction: (system) availability of equipment to perform its intended function before a reported malfunction occurs, expressed as a percentage.

Breakdown Duration: (system) the calculated difference between the MED and MSD in hours. The Breakdown Duration is calculated only when the BDI is set.

Breakdown Indicator ("BDI"): (system) an indicator that specifies whether or not a breakdown occurs as a result of an equipment malfunction. The BDI—640 is set or unset by the ERP System based on values input into Effect on the System 650.

Business Process: (general) a collection of related, structured activities or tasks that serve a particular goal or accomplish a particular business requirement. It often can be visualized with a flowchart as a sequence of activities with interleaving decision points or with a Process Matrix as a sequence of activities with relevance rules based on the data in the process.

Catalog Code Group: (system) a grouping of Catalog Codes within a Catalog.

Catalog Code: (system) codes used to describe granular details of objects, events, or activities, e.g. to describe equipment condition at failure and activities undertaken to repair the equipment.

Catalog Dataset: (system) a collection of all catalogs and catalog profiles in an ERP System database.

Catalog Profile: (system) a grouping of Catalogs and Catalog Code Groups that as a whole form a Code Set. A Catalog Profile assignment to a Technical Object imparts a specific Code Set to that Technical Object. The codes are relevant for reporting details for specific events that are documented with Transaction Records/Documents, e.g. a Malfunction Report.

Catalog: (system) a standard system of identifiers used to manage, uniformly define, and standardize information. Catalogs include codes ("Catalog Codes") that are used to describe equipment failure details, e.g. the color "burnt orange" or the condition "bent." Similar catalog codes within a catalog are grouped together into "Catalog Code Groups."

Characteristic: (system) a property for describing and distinguishing between objects, such as length, color, or weight. Each Characteristic has a unique Characteristic Identifier and can be assigned to one or more Classification IDs.

Characteristic Identifier: (system) a unique entity within the Classification Dataset that uniquely identifies each Characteristic Master Record.

Characteristic Master Record: (system) a unique record within the Classification Dataset that identifies one Characteristic and its associated attributes.

Classification ("Class"): (system) a grouping of similar data objects by common characteristics. Each Classification Master Record has its own identifier, can be grouped hierarchically, and can be assigned to one or more technical objects.

Class Level also Class Node: (system) an attribute of an FL Master Record that specifies whether a given Functional Location Master Record is an FAL, FEL, Subunit, FCL, or Unstructured Equipment item; if a given Functional Location Master Record is an FAL, the Functional Location Category specifies whether the FAL represents an enterprise, country code, installation/field office, system group/production area, system/production unit, or process function/equipment type.

Classification ("Class") Dataset: (system) all Classification and Characteristic Master Records within an ERP System.

Classification ("Class") Hierarchy: (system) the structuring of related Class Identifiers within a Class Type in a superordinate/subordinate manner. Characteristics assigned to a given Class Identifier are inherited by all subordinate Class Identifiers.

Classification ("Class") Hierarchy: (taxonomy) a logical structuring of Enterprise Assets in a taxonomic manner, with Equipment Category superordinate to Equipment Class and Equipment Class superordinate to Equipment Type.

Classification ("Class") Identifier: (system) a unique entity within the Classification Dataset that uniquely identifies each Classification Master Record. Each Class Identifier can be assigned one or more characteristic IDs. When the Class ID is assigned to a given database object, that database object inherits all characteristics that are assigned to the Class ID. Classified objects can be retrieved by specifying characteristic values in the classification dataset. Classifiable objects include functional location master records, equipment master records, and malfunction reports (documents).

Classification ("Class") Master Record: (system) a unique record within the Classification Dataset that identifies one grouping level and its associated attributes. Each Classification Master Record must be assigned a Classification Type. Class Master Records can be grouped hierarchically.

Classification ("Class") Type: (system) a data field on the Classification Master Record that specifies a specific dataset for which the Classification Master Record is relevant.

Code Set: (system) a set of Catalog Codes imparted to a transactional document or other dataset through a Catalog Profile assignment. Code Sets are used to describe details of events, objects, etc.

Component Object: (taxonomy) a part of an Equipment Object.

Condition Before Malfunction: (system) the state of the Equipment Object before a malfunction occurs, e.g. running, start-up, testing, idle, or standby (from ISO 14224:2006 Table 6).

Dataset: (system) all individual data records of a particular type, e.g. equipment records.

Effect on the System also Effect on Operation: (system) effect of a malfunction on equipment operation, e.g. incipient, degraded performance, critical failure (from ISO 14224:2006 Table 6). The BDI—640 is set or unset by the ERP System based on values input into Effect on the System—650.

Engineering Tag Number also Tag Number: (taxonomy) an identifier used to represent equipment or component duty/service requirements on engineering diagram and specifications sheets, e.g. a Process and Instrument Diagram (P&ID).

Enterprise Assets: (taxonomy) all facilities and equipment assets associated with manufacturing, producing, utilities, mining or similar industries.

Equipment Boundary Envelope: (taxonomy) a standard definition of what is and is not considered to part of a given Equipment Class, typically depicted in a schematic diagram.

Equipment Category: (system) a data field within each Equipment Master Data Record that specifies a grouping by usage or other similar attribute, e.g. plant machinery, rental equipment, etc.

Equipment Category: (taxonomy) a general grouping by a similar attribute, e.g. rotating, mechanical, and electrical, etc.

Equipment Classification ("Equipment Class"): (taxonomy) a grouping of equipment by similar function, e.g. pump, compressor, combustion engine, etc.

Equipment Classification Type ("Equipment Class Type"): (taxonomy) a subset of an Equipment Class, e.g. centrifugal pump or reciprocating pump, where pump is the equipment class.

Equipment Dataset: (system) all Equipment Master Records within an ERP System.

Equipment Identifier: (system) an alpha-numeric field that uniquely identifies a Equipment Master Record within an Equipment Dataset.

Equipment Installation: (system) an Equipment Object installation in a Functional Location object creates a data relationship between the two objects where the Equipment Object is subordinate to the Functional Location Object. From a taxonomic viewpoint, the Equipment Object is a Materialized Physical Object that executes the duty/requirements specified by the Functional Physical Object.

Equipment Installation Allowed Indicator: (system) an indicator setting on Functional Location Master Records that allows or disallows equipment installation on specific master records where the indicator is set.

Equipment Master Record: (system) a unique record within the Equipment Dataset that identifies one physical Enterprise Asset and its associated attributes.

Equipment Object: (general) a Materialized Physical Object.

Equipment Subdivision: (taxonomy) the structured representation of an Equipment Class (taxonomy) as Equipment Subunits and Equipment Components.

Equipment Subunit: (taxonomy) major groups of components or subcomponents associated with an equipment object or component objects.

Equipment Taxonomy: (system) hierarchical structuring of Technical Object Master Records and associated Master Records in a logical manner so the entirety becomes a representation of Enterprise Assets.

Equipment Taxonomy: (taxonomy) a systematic hierarchical organization of Enterprise Assets into generic groups based on common factors (location, use, equipment subdivision, etc.).

ERP System: (system) enterprise resource planning (ERP) systems integrate internal and external management information across an entire organization, including finance/accounting, manufacturing, plant maintenance, sales and service, customer relationship management, etc. ERP systems automate this activity with an integrated software application. ERP systems can run on a variety of computer hardware and network configurations, typically employing a database as a repository for information. Examples include SAP and Oracle.

ERP/EAM system: (system) an information system for managing enterprise equipment assets within the operations and maintenance lifecycle phase of capital facilities. ERP/EAM provides a comprehensive equipment taxonomy that logically represents equipment assets across an enterprise and serves as an enterprise-wide data infrastructure for standard equipment failure data collection, merging, and assessment processes.

Failure Classification Structure: (system) a Class Hierarchy used to group similar equipment failures by common characteristics. A Failure Class Structure is used primarily with Equipment Malfunction Reports.

Failure Code Set: (system) a compilation of Catalog Codes relevant to any given Technical Object (functional location or equipment) that are used to describe conditions, events, activities, etc. associated with equipment failure.

Failure Data Structure: (system) a compilation of data from individual failure events that includes calculate failure metric values, e.g. Mean Time To Failure (MTTF)

FEL Malfunction Report also FEL Notification Record: (system) the system generated Malfunction Report in the MLFR process. The FEL Malfunction Report is generated only when the Native Malfunction Report is generated for an FCL object.

Functional Area Location ("FAL"): (taxonomy) an upper-level individual Functional Location Master Record that represents a grouping level for equipment assets, e.g., installation, facility, area, equipment type, etc.

Functional Component Location ("FCL"): (taxonomy) a component-level Functional Location Master Record that contains descriptive information pertaining to specific process requirements and use/location data for a given equipment function. An FCL corresponds to an Engineering Tag Number: it does represent a physical asset.

Functional Equipment Location ("FEL"): (taxonomy) an equipment-level Functional Location Master Record that contains descriptive information pertaining to specific process requirements and use/location data for a given equipment function. An FEL corresponds to an Engineering Tag Number: it does represent a physical asset.

Functional Location Category ("FL Category"): (system) a data field within each Functional Location Master Data Record that specifies a taxonomic level within the Functional Location Hierarchy.

Functional Location Dataset: (system) all Functional Location Master Records within an ERP System.

Functional Location Hierarchy: (system) hierarchical structuring of Functional Location Master Records in a logical manner, such that process requirements of all Enterprise Assets are represented.

Functional Location Identifier: (system) an alpha-numeric field that uniquely identifies a Functional Location Master Record within a Functional Location Dataset.

Functional Location Master Record ("FL Master Record"): (system) a unique record within the Functional Location Dataset that identifies a specific process function and its associated attributes.

Functional Physical Object: (taxonomy) an abstract object that defines the duty of a particular equipment function within a processing facility. Reference ISO 15926-2, Section E.3.3.

ISO Standard: (taxonomy) ISO recognized standards of given industry application. Ex. ISO 14224 is the standard for petroleum, petrochemical and natural gas industries—"Collection and exchange of reliability and maintenance data for equipment."

Maintainable Item: (taxonomy) a generic description of a part or assembly of parts that is normally the lowest level in the equipment hierarchy during equipment maintenance. Maintainable Items serve as guidelines for mapping Engineering Tag Numbers to the Equipment Taxonomy (system).

Malfunction End Date ("MED"): (system) the date when an equipment malfunction ends.

Malfunction Report: (system) a transactional document used to document details for one specific equipment failure event.

Malfunction Start Date ("MSD"): (system) the date when an equipment malfunction begins.

Master Record: (system) a master record is a permanent record that contains key information about an individual, non-transactional entity in an ERP System. Master record examples are functional locations and equipment. This information must be entered into the ERP System before any transactions can take place involving the master record. A master record ensures subsequent transactions or inquiries will have consistent data and reports and analyses can be done in an orderly way. Master Records can be edited or changed when necessary.

Material identification Number: (system) a unique number used to identify a specific warehouse inventory stock number.

Materialized Physical Object: (taxonomy) a physical object that represents a tangible asset that typically has a serial number.

Multi-Level Failure Reporting ("MLFR"): (system) a systematic process for ensuring exactly one Malfunction Report is always generated at the FEL level for any failure event within an Equipment Boundary, regardless of whether the malfunction is reported at an FCL or FEL level.

Native Malfunction Report also Native Notification: (system) the initial malfunction report generated in the MLFR process. This is created at either an FCL or FEL object.

Notification also Maintenance Notification: (system) a Transactional Document created by a system user with the purpose of initiating work and/or reporting details of an issue. A Malfunction Report is one example of a Notification. A Notification is used in conjunction with an Order and has a data relationship within the ERP System (one order can be assigned one of more notifications, while one notification can be assigned to exactly one order).

Notification Identifier ("Notification ID"): (system) a character string that uniquely identifies exactly one Notification Record. Notification IDs are typically system generated as sequential numbers.

Notification Record: (system) one Notification data record, e.g. one failure event.

Object Type: (system) a categorization for type of technical object that in ERP/ERP corresponds to Equipment Class (taxonomy).

Order also Maintenance Order: (system) a Transactional Document created by a system user with the purpose of executing work (planning resources and materials, scheduling, job status, time and material confirmations, etc.). An Order is used in conjunction with a Notification and has a data relationship within the ERP System (one order can be assigned one of more notifications, while one notification can be assigned to exactly one order).

Order Identifier ("Order ID"): (system) a character string that uniquely identifies exactly one Notification Record. Notification IDs are typically system generated as sequential numbers.

Order Record: (system) one Order data record, e.g. one repair event.

Piping and Instrument Diagram ("P&ID"): (general) an engineering diagram used in process engineering to show the piping of the process flow together with the installed equipment and instrumentation. P&IDs are the primary schematic drawing used for laying out a process control installation and show the interconnection of process equipment and the instrumentation used to control the process. In the process industry, a standard set of symbols is used to prepare drawings of processes. The instrument symbols used in these drawings are generally based on International Society of Automation (ISA) Standard S5. 1. P&IDs play a significant role in the maintenance and modification of the process that it describes. It is critical to demonstrate the physical sequence of equipment and systems, as well as how these systems connect. During the design stage, the diagram also provides the basis for the development of system control schemes, allowing for further safety and operational investigations, such as the hazard and operability study (HAZOP).

Reference Object: (system) the Technical Object specified as the primary object in a transactional document, e.g. the Reference Object in a Malfunction Report is the object that failed.

Single Installation Indicator Field: (system) an indicator setting on Functional Location Master Records that specifies 1:1 cardinality of Functional Location to Equipment installation on specific master records where the indicator is set.

Technical Object: (system) a generic term used in reference to a Functional Location or Equipment Master Record.

Transactional Record/Document: (system) formal recording of an event, such as capturing details of an equipment repair and its subsequent repair, e.g. a malfunction report and an equipment repair work order.

Unstructured Equipment: (taxonomy) equipment objects for which no Equipment Subdivision has been defined.

Use/Location Data ("ULD"): (taxonomy) data that describe the operating context or application and duty of equipment, e.g. type of industry, type of processing stream, type of facility, environmental conditions, whether the object is primary or standby unit, etc.

User Status: (system) a user-defined status relevant to Master Records or Transactional Documents. User Statuses are defined during configuration of an ERP System.

Work Close-out: (system) work order closure and associated final documentation that takes place following execution of maintenance work. This includes confirming what work was completed, booking labor hours to the work order, and documenting repair details and consequences of failure.

Work Execution: (system) a Business Process that includes identifying work required, generating a transactional document(s) for documenting the repair, planning, scheduling, and execution of that work, and documenting equipment repair details.

Work Order: (system) a Transactional Document used to manage execution of specific maintenance requirements.

ERP/EAM System

Referring now to the drawings, FIG. 1 is a simplified schematic of an exemplary ERP/EAM system of this invention, which is designated generally as reference numeral 100. ERP/EAM system 100 is a subsystem of an ERP for representing and managing of equipment, equipment subunits and component parts thereof across an enterprise based on an Equipment Taxonomy that maps materialized physical objects to functional physical objects within a hierarchy of functional locations within the enterprise for all enterprise assets in accordance with applicable industry standards. As shown, ERP/EAM 100 is an integrated subsystem of an enterprise resource management (ERP) system 2, such as those available from SAP, Oracle and Microsoft. ERP system 2 is implemented using a variety of application software 4 running on a variety of system hardware 6 and 8, including but not limited to mainframes, PCs, terminals, network servers, communication equipment, data storage and backup equipment, databases, data compilers, and user interfaces, all of which are well known and understood in the arts, but not depicted in the figures. ERP system 2 allows end users at various enterprise facilities and installations to locally or remotely collect, monitor, store and analyze data relating to a wide range of business and operational activities.

Figure 32:
Figure 37:
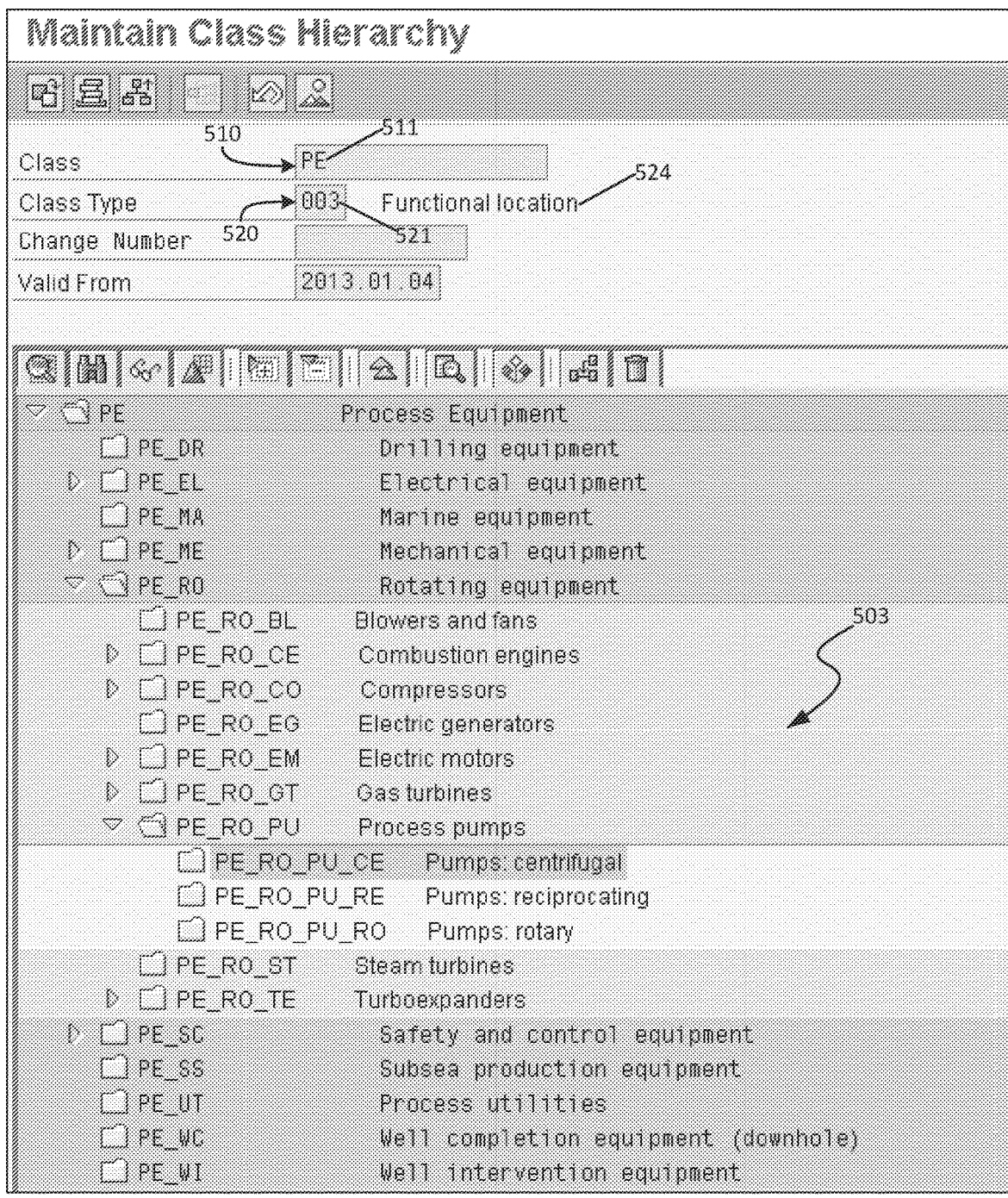
Figure 38:
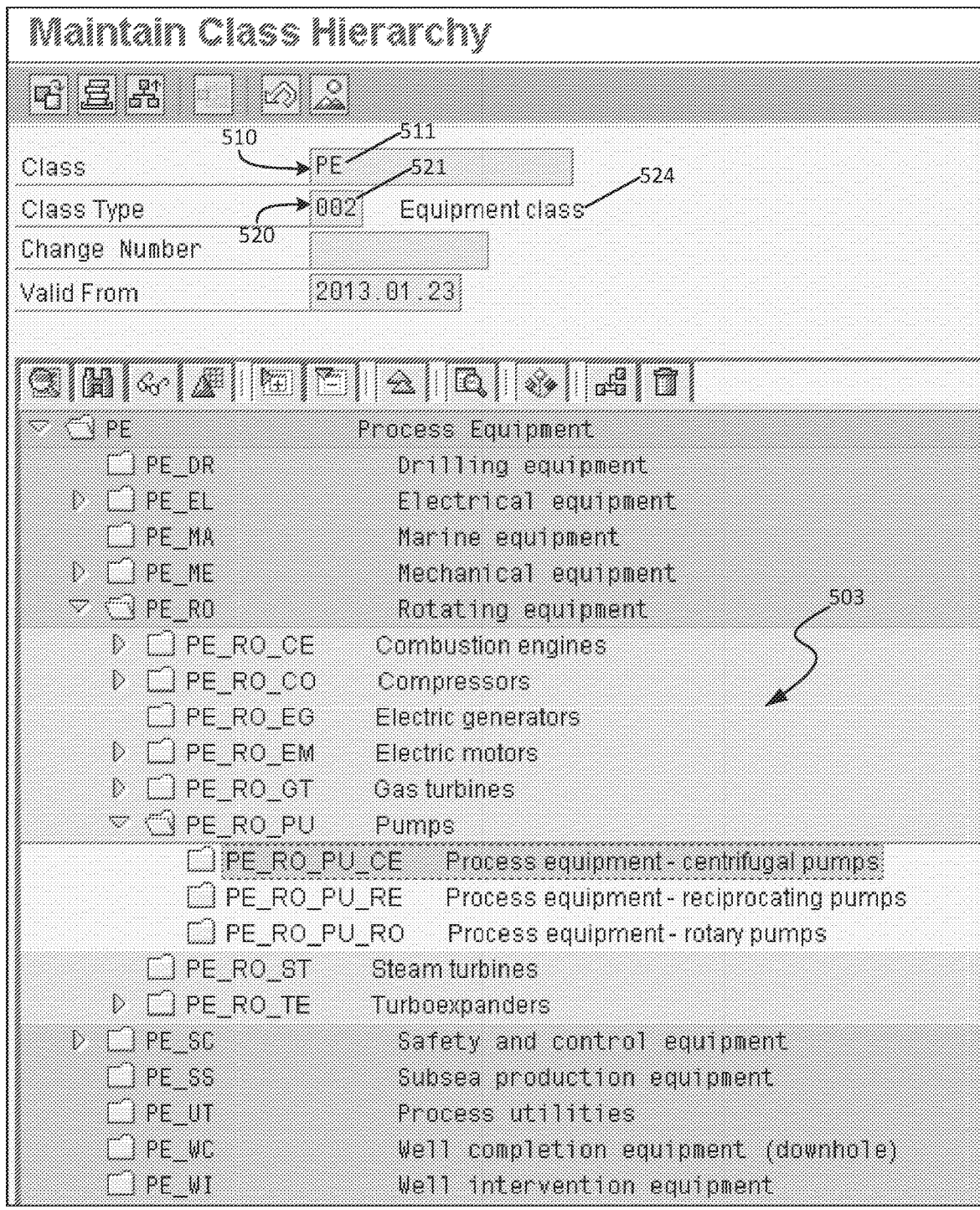

FIG. 1 also depicts the basic data structure of the ERP/EAM system 100 of this invention. The ERP/EAM system 100 includes the following data sets: Functional Location Data Set 200, Equipment Data Set 300, Catalog Data Set 400; Equipment Classification data set 500; Notification data set 600; Order data set 700; and Failure Data set 800. ERP/EAM system 100 also includes other unspecified data sets that serve as integration points with other functionality in ERP system 2 (other datasets within plant maintenance, finance, controlling, materials management, asset accounting, project systems, human resources, production planning, etc.). It should be noted that many of the figures are exemplary screen displays for the ERP/EAM system that illustrate certain additional data elements and fields, as well as additional system functionality not necessarily related to the present invention. These additional data structures and functionality also form part of the of ERP/EAM system 100, but only the data structures, methods, taxonomies and operations of the exemplary ERP/EAM system 100 that are relevant to the present invention are described in detail hereinafter. It should be noted however that ERP/EAM 100 may be adapted to include such additional data structures, operation and methodologies to provide the desired additional functionality to ERP system 2. In addition, data within the data structures (data set, catalog, catalog profiles, classification, code groups, code sets, etc.) are typically accessed and managed through a graphic user interface (GUI). FIGS. 8, 26-38 are exemplary screen displays of the GUI of the ERP/EAM system. The screen displays form part of the GUI and may present data fields in variety forms, such as in record type format (eg. FIG. 26), a structure type format (eg. FIG. 8) or in list type format (eg. FIG. 32) as desired or applicable for any given ERP system.

ERP/EAM Data Structure

Within ERP/EAM system 100, the functional Location data set 200 is a collection of Functional Location Master Records 202 for all the Functional Equipment Location (FEL) objects within the given enterprise installation or plant under the Equipment Taxonomy 110. Functional Location Master Records 202 include the following key data elements/fields: Functional Location ID 210; Functional Location Category 220 (See, FIGS. 26 and 27). The Equipment data set 300 is a collection of Equipment Master Records 302 for all the Materialized Physical Objects within a given enterprise installation of a plant. Equipment Master Records 302 include the following key data elements/fields: Equipment Identifier 310; Equipment Category 320; and Equipment Type 330 (See, FIGS. 28-30). The Catalog data set 400 is a collection of the various catalogs, catalog profiles 410, catalog code groups 420, and catalog codes 430 within the ERP/EAM system 100. Classification data set 500 is a collection of all Classification (and Characteristic) Master Records 502 and Characteristic Master Records 504 within the ERP/EAM system 100. Classification Master Records 502 include the following key data elements/fields: Classification ID 510; Classification Type 520; and Characteristic ID 530 (See, FIGS. 26-28, 31-34). Notification data set 600 is a collection of Notification Master Records 602 for all failure notifications generated for failure events under the Equipment Taxonomy 110. Notification Master Records 600 include the following key data elements/fields: Notification ID 610; Notification Short Text Description 612; Notification Start Date 614; Breakdown Duration 616; Malfunction End Date 619; Notification User Status 630; Notification Breakdown Indicator (BDI) 604; Notification Effect on System 650; Notification Availability before Malfunction Tab 652; and Notification Condition before Malfunction Tab 654.

Within the Functional Location data set 200, the Function Location ID 210 is a data element/field containing the unique identifier for each Functional Location Master Record 202. As shown in FIG. 6, the data contained in Functional Location ID 210 is typically represented by a schema that includes the Engineering Tag Numbers ("Tag Numbers") taken from the P&ID for functional physical objects, i.e., FEL and FCL or maintainable objects. Various grouping levels are created in addition to Tag Numbers, including FAL objects and Subunits. Functional Location Category 220 is a date element/field containing assigned values 0-9 from the Functional Location Hierarchy 201 for each Functional Location Master Record 202. The Functional Location Category specifies whether a given Functional Location Master Record is an FAL, FEL, Subunit, FCL, or Unstructured Equipment item; if a given Functional Location Master Record is an FAL, the Functional Location Category specifies whether the FAL represents an enterprise, country code, installation/field office, system group/production area, system/production unit, or process function/equipment type. The Functional Location Category in conjunction with hierarchical structuring defines the interrelationships of FALs to each other, FELs to FALs, FELs to each other, FELs to Subunits, FCLs to Subunits, and Unstructured Equipment to FALs, FELs, and FCLs.

Within the Equipment data set 300, the Equipment ID 310 is a data element/field that contains the unique identifier for each Equipment Master Record 302. The Equipment ID 310 may employ any suitable schema but typically is a system-generated sequential number. Equipment Class Type 330 is a separate data element/field that is a subset of the Equipment Class. The Equipment Category and Equipment Class Type 330 are key data structures used in equipment failure reporting and management analytics.

Within the Equipment Classification data set 500, the Classification ID 510 is an alpha-numeric data element/field that uniquely identifies each Classification Master Record 502. The Classification Type 520 is a data element/field in the Classification Master Record 502 that specifies a specific data set for which it relevant, particularly, "002" for Equipment Data Set 300, "003" for Functional Location Data Set 200 and "015" for Notification Data Set 600. The Characteristic ID 530 is a data element/field containing the unique identifier for each Characteristic Master Record 504.

Within the Notification data set 600, Notification ID 610 is a character string that uniquely identifies exactly one Notification Record. Notification IDs are typically system generated as sequential numbers. Notification Short Text Description 612 is a date element/field containing a general text description of various kinds. Order ID 620 is a data element/field containing a character string that uniquely identifies exactly one Notification Record. Notification IDs are typically system generated as sequential numbers. Order Number 620 serves as the data link between "native" Notification Master Records 602 and "FEL" Notification Master Records 604.

Malfunction Start Date ("MSD") 618 and the Malfunction End Date ("MED") 619 are data element/fields containing the dates when an equipment malfunction begins and ends. Breakdown Duration 616 is a data element/field containing the calculated difference between the MED 619 and MSD 618 in hours. The Breakdown Duration is calculated only when the BDI is set. Notification User Status 630 is a data element/field that contains a user-defined status relevant to Master Records or Transactional Documents. User Statuses are defined during configuration of an ERP System. Notification Breakdown Indicator (BDI) 604 is a data element/field that specifies whether or not a breakdown occurs as a result of an equipment malfunction. The BDI is set or unset by the ERP System based on values input into Effect on the System. Notification Effect on System 650 is a data element/field containing the effect of a malfunction on equipment operation, e.g. incipient, degraded performance, or critical failure (following ISO 14224:2006 Table 6). The BDI—640 is set or unset by the ERP System based on values input into Effect on the System—650. Notification Availability before Malfunction Tab 652 is a data element/field that contains the availability of equipment to perform its intended function before a reported malfunction occurs, expressed as a percentage.

Equipment Taxonomy

All of the datasets for ERP/EAM system 100 are organized under the Equipment Taxonomy 110. The Equipment Taxonomy 110 provides master datasets, including Functional Locations, Equipment, Catalogs and Classifications.

The Equipment Taxonomy 110 also provides classifications, catalogs, characteristics, characteristic types, code sets, catalog groups and catalog profiles for operational and failure events for the various equipment objects. For example, the Equipment Taxonomy 110 provides various Catalog Code sets 430 to discretely describe equipment failure details, such as the color, "burnt orange" or the condition, "bent." In addition, the Equipment Taxonomy 110 uses Catalog Profiles 410 to attribute a grouping of Catalogs 40, Catalog Code Groups 420 and Catalog Code Sets 430. All of the various catalogs, catalog profiles, catalog codes, code groups, categories, and classifications organized under the Equipment Taxonomy 110 are relevant to preventive maintenance of enterprise assets, as well as for equipment failure management.

Figure 2:
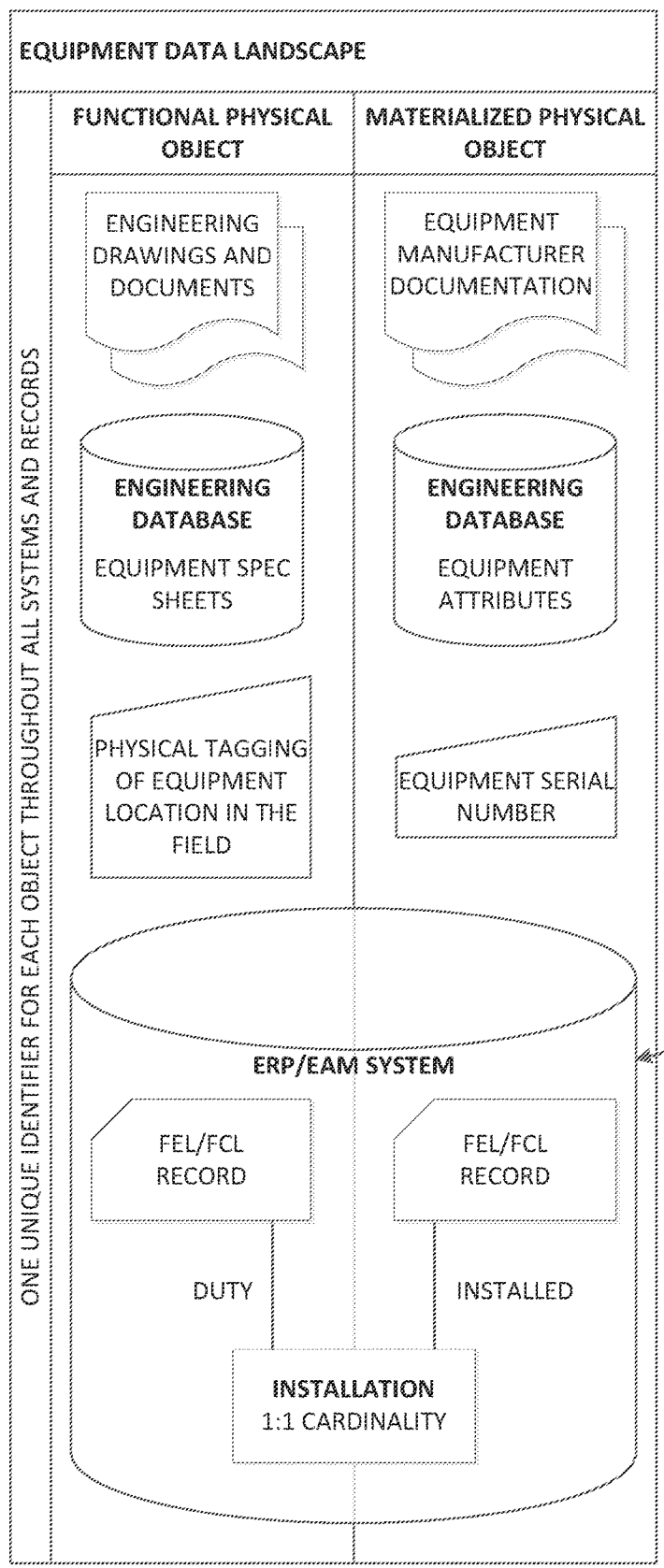
FIG. 2 is a graphic table representing the equipment data landscape of the ERP/EAM of FIG. 1.

Moreover, ERP/EAM system 100 is structured and organized around Equipment Taxonomy 110 to enable comprehensive management of equipment, equipment subunits and component parts thereof, across an entire enterprise based on a mapping of the materialized physical objects to functional physical objects within a hierarchy of functional locations within the enterprise for all enterprise assets. The Equipment Taxonomy 110 provides an organizational hierarchy for all enterprise assets, such as installation, systems and processes, as well as, individual pieces of equipment, equipment subunits and component parts. Moreover as shown in FIG. 2, the Equipment Taxonomy 110 provides for the integration of both functional characteristics and materialized characteristic of each piece of equipment within the operational processes of the enterprise using applicable industry accepted equipment standards, such as ISO standards within ERP system 2 for more comprehensive enterprise asset management. This methodology of standardization follows certain data structure and schema that identifies and captures for each piece of equipment, subunit and component their functional object characteristics, materialized object characteristics, equipment class hierarchy levels, equipment boundaries and groupings based on applicable industry standards and their intended piping and instrument diagrams (P&IDs).

It should be noted that the Equipment Taxonomy 110 is modeled in accordance with ISO 15926-2:2003, Section E.3.3 "Coincident Individuals" and allows materialized physical objects to be mapped to functional physical objects across the entire enterprise. A functional physical object is an abstract object that defines the duty of a particular equipment function within a processing facility. A materialized physical object is a physical object that represents a tangible asset that typically has a serial number. Functional physical objects have characteristics specified in use/location data (ULD) drawn from various source such as engineering drawings and documents, equipment specification sheet stored in engineering data sets, physical tagging of equipment locations in the field and the data sets specific to the ERP/EAM system. Materialized physical objects have characteristics drawn from various sources, such as equipment manufacturing documents, equipment attributes stored in engineering data sets, equipment serial numbers and equipment data sets within the ERP/EAM system 100. The Equipment Taxonomy 110 uses a single unique identifier for each enterprise object through the ERP/EAM system 100 for mapping the functional physical objects to the materialized physical objects providing a one to one cardinality within the ERP/EAM system 100. Within the Equipment Taxonomy 110, every enterprise asset has a single unique identifier, which allows the mapping of functional physical objects to materialized physical objects within the ERP/EAM system 100 with one to one cardinality.

The Equipment Taxonomy 110 categorizes each enterprise asset according to a Functional Location Hierarchy within Functional Location data set 200. The Functional Location Hierarchy is derived from industry standards, namely ISO 14224 and ISO 15926. The Equipment Taxonomy assigns each enterprise asset a Functional Location Category within the Functional Location Hierarchy. Under the Functional Location Hierarchy, each Functional Location Category is subordinate to the Functional Location Category above it. The Functional Location Hierarchy includes Functional Area Locations (FAL), as well as Functional Equipment Locations (FEL) and functional Component Locations (FCL). FIGS. 4, 6-8 illustrate the Functional Location Hierarchy of the Equipment Taxonomy 110.

Under the Equipment Taxonomy 110, unique identifiers (Functional Location ID 210) are assigned to each maintainable object (equipment, subunit or component) and incorporates the engineering tag numbers found in Piping and Instrument diagrams (P&IDs) and other engineering documents that detail the process functions of the given enterprise installation of that maintainable object. In systems engineering, P&IDs are engineering diagrams typically created in the design phase of a plant or process installation that show process flow and sequence of equipment and systems in a given production process. Since P&IDs tag numbers are typically generated in the design phase of a process project, they provide a readily available data set and starting point for the development of equipment taxonomy. The P&IDs also provide the basis for the development of system control schemes, allowing for further safety and operation investigations, such as hazard and operability analysis (HAZOP). The P&ID identifies the duty/service requirements for each particular equipment object. Each equipment object is identified by its P&ID tag number, which references the P&ID and other associated engineering diagrams and specification sheets. Typically, engineering tag numbers correspond to ISO 15926-2 ("Functional Physical Objects—FIG. E.9") and are typically incorporated as part of the schema of each functional location identifier. In almost all cases, P&ID tag numbers correspond to either equipment objects with a functional location category level of "6" or a component object with a functional location category level of "8." Subunit tag numbers as defined by ISO 14224 (Appendix A) with respect to the equipment boundary envelope or that do not correspond to P&ID tags are assigned a functional category level of "7". Some equipment items have not had their Equipment Subdivisions develop; these unstructured, but maintainable objects are assigned a functional location category of "9." Regardless, each tag number is mapped to an ISO 14224 taxonomic level. It should be noted that certain equipment objects may be grouped and/or subdivided as part of other equipment objects but remain within Function Location Category 6 as an FEL.

Functional Location Hierarchy Rules

The Functional location Hierarchy within the Equipment Taxonomy follows several general rules:
1. FEL objects are always assigned a Functional Location Category value of "6".
2. Subunits (component groups) are assigned a Functional Location Category value of "7". A subunit will always have a superordinate FL Category "6" location and a subordinate FL Category "8" location, which may or may not be directly above and/or below it.

3. FCL objects are always assigned category "8". A component will always have a superordinate Subunit, which may or may not be directly above it.

4. It is common for one or more FEL objects to be contained within a given FEL 6 boundary. This is the case when related equipment is not part of the given equipment boundary definition, e.g. PSVs on a vessel, or a motor driver for a pump.

5. All functional location Identifiers within an equipment class boundary envelope should be structurally subordinate to the parent equipment object.

6. All driven FEL objects should have separately defined drivers.

7. There must be exactly one Functional Location Identifier that corresponds directly to the equipment class boundary envelope; if there is not, one must be created. E.g., a gas generator and power turbine components of gas turbines may each have a separate functional location identifier, but no separate identifier may exist for the gas turbine package itself. An additional FEL equipment object must be created to represent the gas turbine package.

8. Multi-level structures are possible but used only for complex equipment, mostly multi-stage compressor trains.
   A. Components in a multi-level structure should be assigned where they are most relevant; e.g. in a compressor train, instrumentation components that are relevant to all stages should be assigned to the package level, whereas instrumentation relevant to only one stage should be mapped directly to that stage.
   B. If there are subunits that are common to the driver (e.g. a gas turbine) and the driven unit (e.g. a compressor), these are regarded as a part of the driven unit.
   C. All subunits within a multi-level structure must be from the boundary definition of the FEL level, no exceptions.

ERP/EAM Information Landscape

Figure 3:
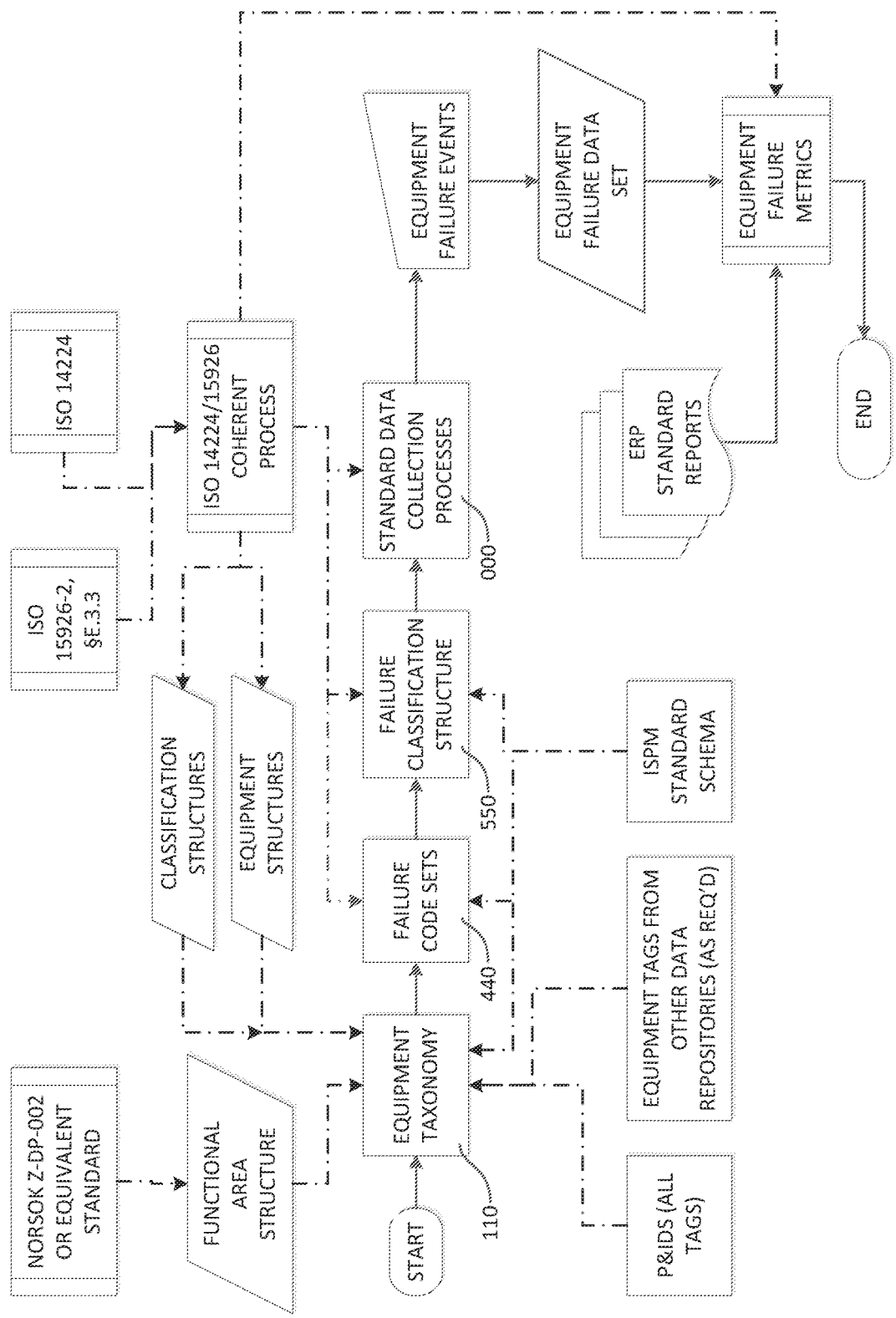
FIG. 3 is a simplified schematic illustrating the data architecture of the ERP/EAM system of FIG. 1.
Figure 4:
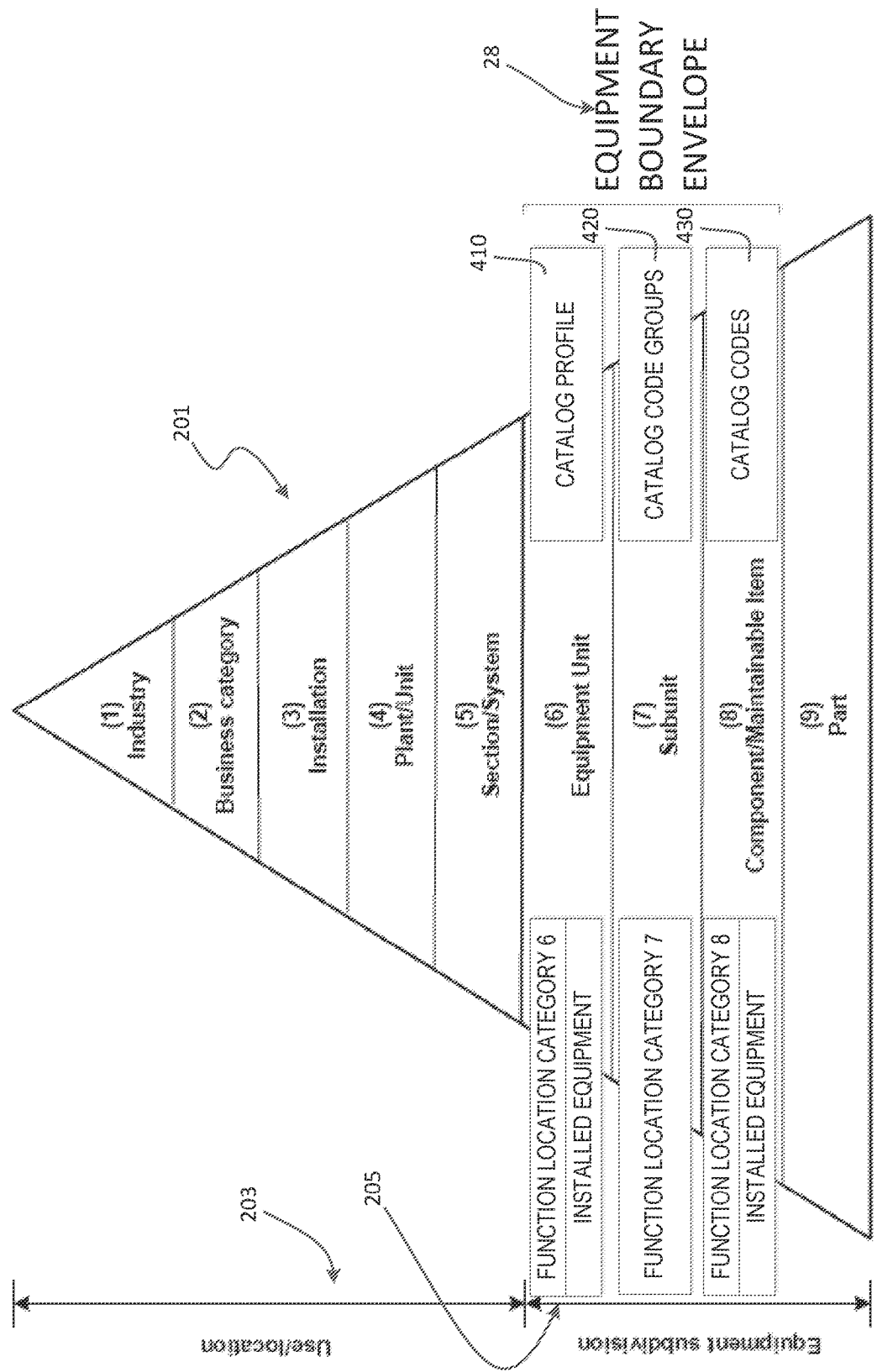
FIG. 4 is a graphic illustrating the Function Location Hierarchy for Functional Location Areas (FALs), Functional Equipment Locations (FELs), and Functional Component Locations (FCLs) used by the Equipment Taxonomy.

FIG. 3 depicts the data architecture of the ERP/EAM system 100. Within ERP/EAM 100, the Equipment Taxonomy 110 integrates data from various sources, such as P&IDs and Equipment tags from other data repositories. The Equipment Taxonomy 110 models of the functional area structures after industry standards, such as NOSOK Z-DP-002. The Equipment Taxonomy 110 follows the equipment structures and coherent process relationships of ISO Standards 14224 and 15926-2, § E.3.3. Failure Codes sets * and Failure Classification Structures follow a standardized schema and are modeled after the coherent process of ISO 14224/15926. Similarly, data collection processes are standardized typically in accordance with ISO 14224/15926. ERP/EAM 100 allows equipment failure data from equipment failure events to be managed optimally for failure reporting and analysis.

Creating the Equipment Taxonomy

Figure 5:
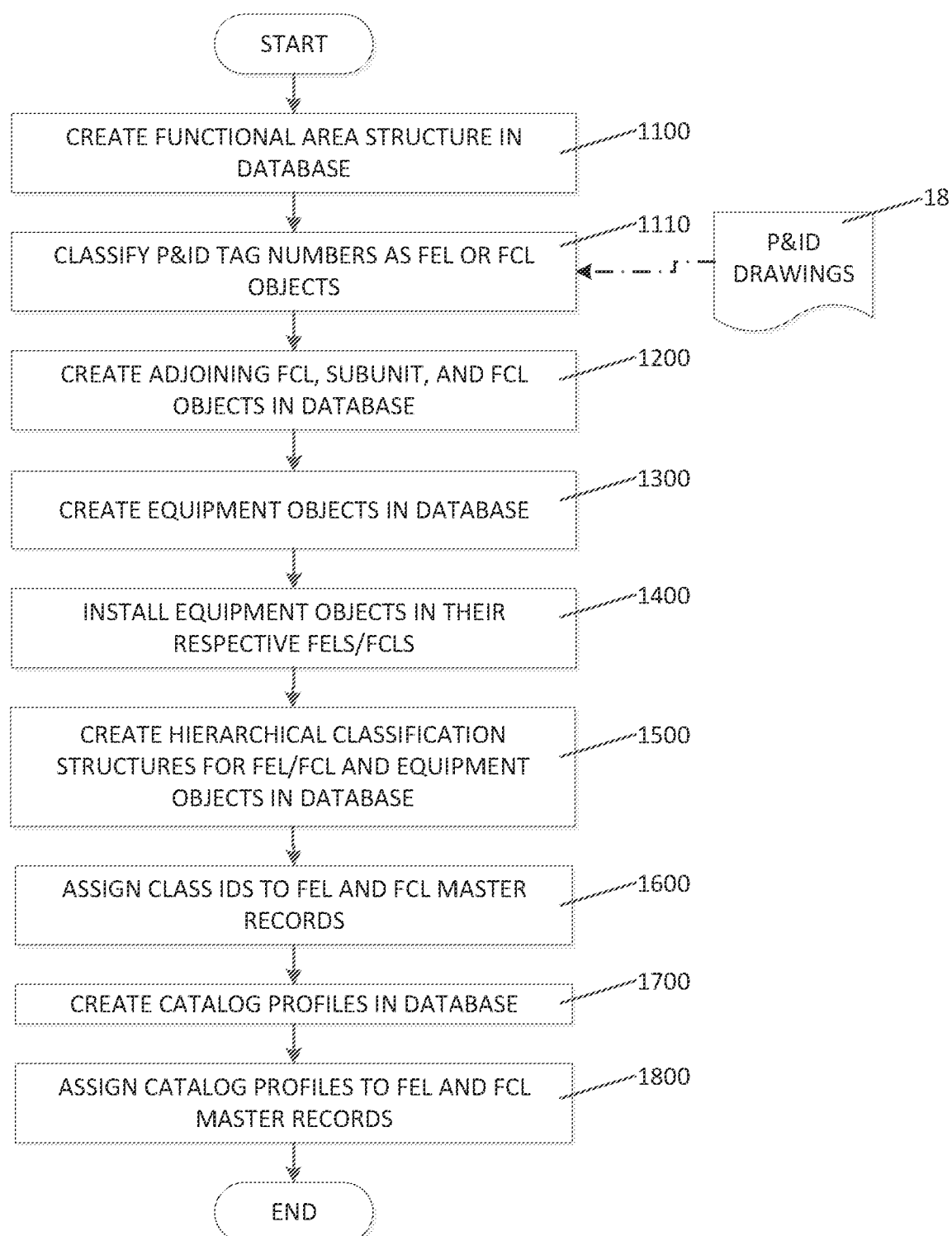
FIG. 5 is a flow chart of an exemplary set of steps for creating the Equipment Taxonomy for the ERP/EAM of FIG. 1.

FIG. 5 depicts an exemplary set of steps for creating the Equipment Taxonomy from P&IDs for the ERP/EAM system 100. The creation of the Equipment Taxonomy begins with the creation of a Functional Area Location (FAL) Hierarchy 203, which is part of the overall Functional Location Hierarchy 201 within the ERP/EAM 100—step 1100. FIG. 6 depicts an exemplary FAL Hierarchy where each subsequent FAL level (0-5) is subordinate to the preceding FAL levels and superordinate to the subsequent FAL levels. It should also be noted that FIG. 7 is a table of Functional Location Hierarchy 201 containing the corresponding FEL Category 220 values (0-9), sample Functional Location IDs 210 and associated schema 213, and asset object descriptions. In addition, FIG. 8 is an exemplary screen display (structure type) from the ERP/EAM system 100 illustrating the Functional Location Hierarchy.

Figure 21:
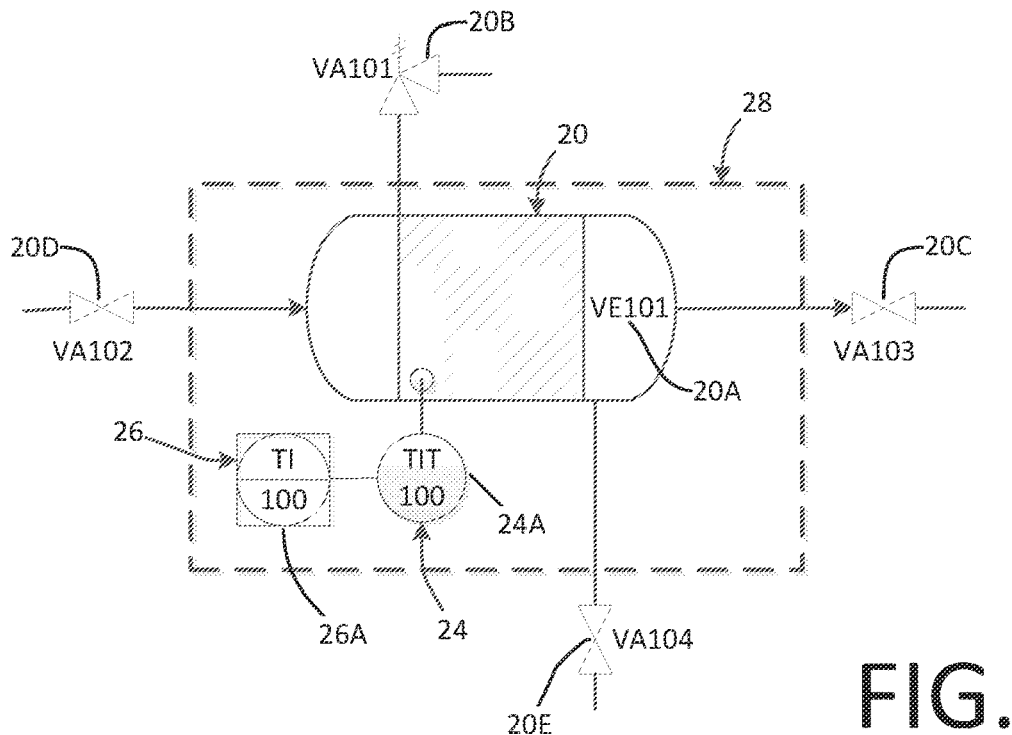
FIG. 21 is a simplified schematic of a vessel from a Piping and Instrument Diagram.
Figure 22:
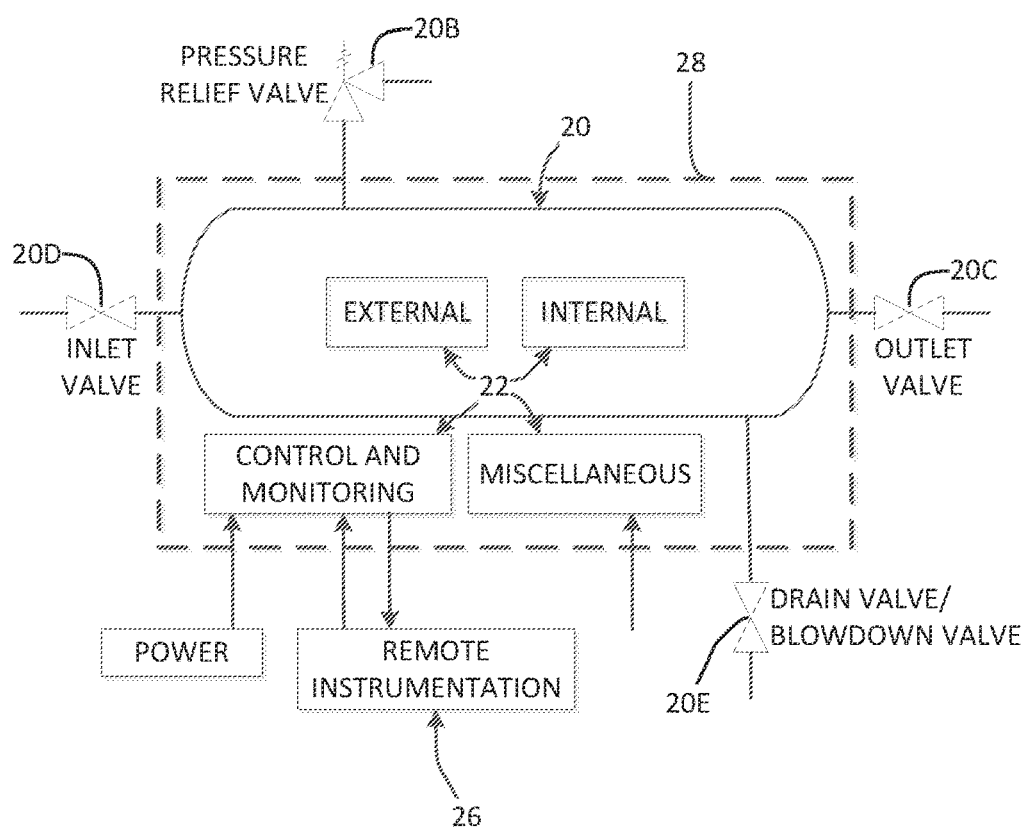
FIG. 22 is another schematic of the Vessel of FIG. 21 showing the Equipment Boundary Envelop and related functional items and attributes of the vessel in FIG. 21.

Once the FAL Hierarchy 203 is established, the various P&IDs of the installation are compiled for a given facility or installation and reviewed to identify all equipment objects and their relationships to other equipment objects within the P&ID. P&ID Tag Numbers 12 are identified as either "equipment" FEL Objects or "component" FCL Objects— Step 1110. FIG. 21 depicts a simplified P&ID for an installation containing multiple equipment objects 20. Next Functional Location Master Records 202 are created in the ERP/EAM system 100 for adjoining Functional Equipment Locations, Subunits and Functional Component Locations—step 1200. Once master records in the Functional Location data set 200 for the adjoining FEL, Subunit and FCL objects are created, separate Equipment Master Records 302 in an Equipment data set 300 are created in ERP/EAM system 100—step 1300. Next, Equipment Master Records 302 are mapped to their respective FEL and FCL Master Records—Step 1400. Classification structures for both FEL/FCL objects and equipment objects are created in ERP/EAM system 100—Step 1500. Classification IDs 510 are assigned for FEL Master Records 204 and FCL Master Records 206—Step 1600. Catalog Profiles are created within ERP/EAM system 100—Step 1700. Once created, the Catalog Profiles 410 are assigned to FEL Master records 204 and FCL Master Records 206—Step 1800.

Classification Hierarchy

Figure 9:
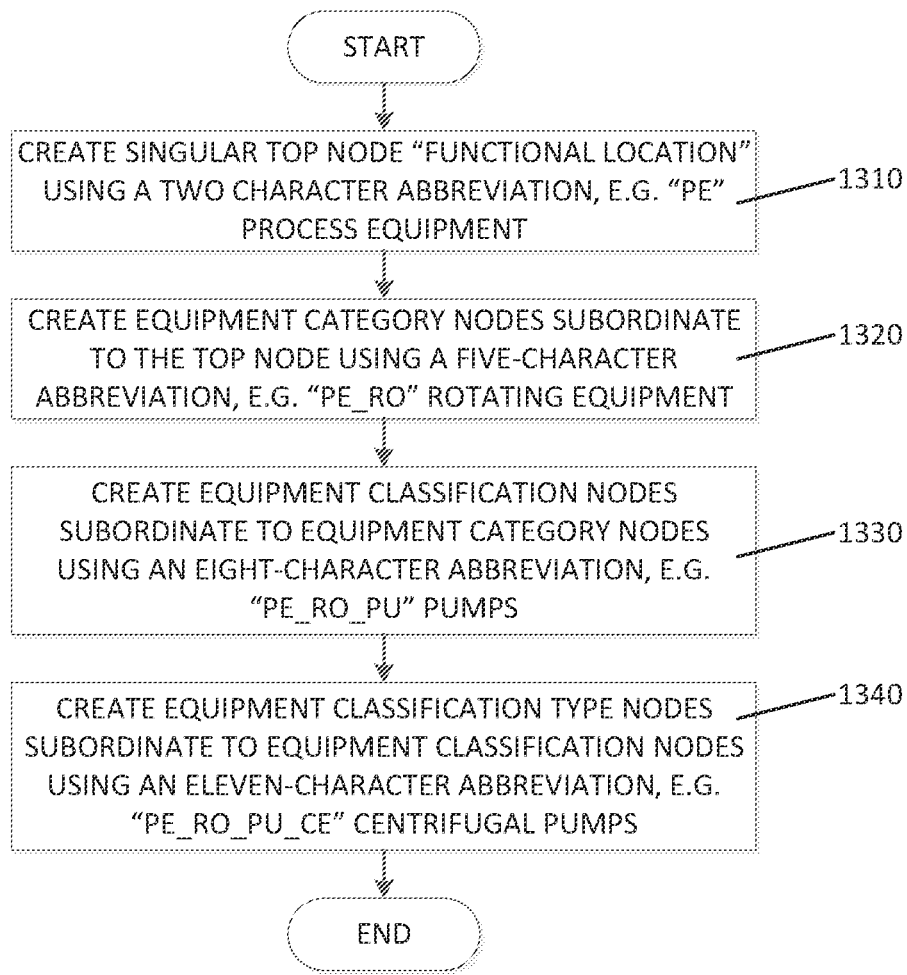
FIG. 9 is a flowchart of an exemplary set of steps for creating a Classification Hierarchy.

FIG. 9 is an exemplary set of steps for creating Classification Hierarchy 503 for the Equipment Taxonomy 110. The creation of the Classification Hierarchy 503 begins with the creation of a singular top level or node 504-1 for the "Functional Location"—Step 1310, a subordinate second level 504-2 for "equipment categories"—Step 1320, and subordinate third level 504-3 for "equipment class"—Step 1330, and fourth subordinate fourth level 504-4 for "equipment class type"—Step 1340. Each successive level is subordinate to the preceding level and super ordinate to the next level. Ideally, each hierarchy level is depicted by a two character descriptive abbreviation.

Figure 10:
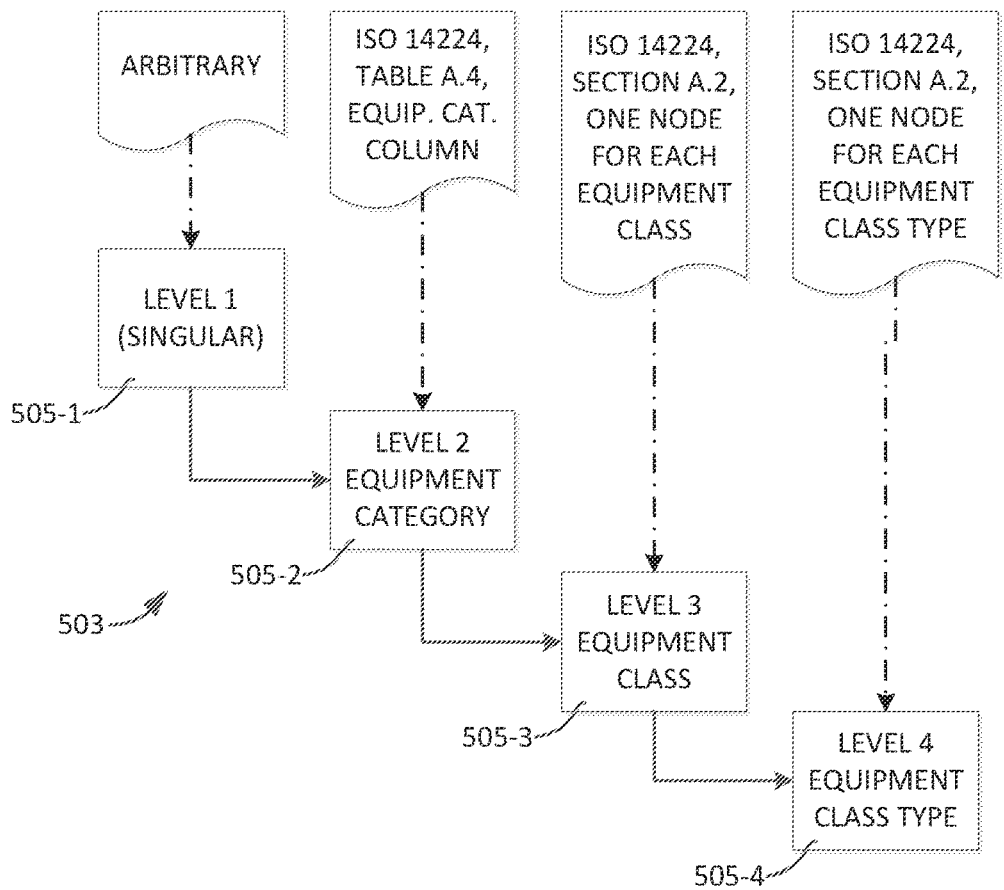
FIG. 10 is a graphic representing the Levels of the Equipment Classification Hierarchy.
Figure 11:
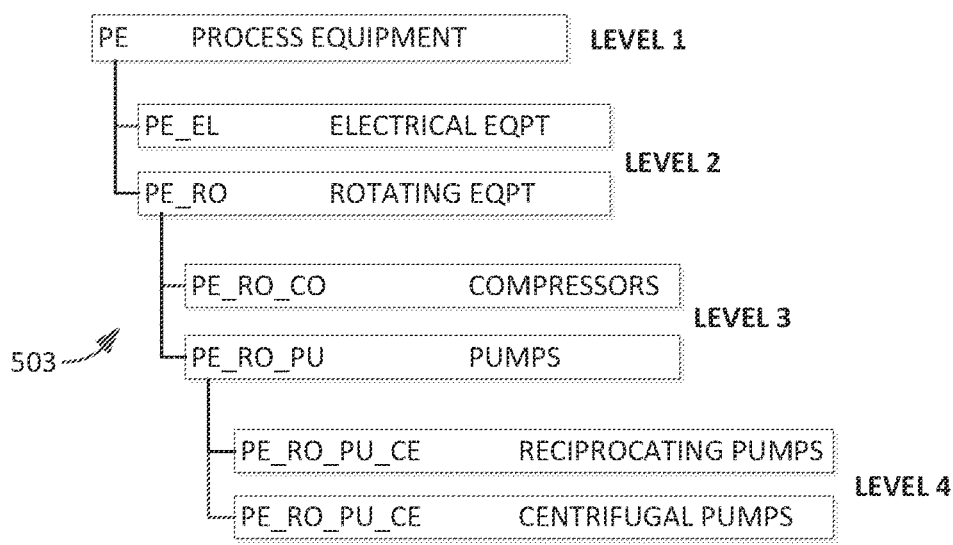
FIG. 11 is a graphic representation of an example of Equipment Classification Hierarchy.

FIGS. 10 and 11 illustrate an exemplary Classification Hierarchy 503. It should be noted that Level 505-2 is ideally derived from or mapped to ISO 14224 Table A.4, particularly the "Equipment Category Column." Likewise, Levels 505-3 and 505-4 are derived from or mapped to ISO 14224 Section A.2 with Level 505-3 representing an "equipment class" and Level 505-4 representing an "equipment type" in the standard. Typically, the Classification Ids 510 follow a four hyphenated sets of two alpha-numeric characters schema 512, namely, XX-XX-XX-XX, as shown in FIGS. 11 and 12.

Creating Equipment Classifications

Figure 13:
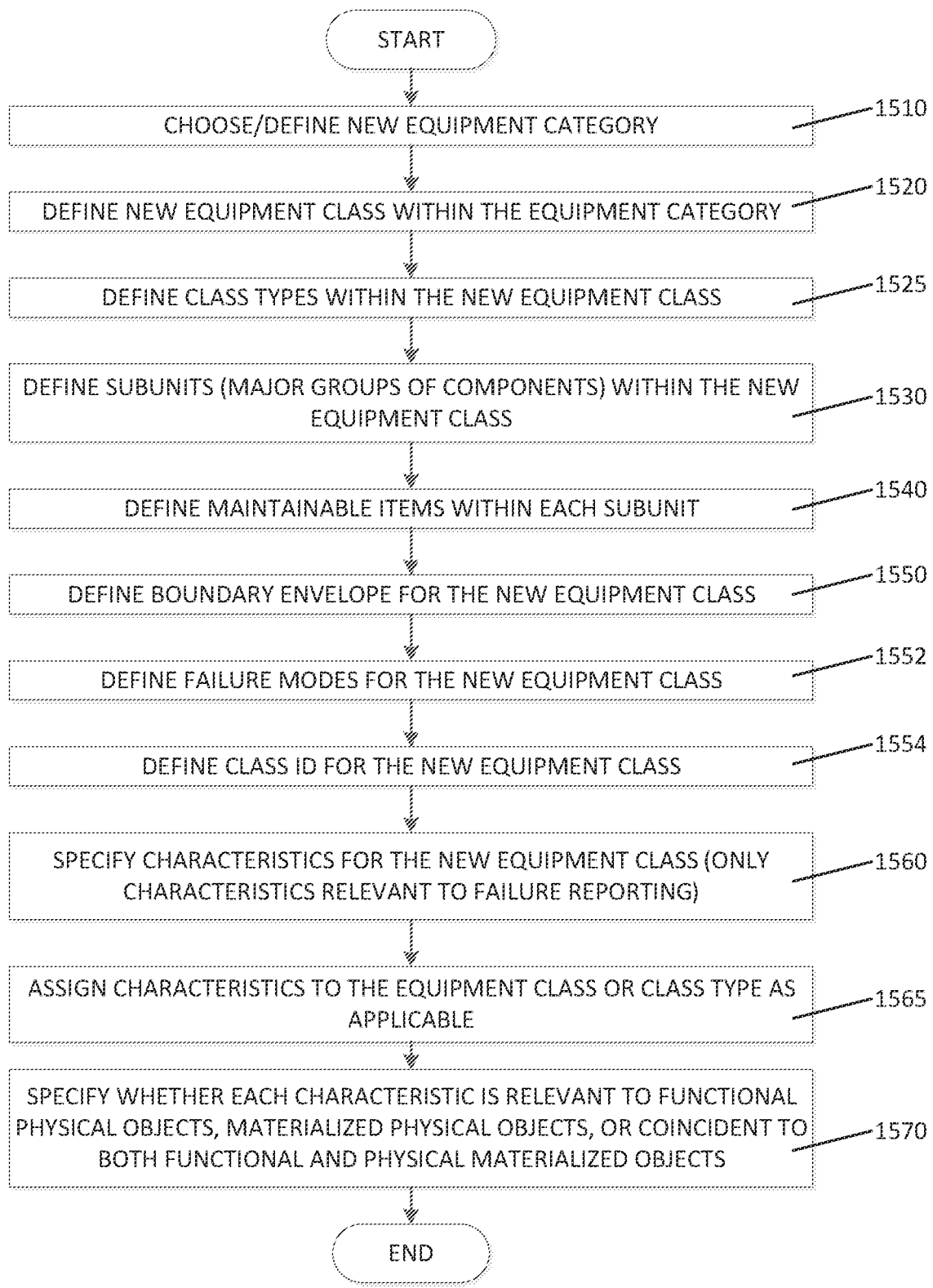
FIG. 13 is a flowchart of an exemplary set of steps for creating an equipment classification.
Figure 14:
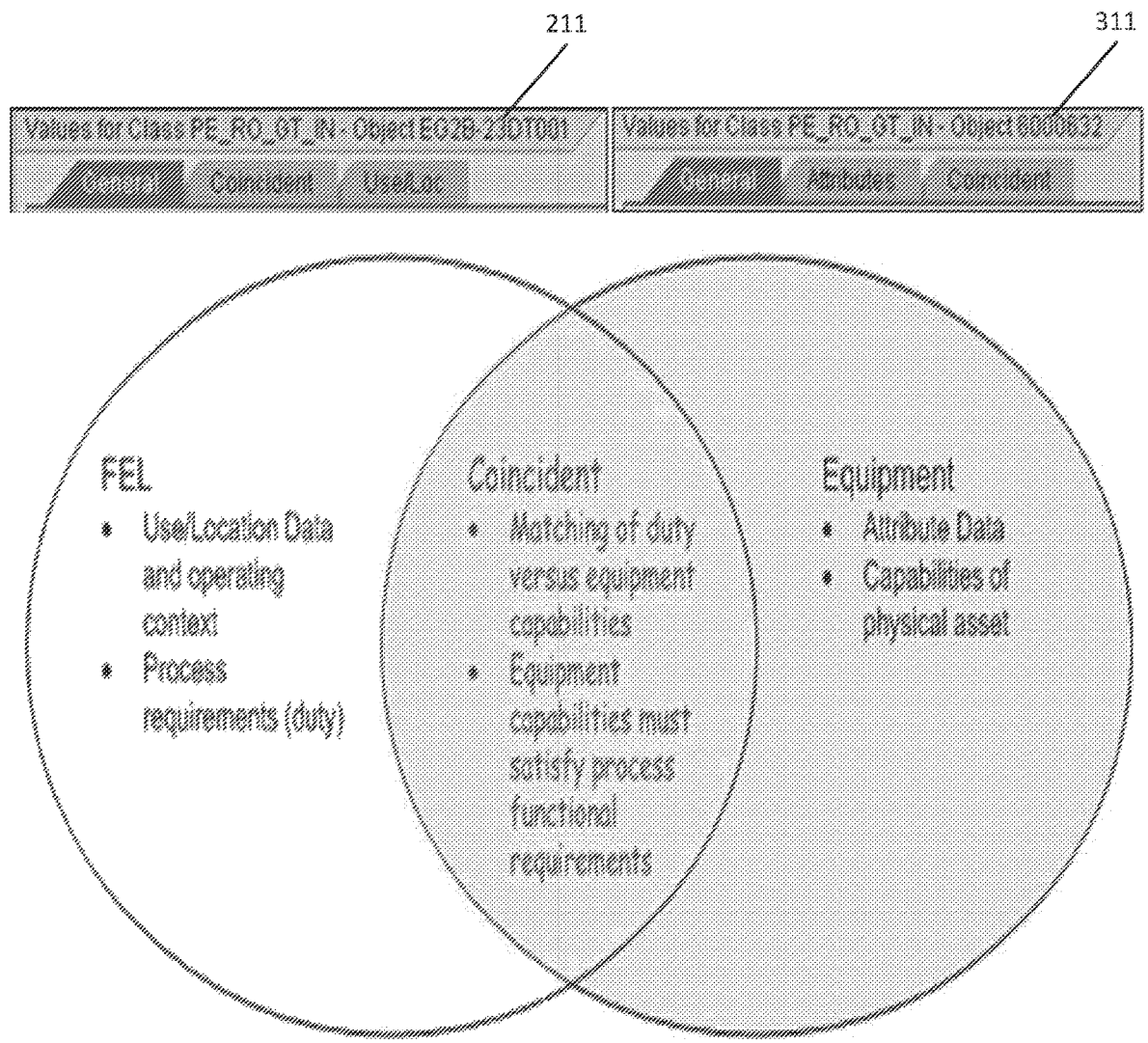
FIG. 14 is a graphic illustrating the coincident characteristics within the ERP/EAM system of FIG. 1.

FIG. 13 depicts in greater detail Step 1500 of FIG. 5 for creating classification structures for both FEL/FCL objects and equipment objects created in ERP/EAM system 100. The creation of an Equipment Classification begins with selecting or defining an Equipment Category 320 within the Equipment data set 300—step 1510. Within each Equipment Category 320, Equipment Classifications 330 are defined— step 1520. Within each Equipment Classification 330, one or more Equipment Classification Types 340 are defined—Step 1525. Within each Equipment Classification 330, subunits (major groups of components) are defined—step 1530. Next, maintainable items 26 are defined for each subunit 22—step 1540. Boundary envelopes are defined for each Equipment Classification 330—step 1550. Failure Modes are defined for each Equipment Classification 330—step—1552. A unique Class ID is defined for each new Equipment Classification 330—step—1554. Next Equipment Characteristics relevant to failure reporting are specified for each Class ID—step 1560. Next, each Characteristic 540 for each Equipment Classification 330 is assigned to either the Equipment Classification 330 or a subordinate Equipment Classification Type 340 as applicable—Step 1565. Next, each Characteristic for each Equipment Classification 330 or Equipment Classification Type 340 is specified as either "functional," "physical" or "Coincident"—step 1570. FIG. 12 is a table of exemplary Characteristics * for a sample Classification ID, namely, PE_RO-PU—"rotary pumps." As shown, the Characteristics are separated by Functional Physical Object and Materialized Physical Object and grouped by "coincident" and other attribute generalizations (See, FIG. 14). It should be noted that for each Classification ID 510 the "coincident" Characteristics are common to both Functional Physical Objects and Materialized Physical Objects.

Creating Catalog Profiles

Figure 15:
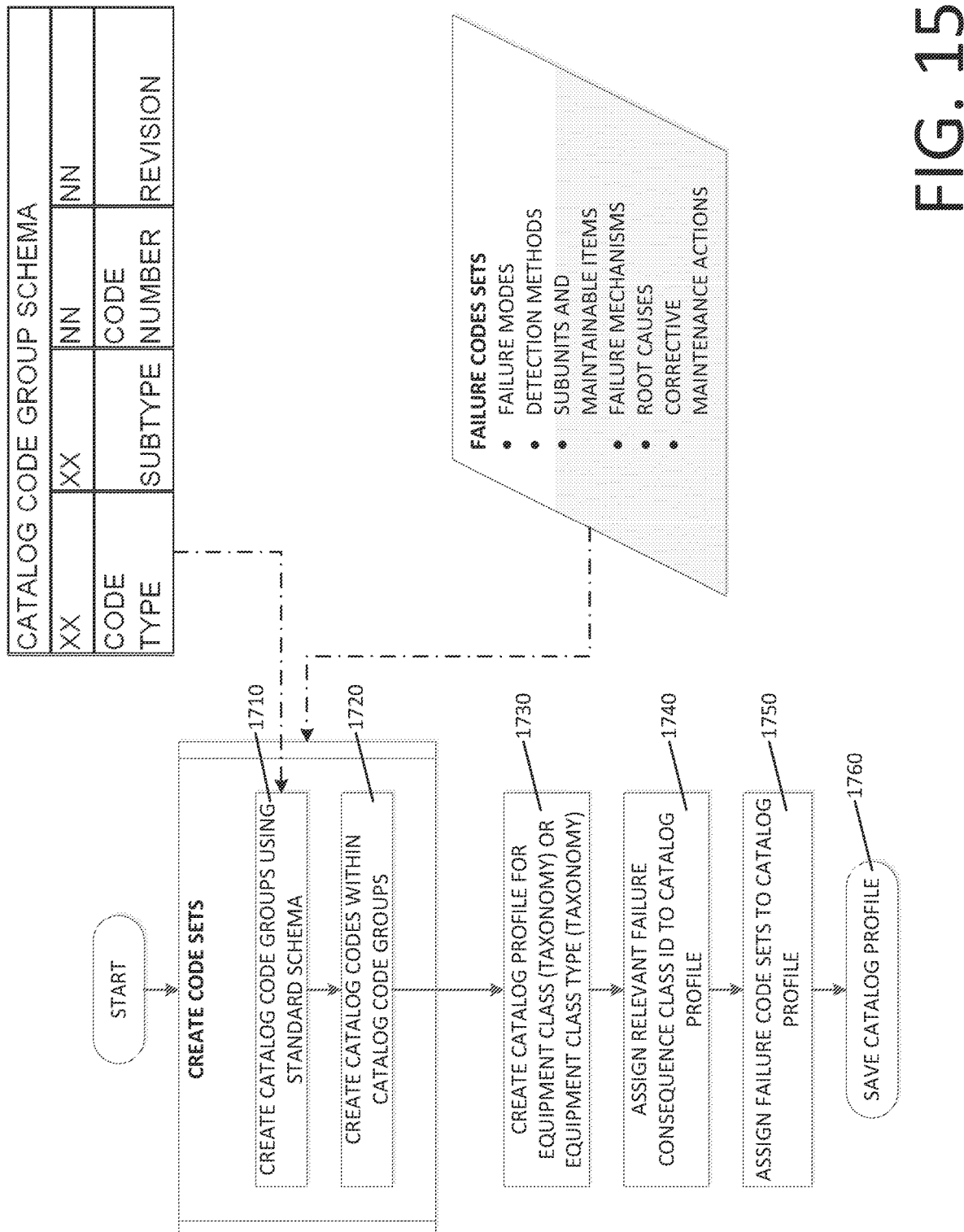
FIG. 15 is a flowchart of an exemplary set of steps for creating Code Sets.
Figure 16:
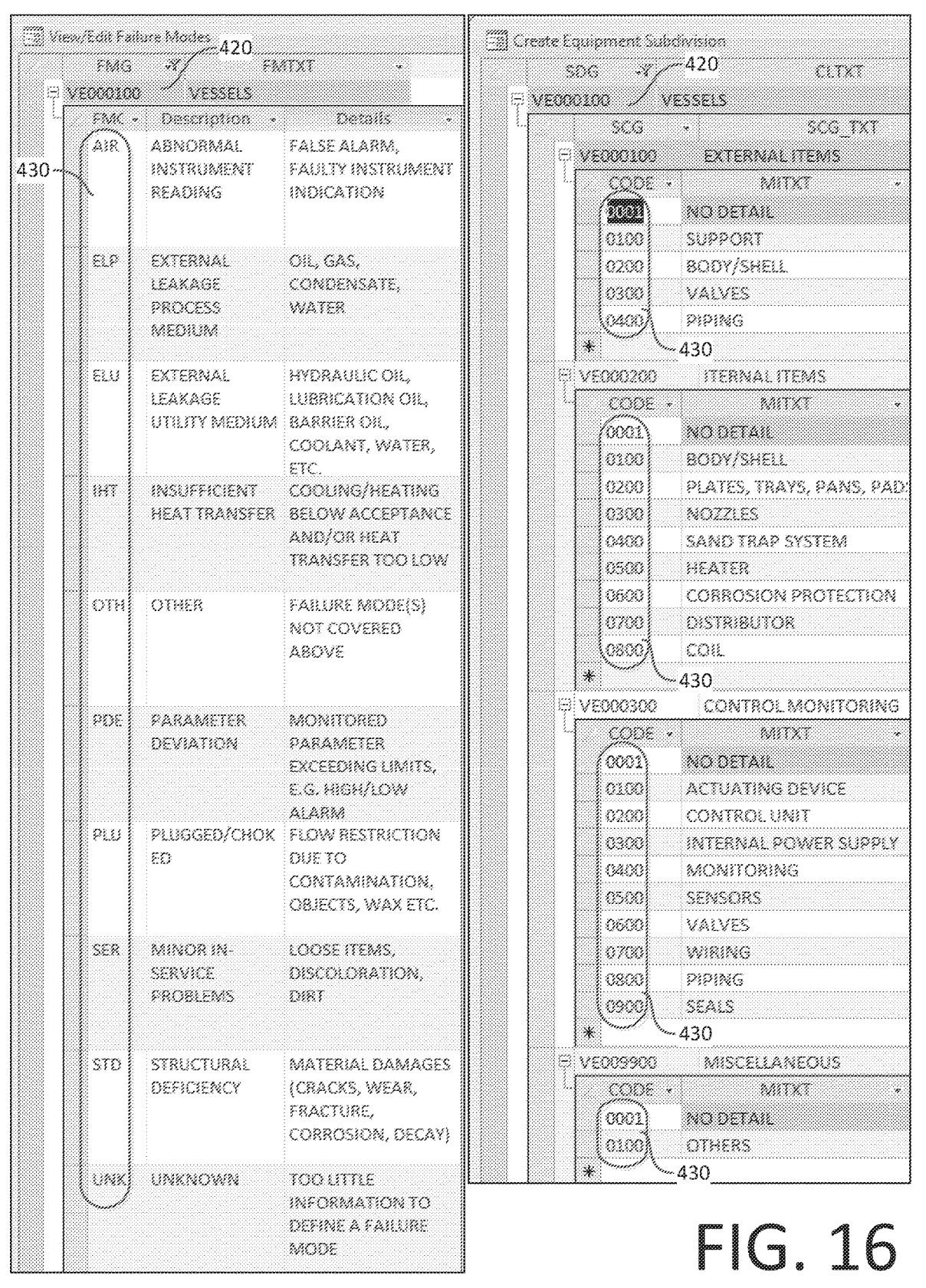
Figure 18:
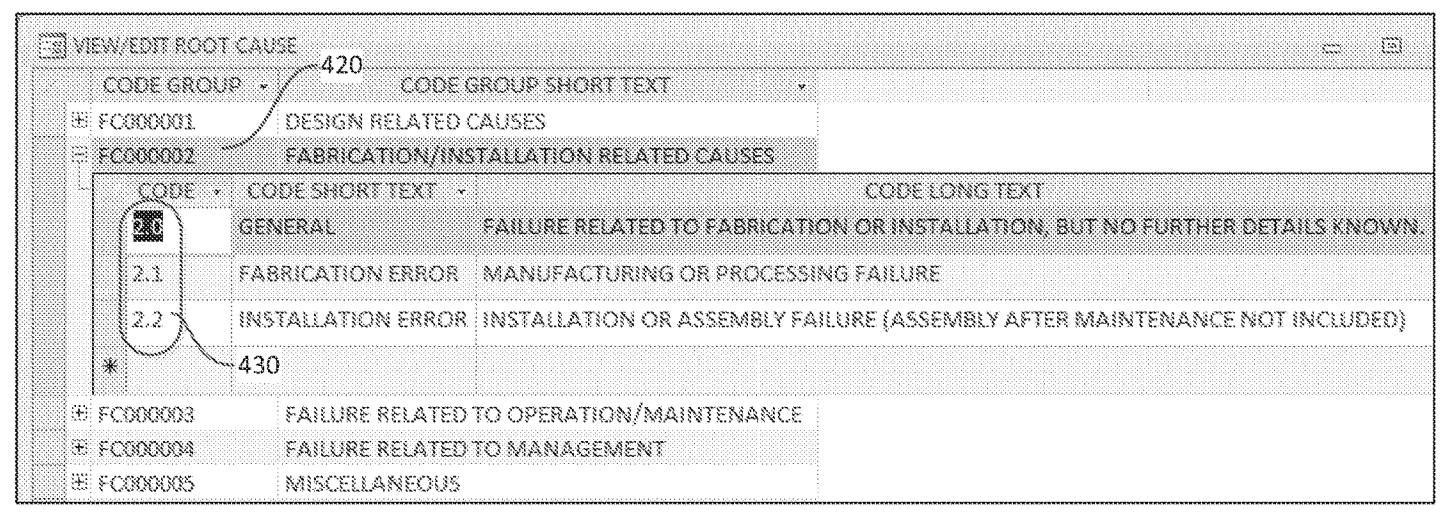

FIG. 15 depicts in greater detail Step 1700 of FIG. 5, for creating Catalog Profiles 410 in the ERP/EAM system 100. Creating a Catalog Profile 410 begins with the creation of Catalog Code Groups 420 under a standardized schema— Step 1710. As shown, every Catalog Code Group 420 is identified by a standardized schema consisting typically of an eight alpha-numeric character string of four character pairings arranged by "code type," "subtype," "code number" and "revision." It should be noted that the last digit pairing for "revision" allows ERP/EAM system 100 to properly track and archive changes in both functional location and materialized objects that demand a modification to a given Code Group 420. Next, Catalog Code Sets 430 are created within the Catalog Code Groups 420—Step 1720. It should also be noted that catalog groups and code sets are created specifically for failure data, Failure Code Groups 440 and Failure Code Sets 450. As shown, Failure Code Sets 440 may be created for various failure events and conditions, particularly, failure modes, detection methods, subunit and maintainable items, root causes, and corrective maintenance actions. Failure Code Sets 440 are ideally derived from industry standards, such as ISO 14224 Section B. Furthermore, Failure Consequence Categories and qualitative values are derived from the consequence matrix from industries, particularly ISO 14224 Table C.1. FIGS. 16-19 are portions of exemplary screen displays that illustrate examples of "general" Catalog Code Groups 420 and Code Sets 430, as well as examples of Failure Code Groups 440 and Failure Code Sets 450.

With Catalog Code Groups 420 and Catalog Code Sets 430 created, Catalog Profiles 410 are created for either the Equipment Class Type 340 or the Equipment Classification 330 of each FEL Master Record 204 and FCL Master Record 206—Step 1730. Next, each Catalog Profile is assigned a relevant Classification ID 510 for "Failure consequences"— Step 1740. Each Catalog Profile is also assigned a Failure Code Sets 440—Step 1750. Lastly, the Catalog Profile is compiled and saved with ERP/EAM system 100—Step 1760.

Creating Adjoining Functional Locations

Figure 20:
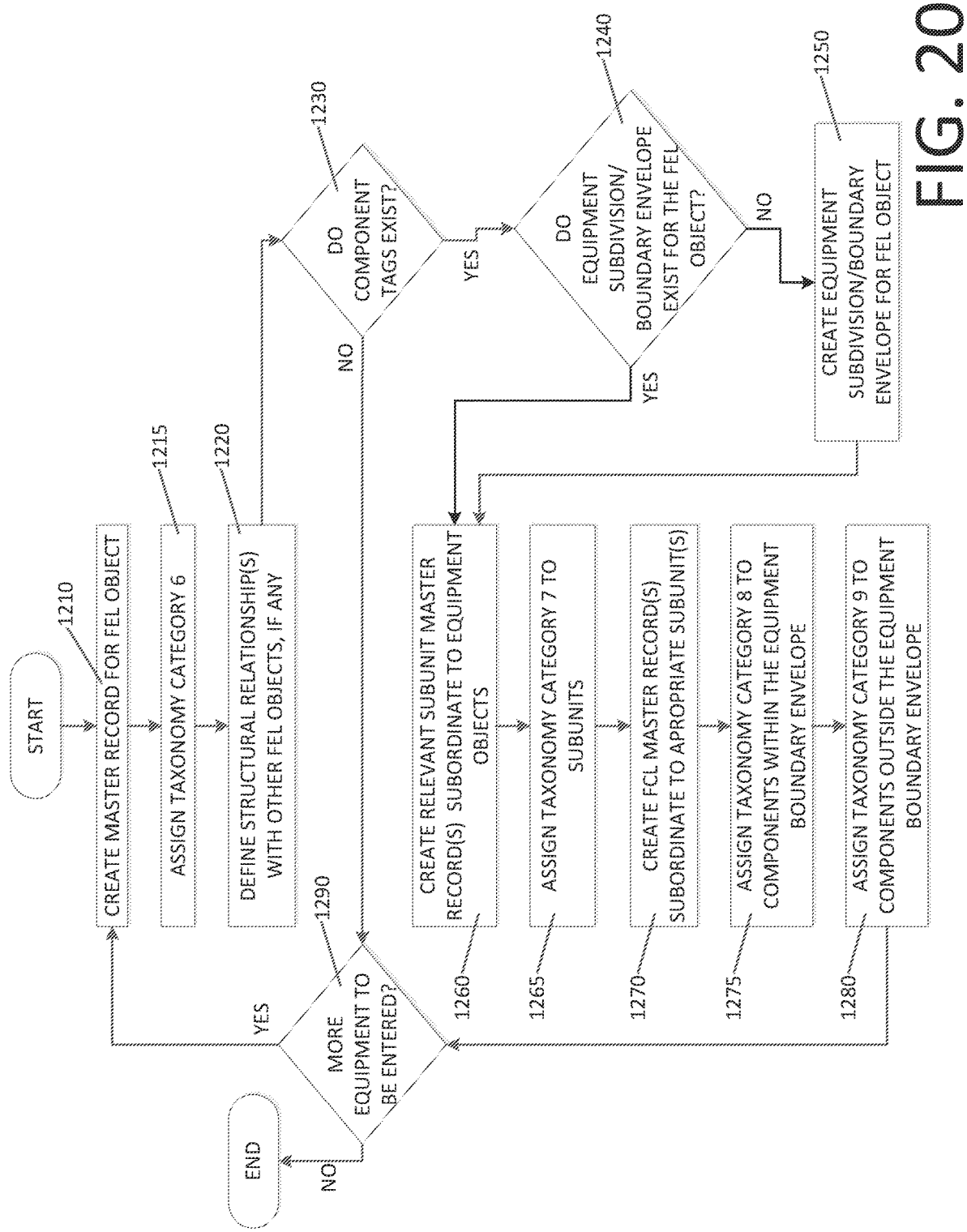
FIG. 20 is a flow chart of an exemplary set of steps for creating adjoining FEL, Subunit and FCL Master Records in the Functional Location Data Set.

FIG. 20 depicts in greater detail Step 1200 of FIG. 5. First, Functional Equipment Location (FEL) Master Records 202 are created within the Functional Location Data Set 200 for each equipment object identified in the P&IDs—1210. Each FEL Master Record 202 is assigned an FEL Category 220 value of "6"—step 1215. Next, each FEL Master Record 202 is identified and defined in relationship to the other equipment objects within associated P&ID—step 1220. For each equipment object, a determination regarding the existence of components tags within the P&ID is made—step 1230. If no component tags exist, the next Master FEL Record 202 is created for the next equipment object—step 1290. If a component object tag in the P&ID exists, a determination is made as to the existence of the equipment subdivision or boundary envelope for the equipment object—step 1240. If equipment subdivision/boundary envelopes exist for the equipment object, Subunit Master Records 204 are created within the FEL data set 200 for each subunit object, which is subordinate to the equipment object—step 1260. Each Subunit Master Record 204 within the FEL Data Set 200 also has its own unique Functional Location ID 210. Each subunit Master Record is assigned a Functional Location Category 220 value of "7"—step 1265. If component objects exist in relation to the equipment objects or various subunit objects, Functional Component Location (FCL) Master Records 206 are created within the FEL Data Set 200 for each component object, which is subordinate to the subunit object—step 1270. Again, each FCL Master Record 206 has its own unique Functional Location ID 210. Each FCL Master Record 206 is assigned a Functional Location Category 220 value of "8"—step 1275. Components outside the equipment Boundary Envelope are assigned a Functional Location Category 220 value of "9"—step 1280. If no equipment subdivision/boundary envelope exists for the equipment object, an equipment subdivision/Boundary envelope is created for the functional equipment object— step 1250.

Assigning Characteristics

Figure 25:
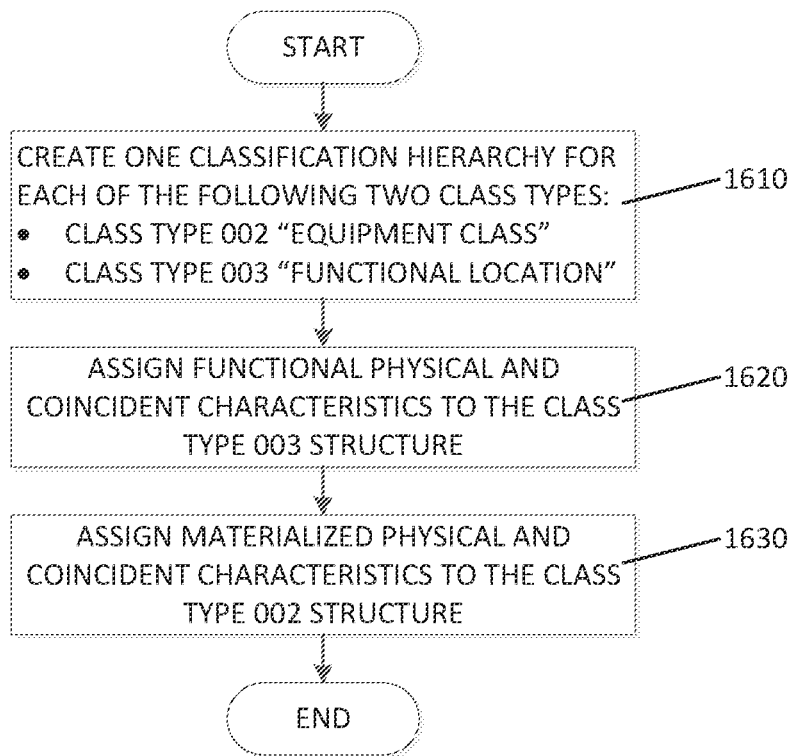
FIG. 25 is a flowchart of an exemplary set of steps for assigning Characteristic sets.
Figure 28:
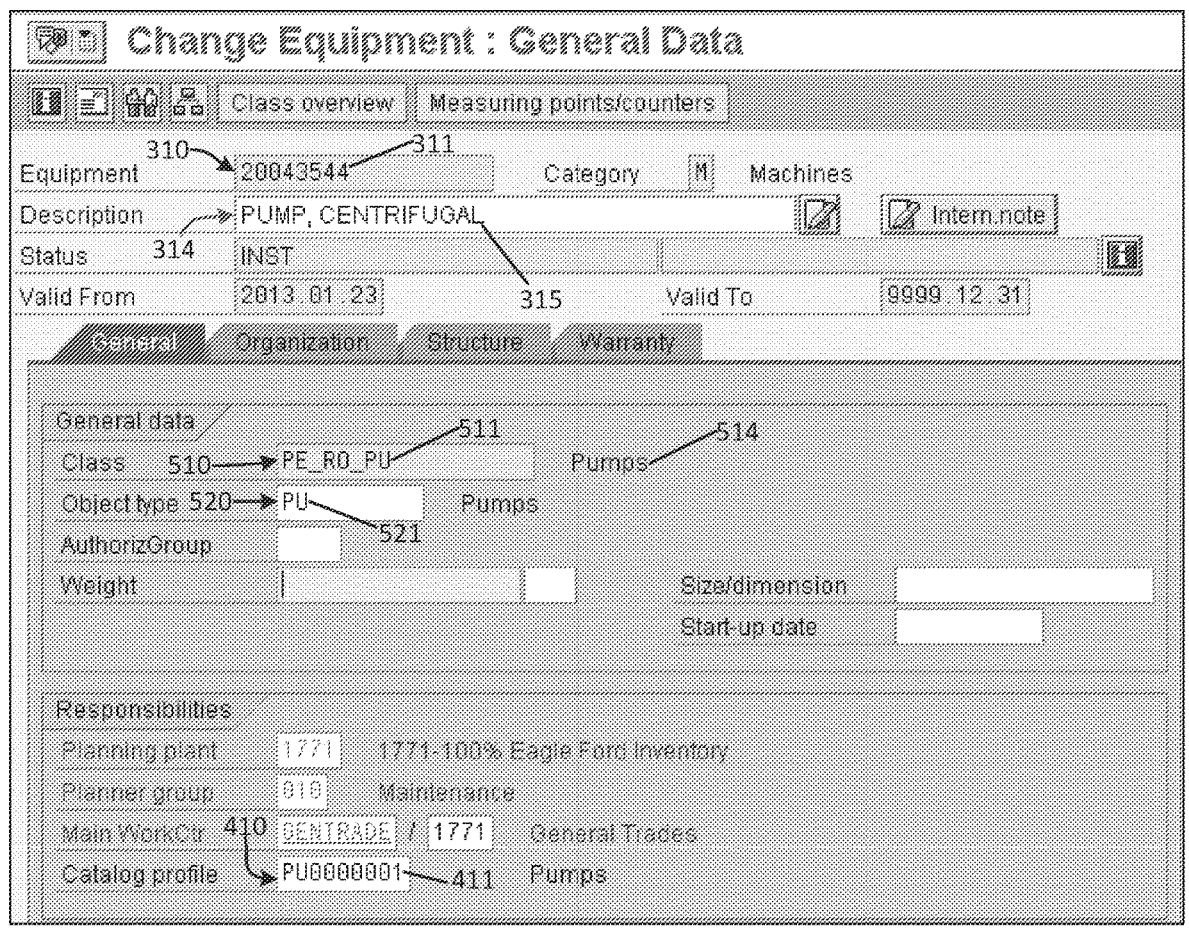
Figures 29, 30:
Figure 31:

FIG. 25 depicts in greater detail Step 1500 of FIG. 5 for creating Classification Hierarchy 503 for both FEL/FCL and Equipment Objects in ERP/EAM system 100. First, identical copies of each Classification Hierarchy 503 are created for Classification Types 520 having an equipment class type value "002" and functional location class type value "003"—Step 1610. Next, Functional Physical and Coincident characteristics are assigned to Class Types 520 having a functional location class type value "003"—Step 1620. Then, Materialized physical and coincident characteristics are assigned to Class Type 520 having equipment class type value "002"—Step 1630.

Failure Reporting

ERP/EAM system 100 provides multi-leveled failure event and analytical reporting. Multi-Level Failure Reporting is enabled by the Equipment Taxonomy 110. As shown n FIG. 39, Multi-Level Failure Reporting imposes certain additional requirements on the Equipment Taxonomy 110. As shown, the Equipment Taxonomy 110 aligns FEL substructures with equipment class boundary definitions—Requirement 2010. The Equipment Taxonomy 110 requires all malfunction reports be generated at FEL or FCL/sub-component levels—Requirement 2020. The Equipment Taxonomy 110 must use a Multi-level Malfunction Reporting process to ensure one FEL level report is always generated for any failure event within an equipment boundary envelope—Requirement 2030. Lastly, the Equipment Taxonomy 110 must capture use/location master data under the Equipment Classification Hierarchy 503—Requirement 2040.

Figure 41:
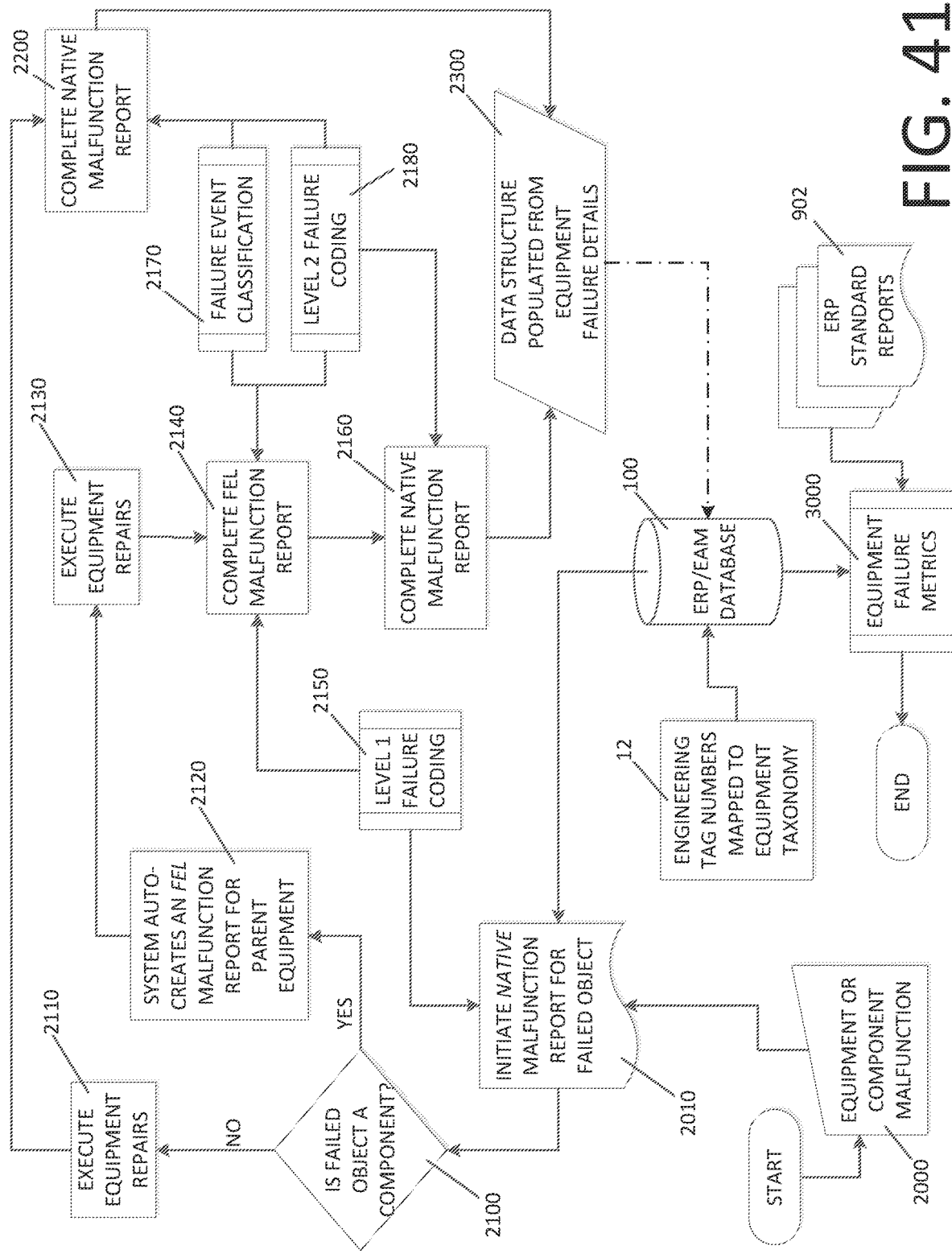
FIG. 41 is a flow chart of exemplary set of steps for creating the multi-leveled failure reports in the ERP/EAM system of this invention.

FIG. 41 depicts an exemplary set of steps for creating the Multi-Level Failure Reports in the ERP/EAM system 100. The malfunction of any piece of equipment or equipment component malfunction triggers the creation of a malfunction report—Step 2000. First, a Native Malfunction Report 602 is initiated within ERP/EAM system 100—Step 2010.

Figure 43:
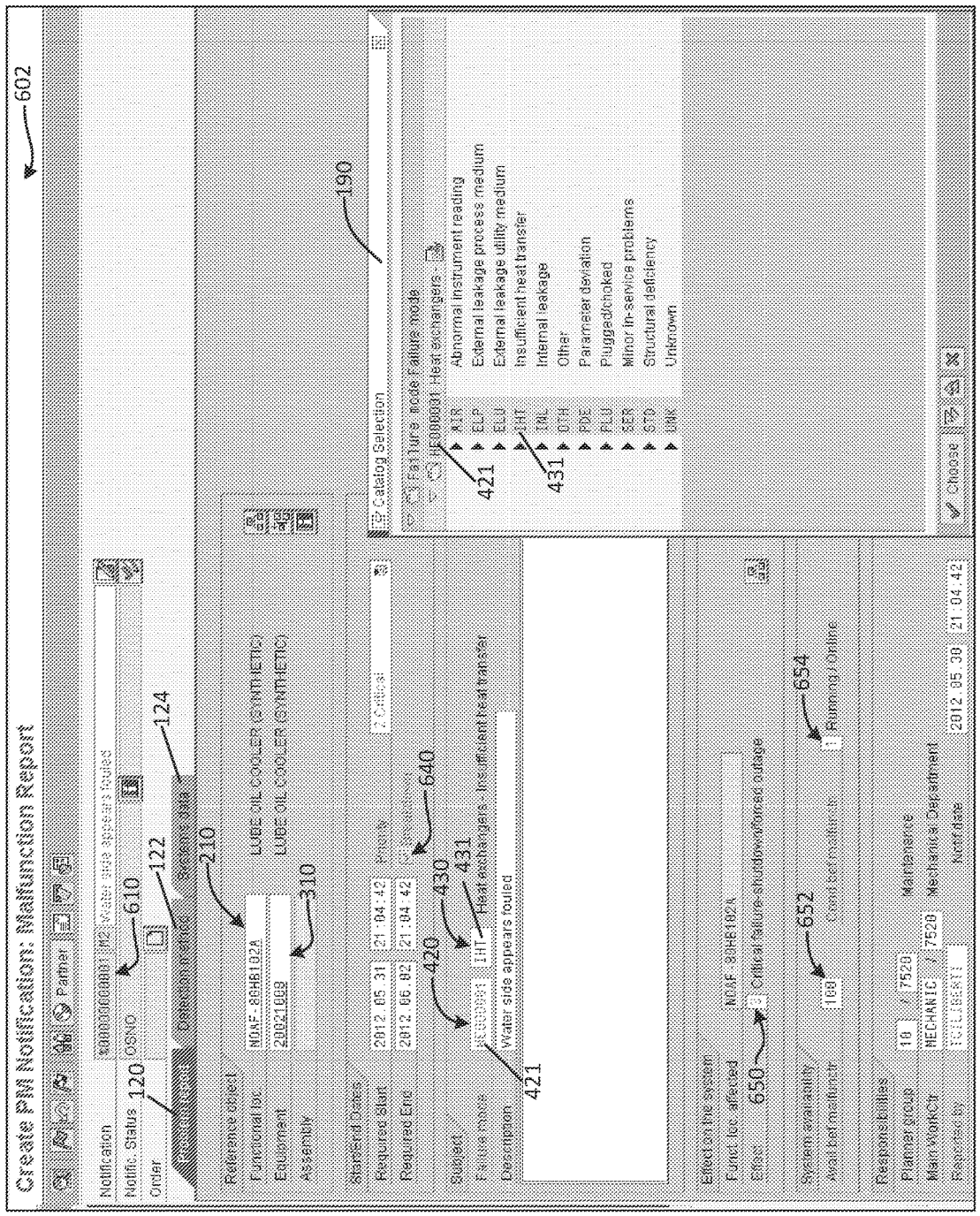
Figure 47:
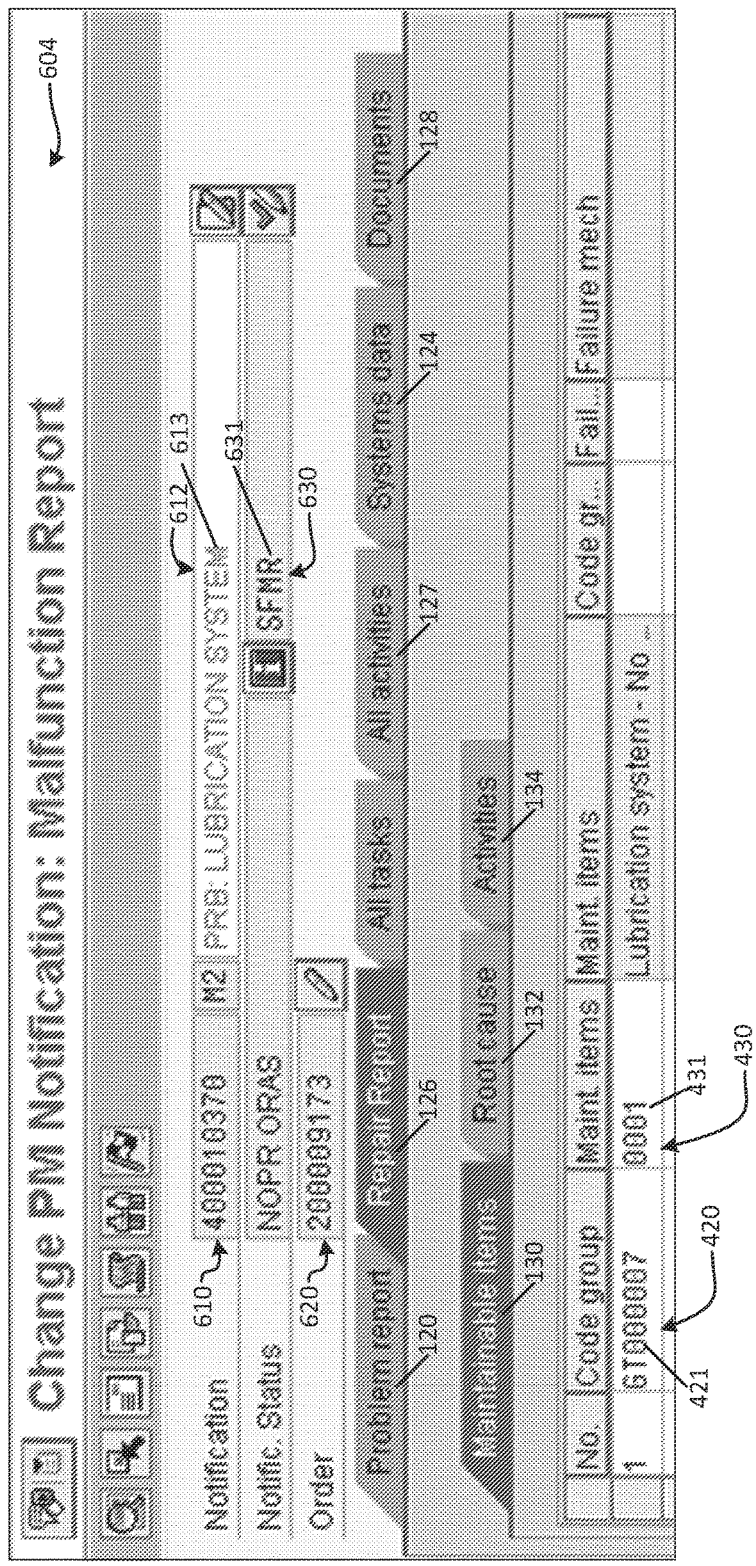
Figure 48:
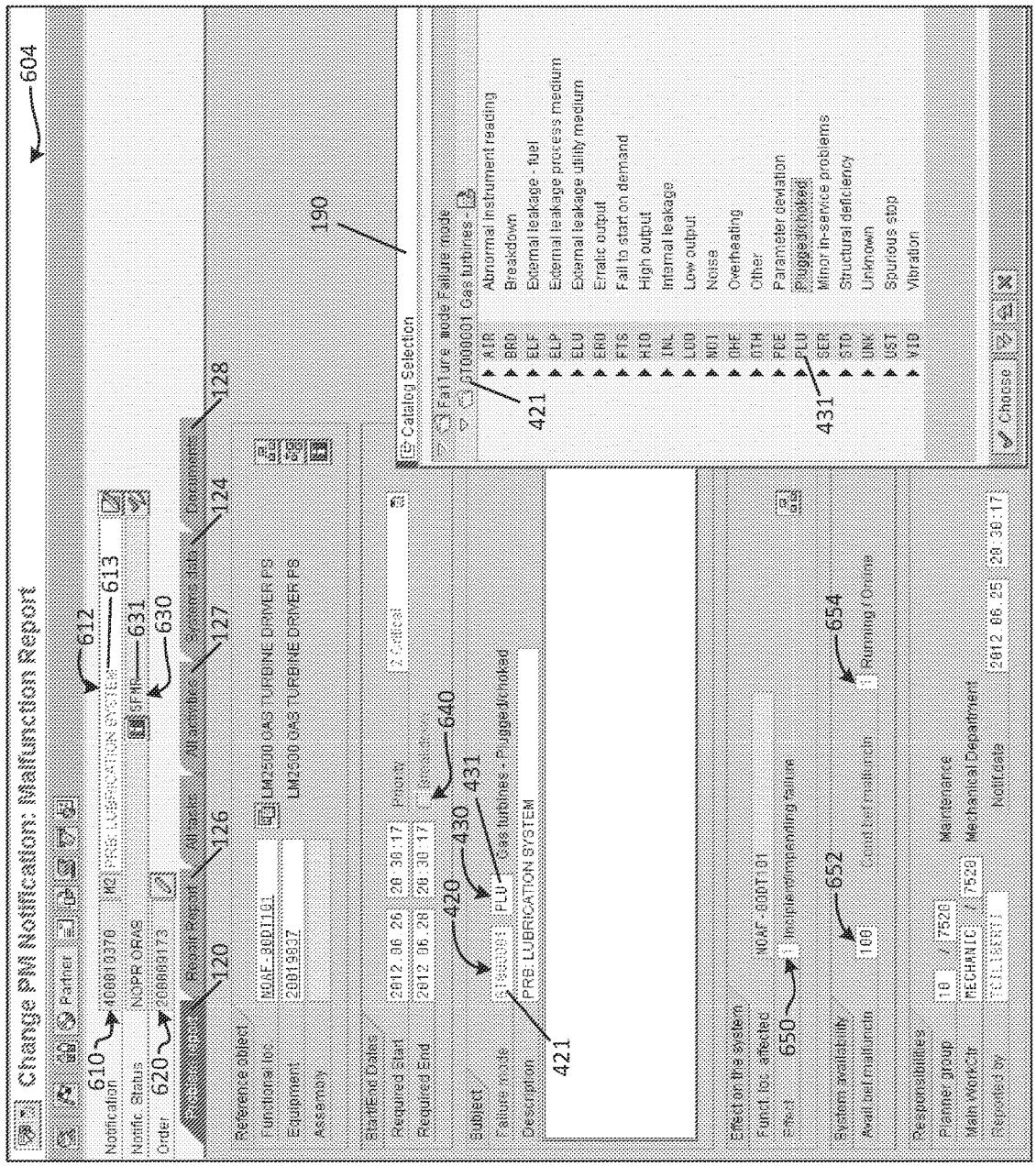
Figure 50:
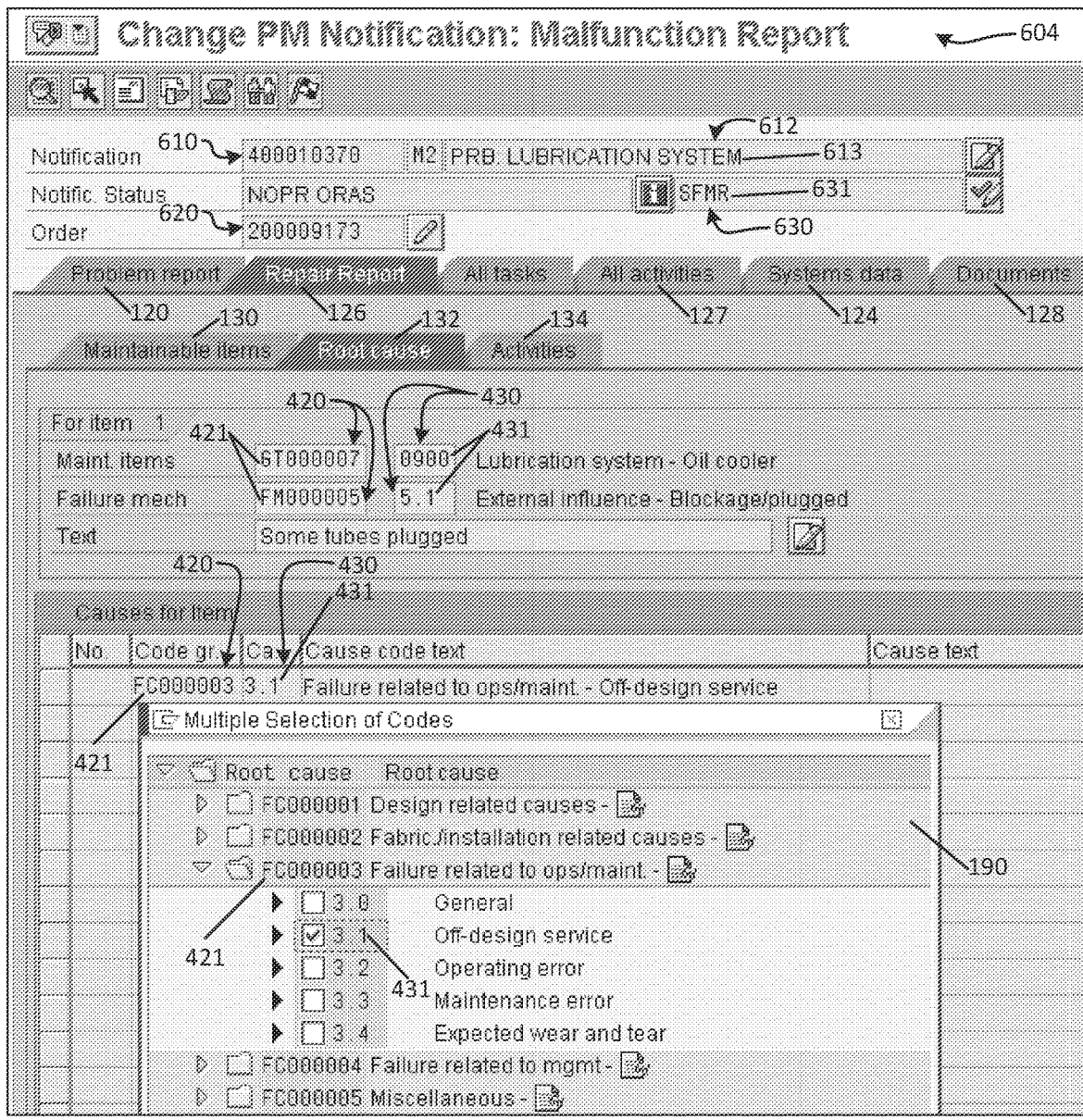
Figure 51:
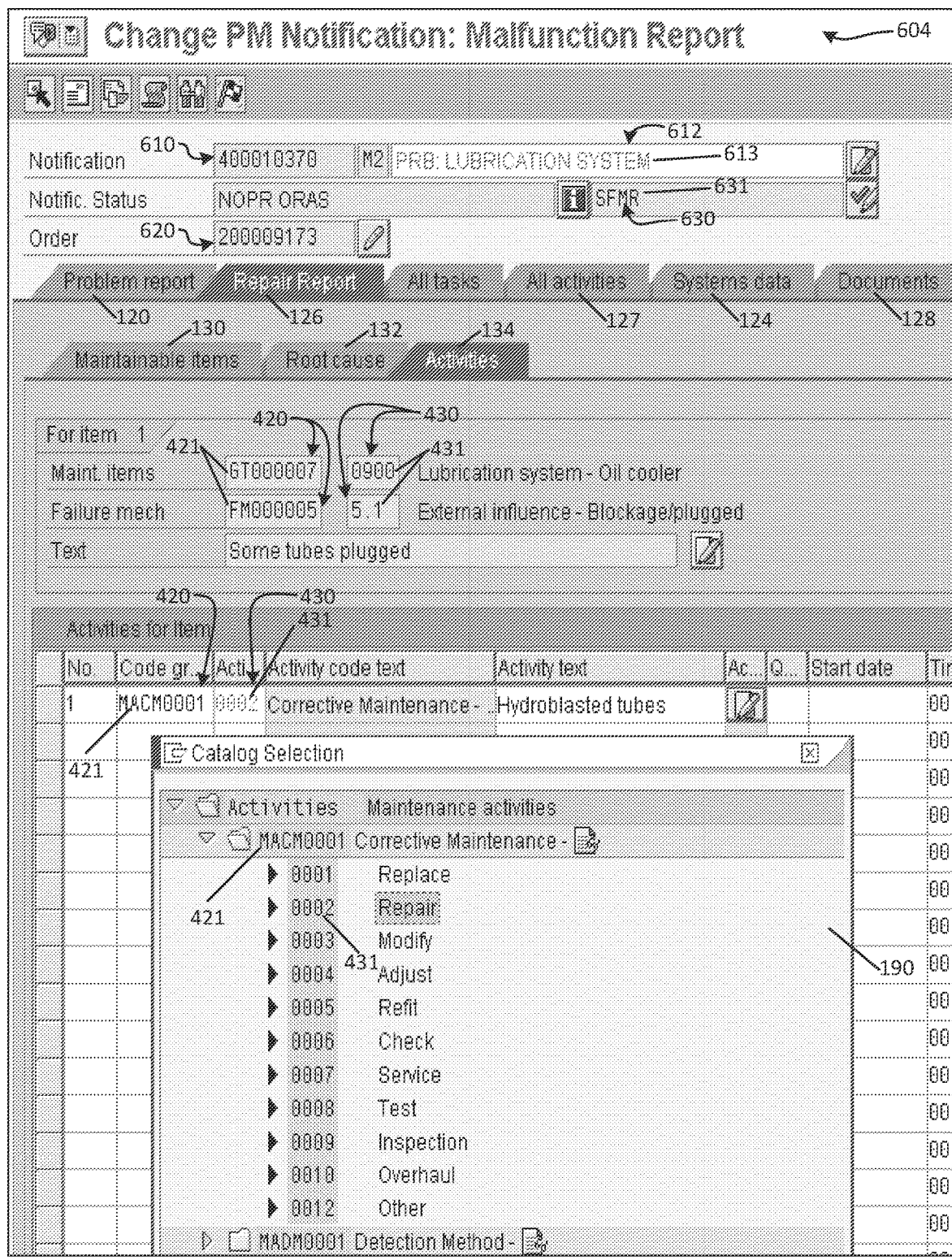
Figure 52:
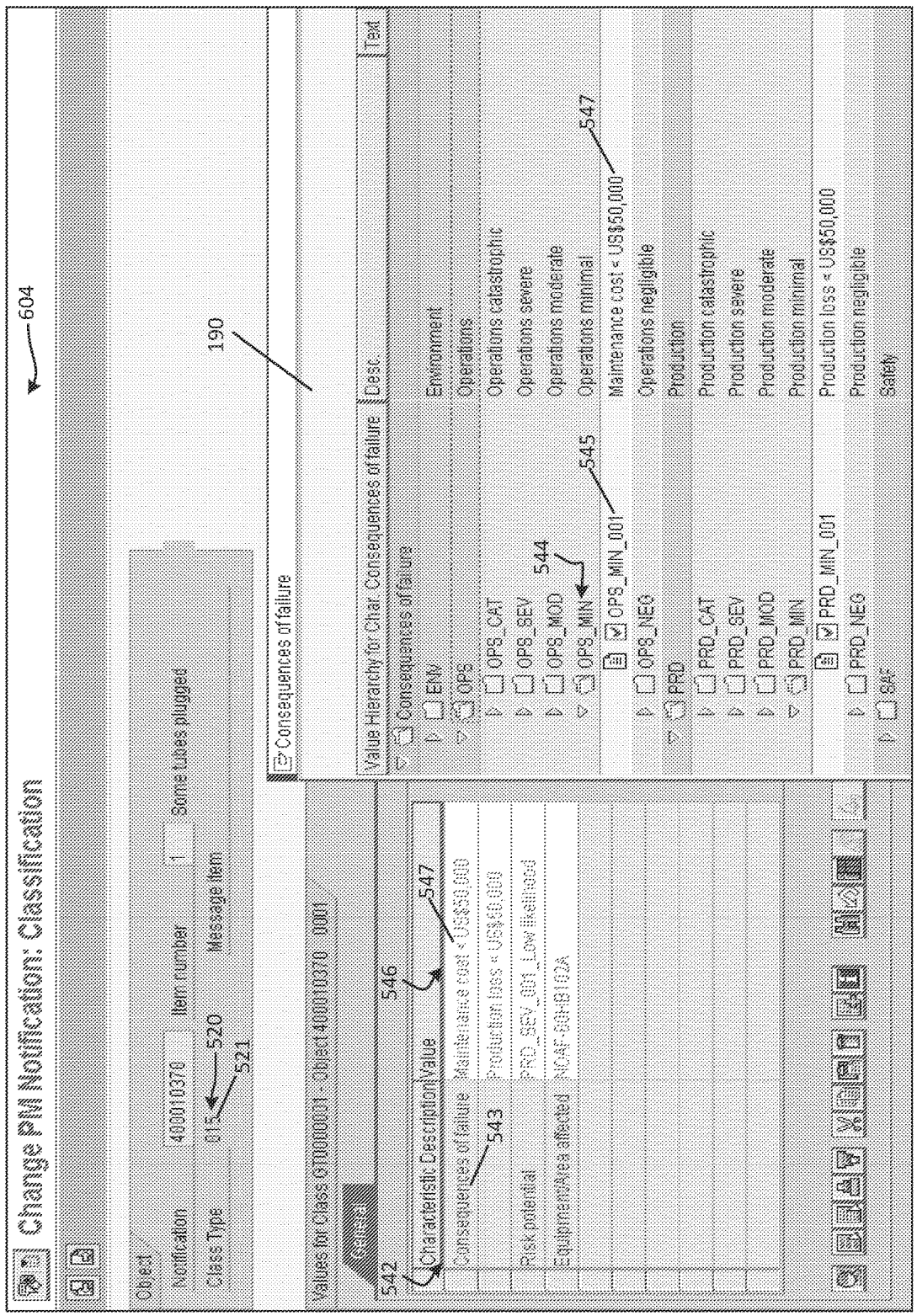
Figure 53:
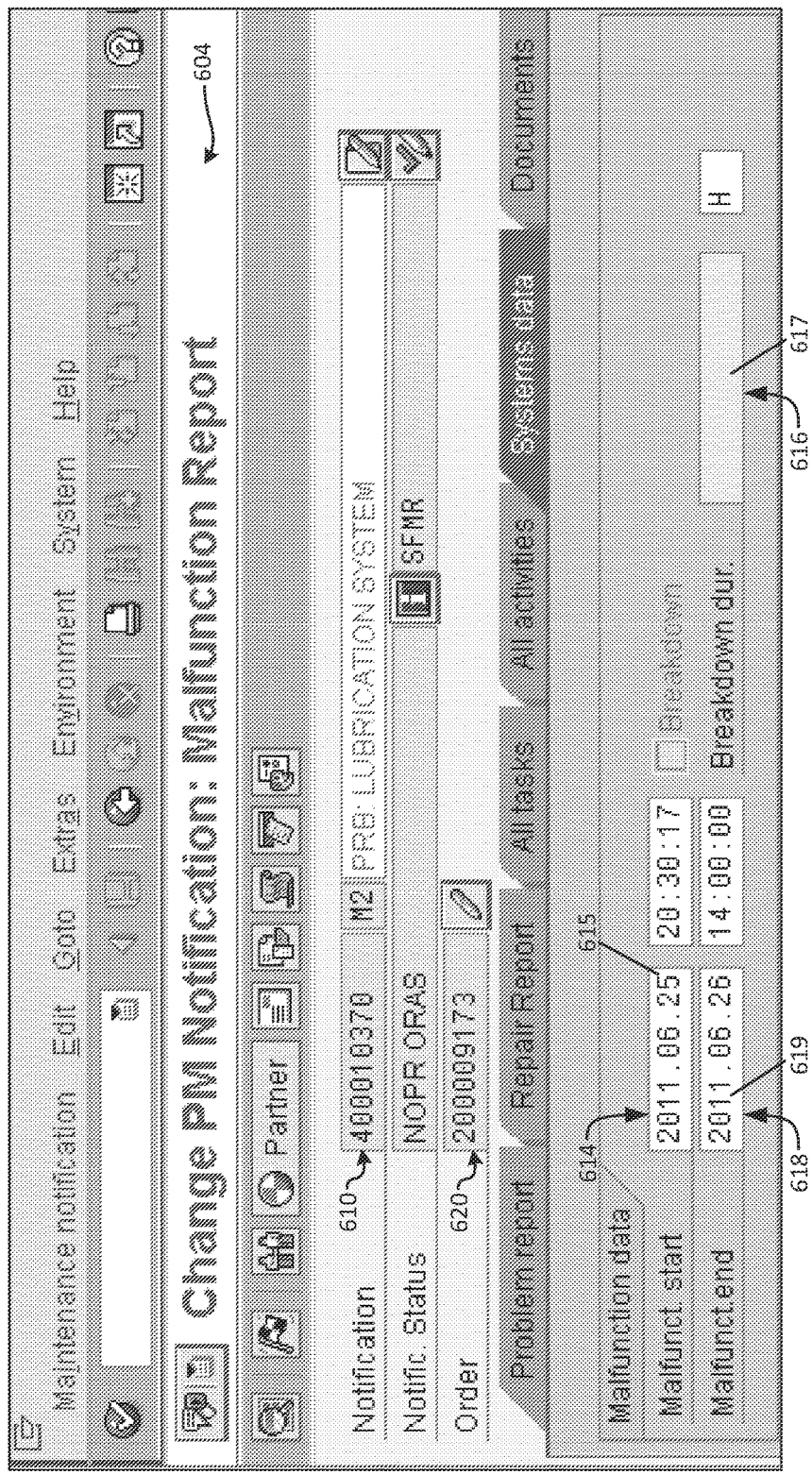
Figure 54:
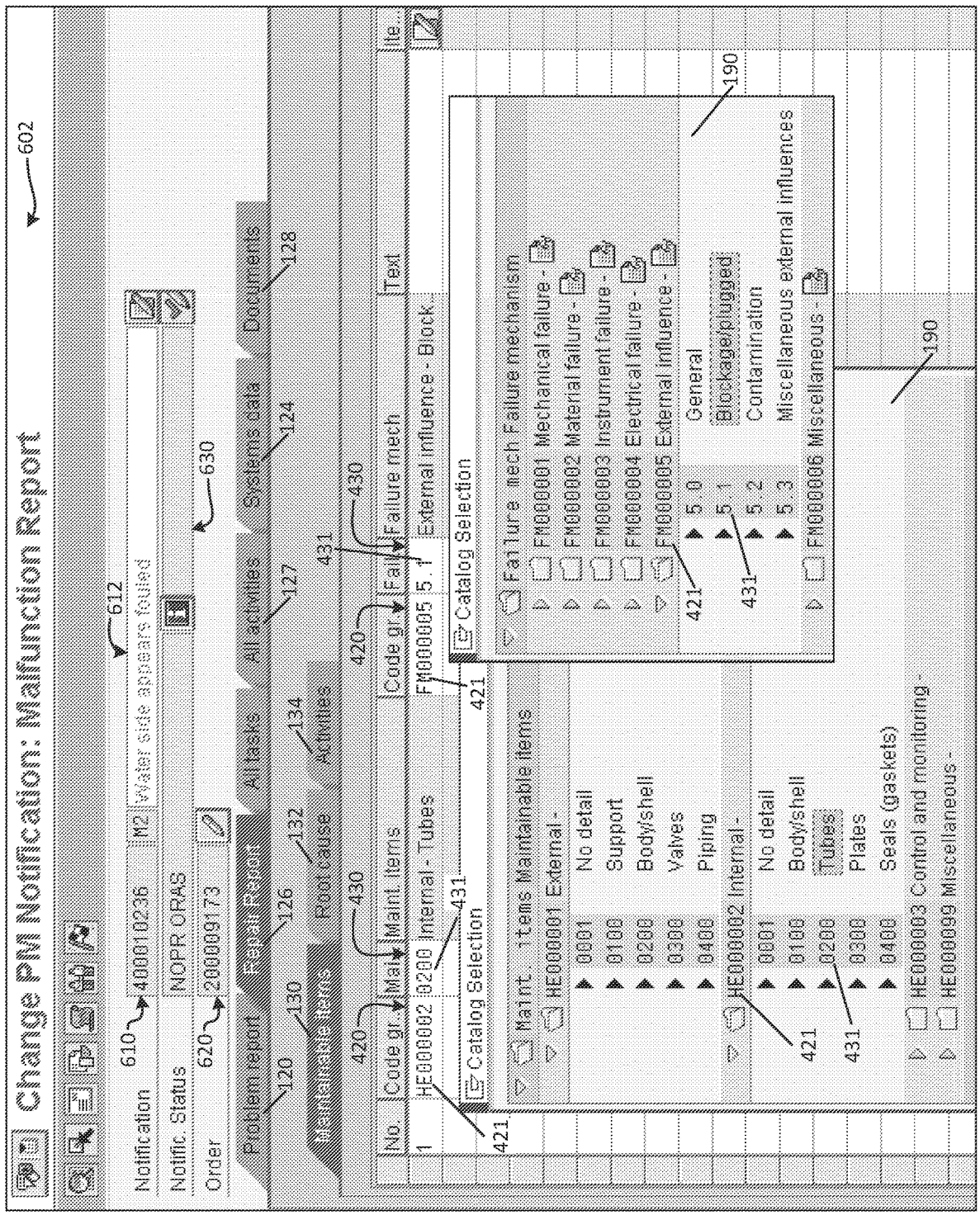
Figure 57:
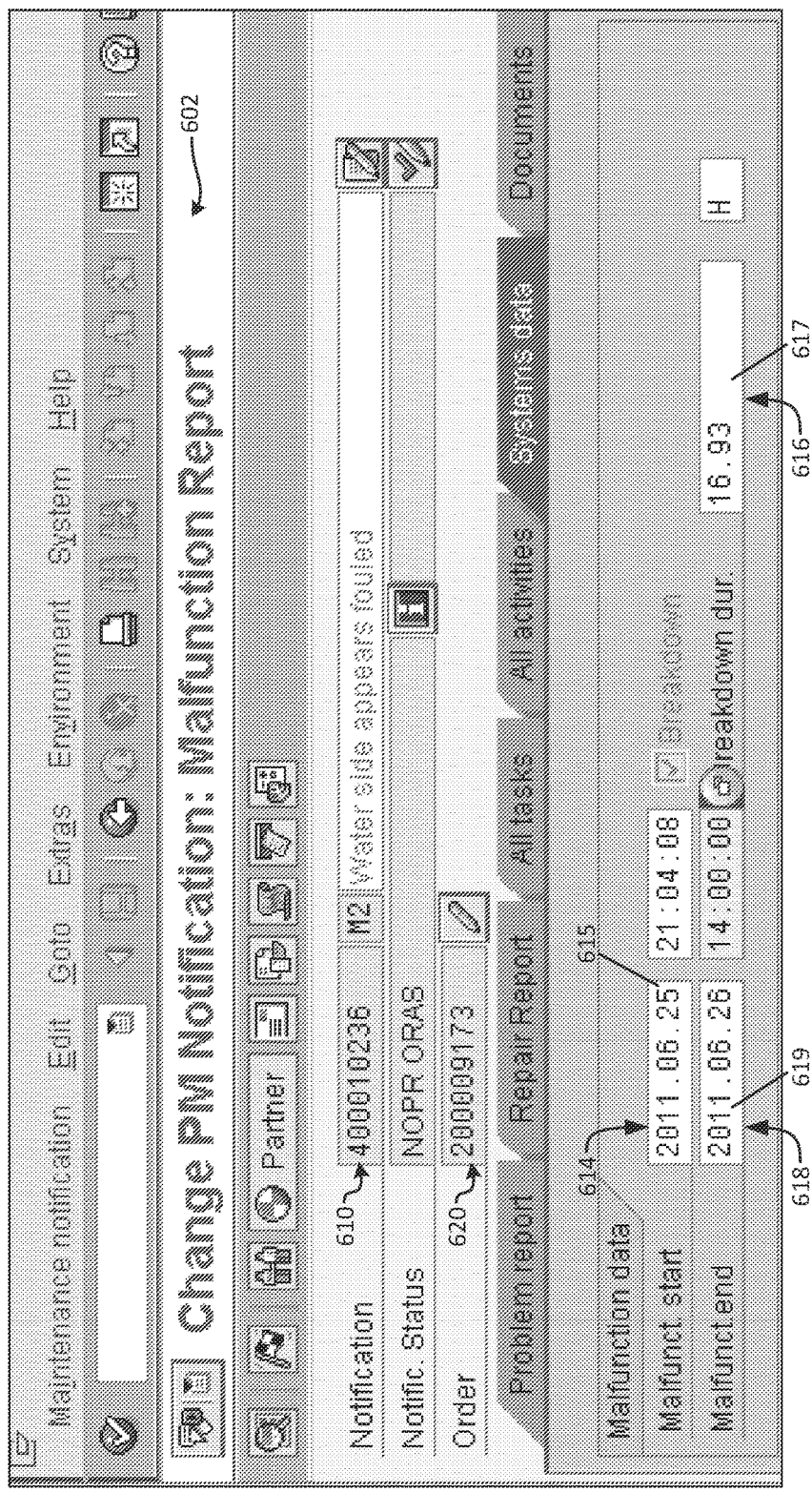

FIGS. 42-57 are exemplary screen displays illustrating the initiation of the Malfunction Report 600 of a malfunctioning "lube oil cooler." As shown in FIG. 42, Functional Location ID 510, "NOAF-80XM102A" is selected for FEL Master Records 202 and "Malfunction report" is selected from the "Create notification" drop down menus 190. ERP/EAM system 100 generates a Notification with a temporary Notification ID value 611 of "00000000001" and displays a Malfunction Report Screen. FIG. 43 is an exemplary Malfunction screen display under the "problem Report" display tab 120. ERP/EAM system 100 automatically populates Functional ID 210, and equipment ID 310 from their respective data sets under the "Problem Report" display screen tab 120. Under the "Problem Report" display tab 120, users input Level 1 Failure coding at Step 2150 by entering selections for various data fields from various drop down menus 190, particularly Breakdown 640, "Failure Mode" Code Group 420, "Failure Mode" Code 430, Effect on system 650, Availability before Malfunction 652, and Condition before Malfunction 654. FIG. 44 is an exemplary Malfunction screen display under the "Detection method" display tab 122. As part of Step 2150, users select items 431 "continuous condition monitoring" from another drop down menu of Failure Codes 430 under the selected Code Group 421 "Detection Method" in the Catalog Code Group 420 column in the displayed table. On save, the ERP/EAM system 100 validates user entries (as discussed below in relation to FIG. 69) and replaces the temporary Notification ID value 611 with a permanent value "400010236" in Notification ID 610.

Referring back now to FIG. 41, a determination is made as to whether the failed object is an equipment component—Step 2100. If the failed object is an equipment component, ERP/EAM system 100 auto-creates a separate FEL Malfunction Report 604 for the parent FEL. The programmatic steps performed by ERP/EAM system 100 at Step 2120 of FIG. 41 are discussed further below. Next, equipment repairs are executed—Step 2130. Next, the user completes the FEL Malfunction Report 604—Step 2140. The completion of the FEL Malfunction report 604 involves Level 1 Failure Coding—Step 2150, Level 2 Failure Coding—Step 2180, and Failure Event Classification—Step 2170. Next, the user completes the Native Malfunction Report 602—Step 2160. The completion of the FEL Malfunction report 604 involves Level 2 Failure Coding—Step 2180. It should be noted that Level 1 and 2 failure coding refer to the first and second rows of screen display tabs that appear in the Malfunction Report screen displays within ERP/EAM system 100. Level 1 screen tabs include: "Problem report" tab 120, "Detection method" tab 122, "System data" tab 124, "All activities" tab 127, "Documents" tab 128 and others. Level 2 screen tabs include: "Maintainable items" tab 130, "Root cause" tab 132 and "Activities" tab 134. See, FIGS. 45 and 46.

Figure 45:
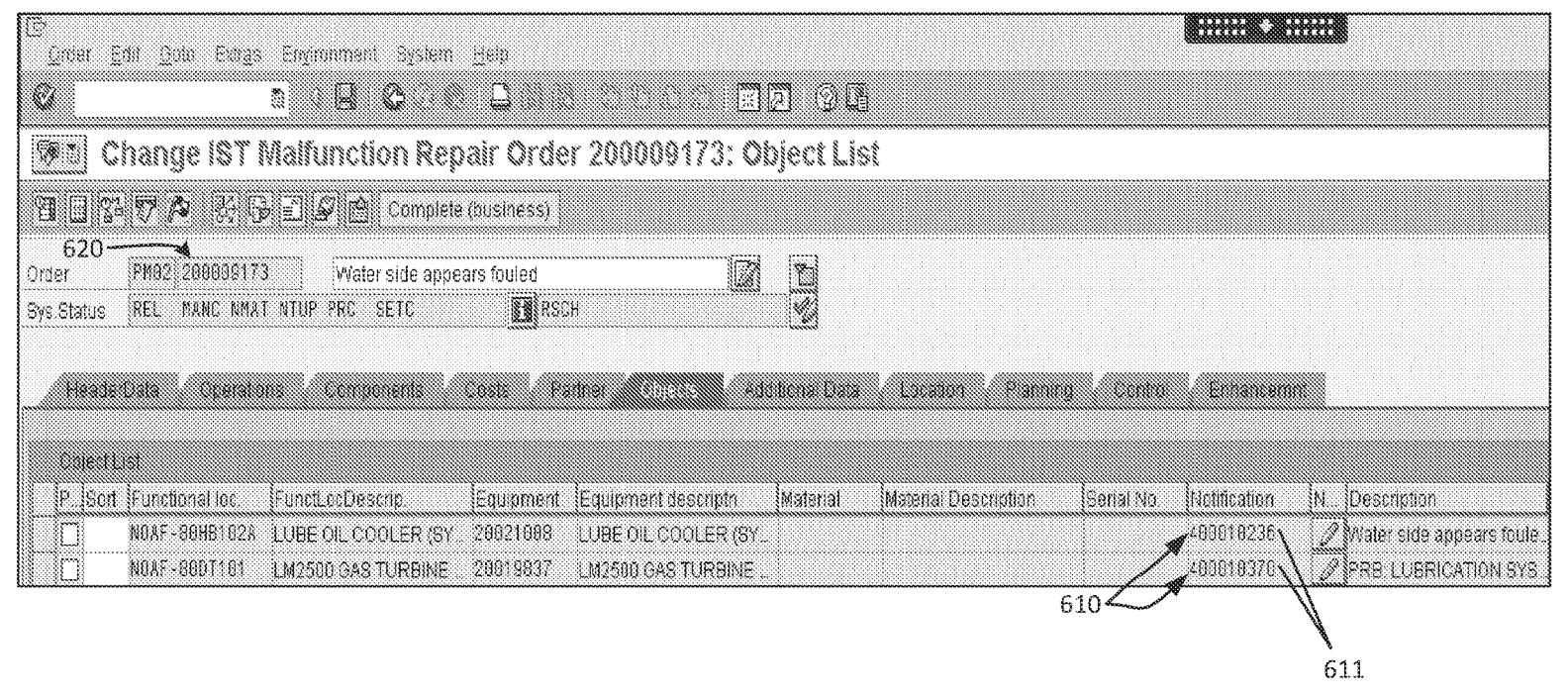
Figure 46:
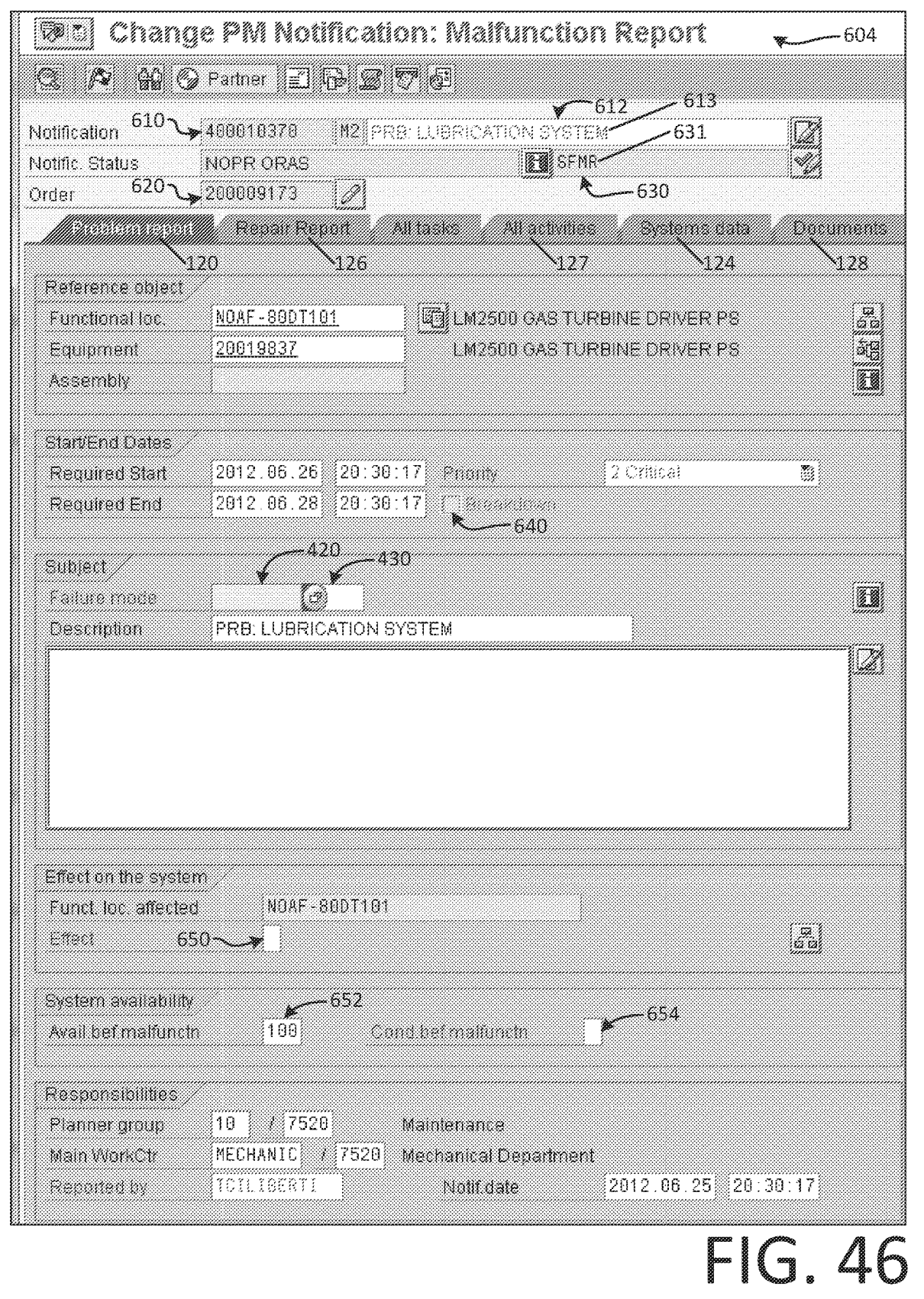
Figure 49:
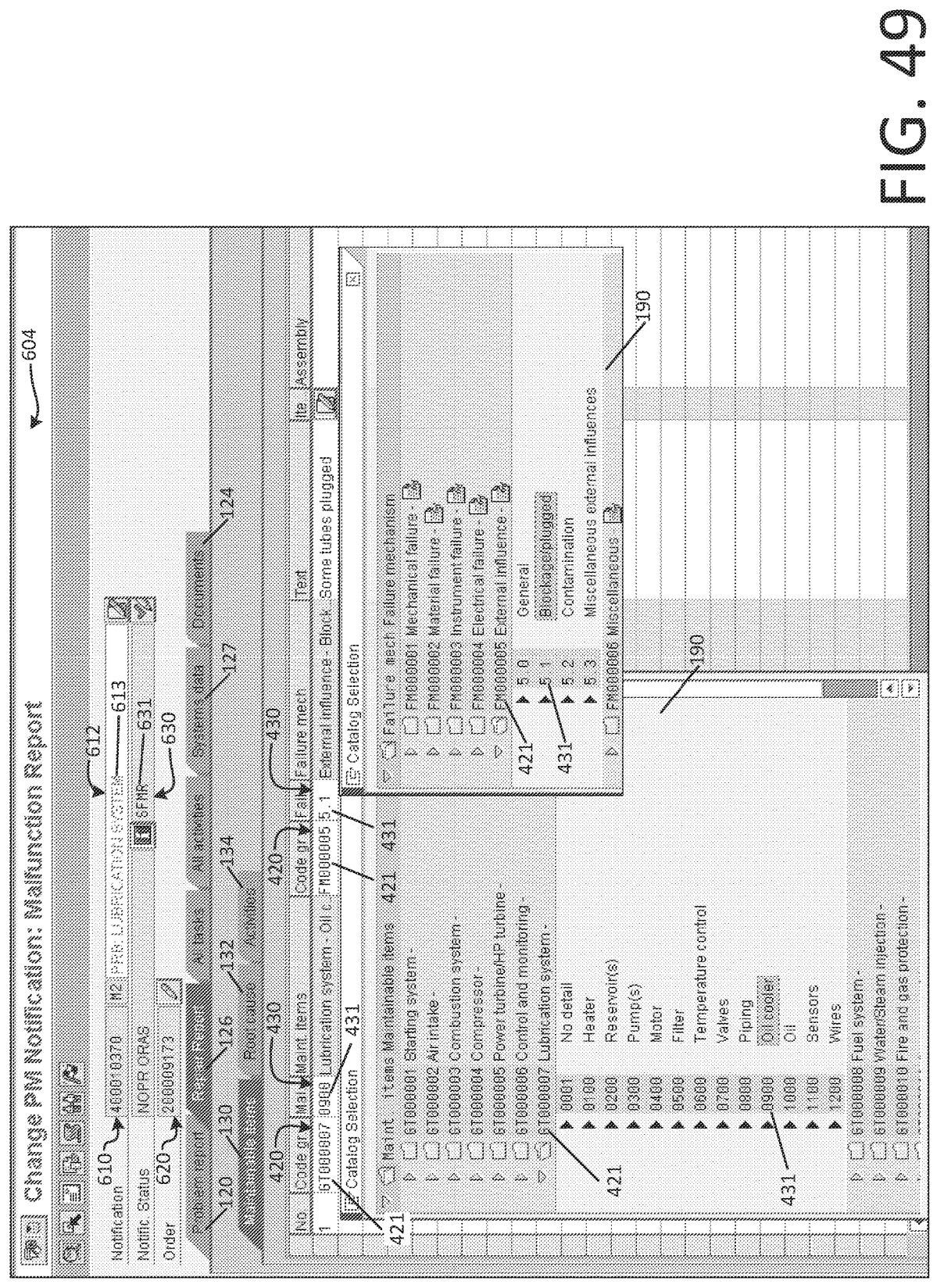

FIGS. 45-54 are exemplary GUI screen displays illustrating the completion of the FEL Malfunction Report 604. Again, relative to the failed component, the user selects items and values from drop down menus under the various screen tabs for various data fields, particularly Breakdown 640, "Failure Mode" Code Group 420, "Failure Mode" Code 430, Effect on system 650, Availability before Malfunction 652, and Condition before Malfunction 654.

Referring now back to Step 2100 of FIG. 41, if the failed item is not a component, equipment repairs are executed—Step 2110. Next, the Native Malfunction Report 602 is completed—Step 2200. As with the FEL Malfunction Report 604, the completion of the Native Malfunction Report 602 involves Failure Event Classification—Step 2170 and level 2 Failure Coding—Step 2180. FIGS. 54-57 are exemplary GUI screen displays illustrating the completion of the Native Malfunction Report 602. Again, relative to the failed component, the user selects items and values from drop down menus under the various screen tabs for various data fields, particularly Breakdown 640, "Failure Mode" Code Group 420, "Failure Mode" Code 430, Effect on system 650, Availability before Malfunction 652, and Condition before Malfunction 654.

Once the user has entered all the relevant data to complete the Native and FEL Malfunction Reports, a data structure is populated from the failure details in the FEL Malfunction Report—Step 2300. Once the failure event data has been entered into the ERP/EAM system 100, equipment failure metrics 3000 can be generated as desired.

System Programmatic Steps

FIG. 41 is an exemplary set of programmatic steps performed by ERP/EAM system 100 at Step 2120 of FIG. 41. ERP/EAM system 100 determines the parent FEL object 20 and subunit 22 for FCL—Step 2410. ERP/EAM system 100 creates an FEL Malfunction Report 604 for the FEL Object—Step 2420. ERP/EAM system 100 copies all relevant data from the Native Malfunction Notification 602 to the FEL Malfunction Report 604—Step 2430. ERP/EAM system 100 sets User Status 630 to "SFMR"—Step 2440. ERP/EAM system 100 specifies the Text Description 612 of FEL Malfunction Notification 604 as "PRB: <subunit text description>"—Step 2450. ERP/EAM system 100 specifies the failed subunit by using a generic Component Code value 431 "0001" within the Catalog Code Group 420—Step 2460 (See, FIG. 54). ERP/EAM system 100 saves the FEL Notification to ERP/EAM system 100—Step 2470 and links FEL Malfunction Notification 604 to the Native Malfunction Notification 602.

Reliability Metrics

Figure 58:
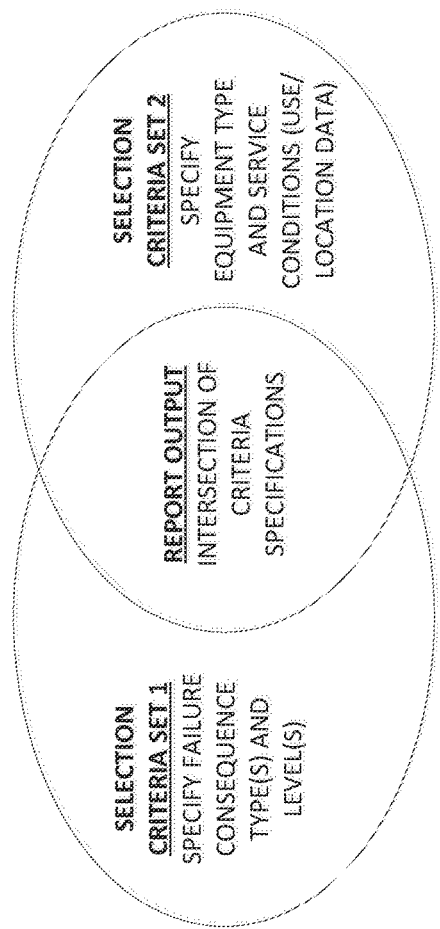
FIG. 58 is a simplified Venn diagram of example selection criteria for analytical reports from the ERP/EAM of FIG. 1.
Figure 59:
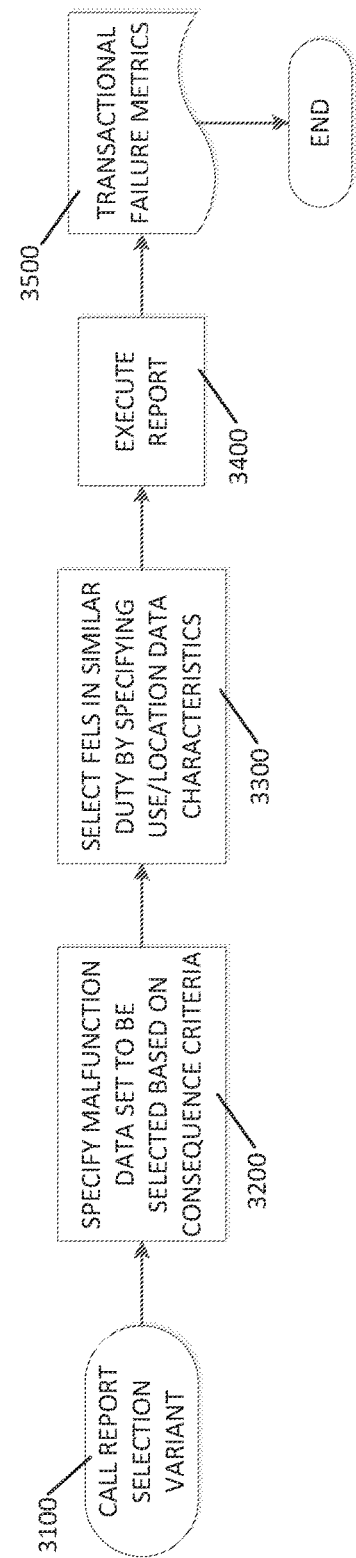
FIG. 59 is a flowchart of an exemplary set of steps for creating transactional failure metrics.
Figure 60:
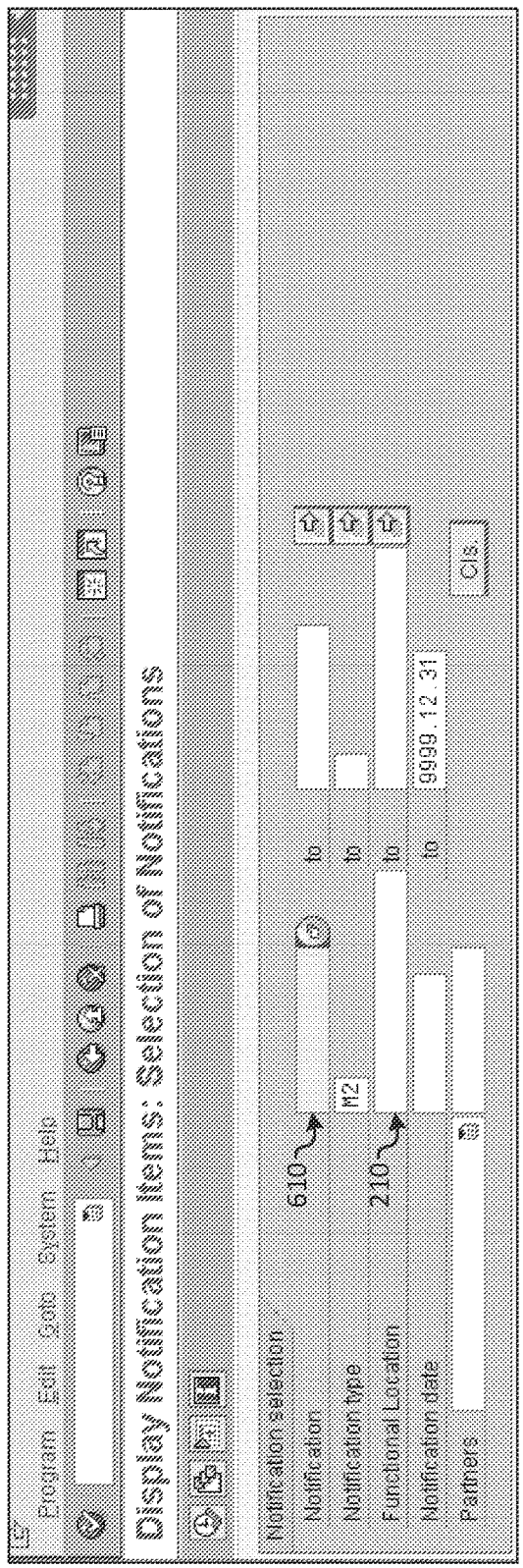
FIGS. 60-68 are exemplary GUI displays illustrating the generation of an analytical report.
Figure 61:
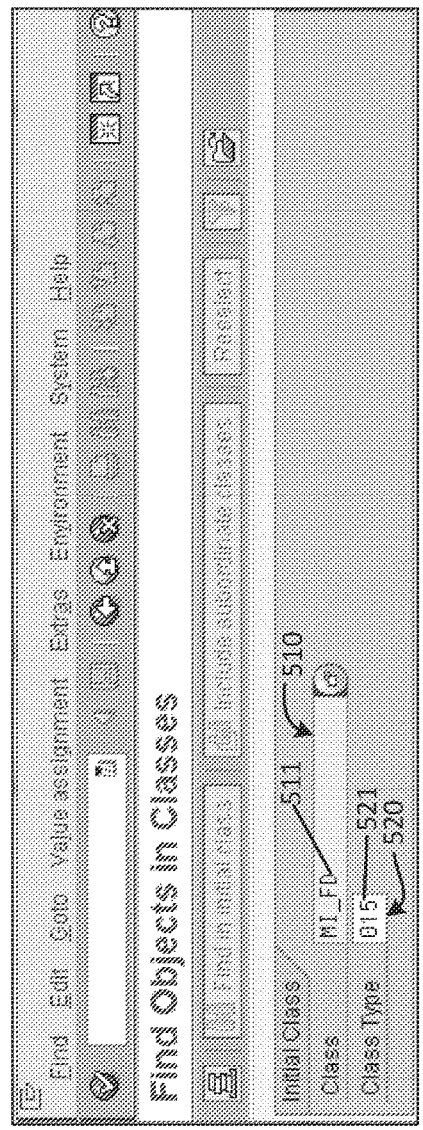
Figure 62:
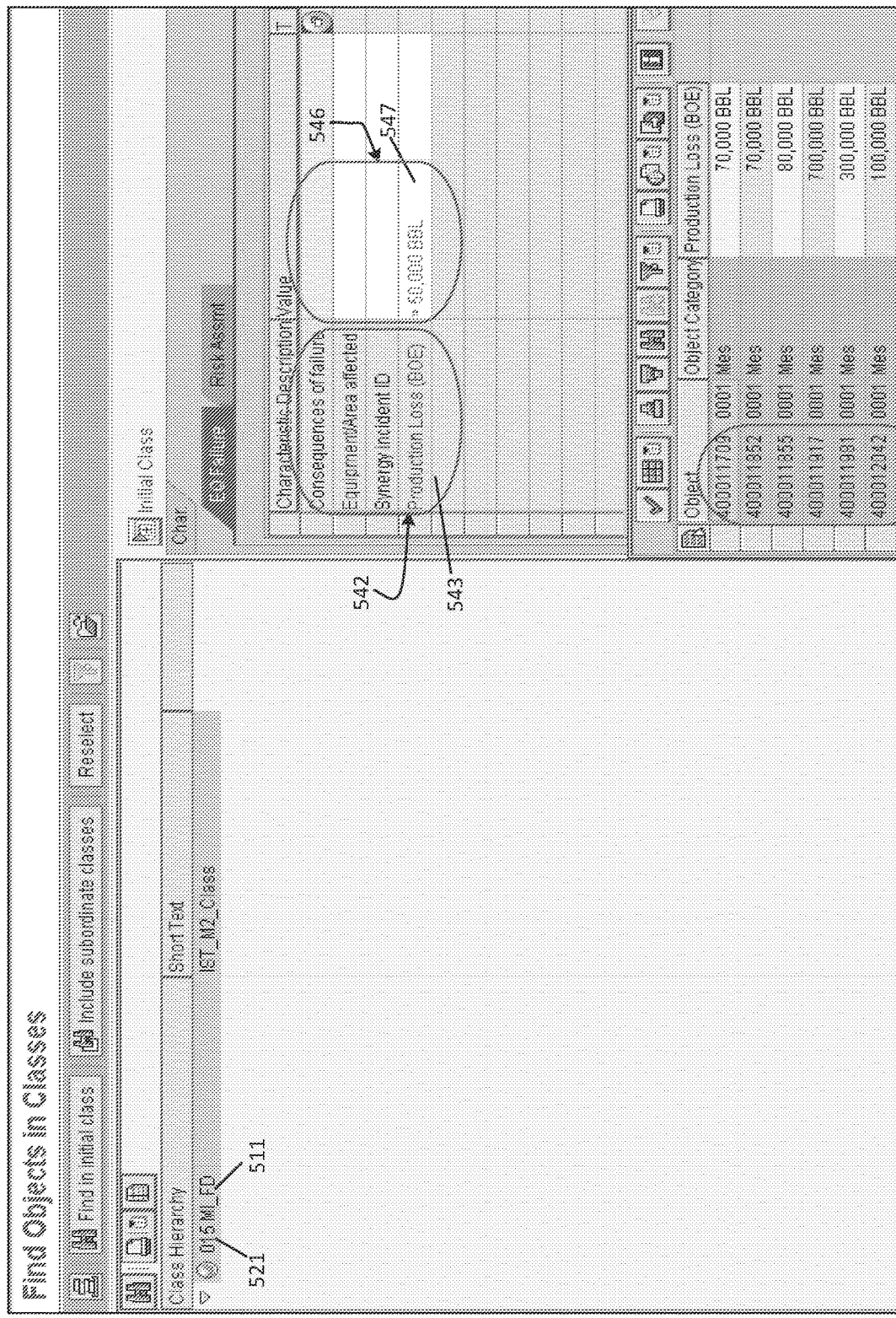
Figure 63:
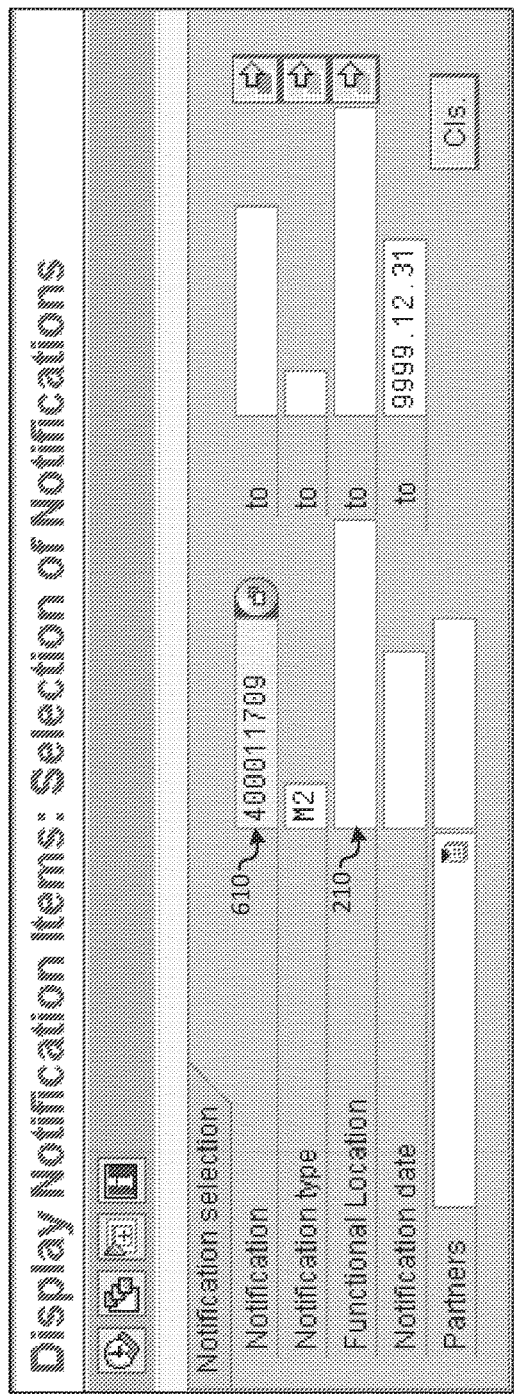

As shown in FIG. 58, ERP/EAM system 100 and the Equipment Taxonomy 110 provides and enables analytical reporting that can be derived from multiple sets of selection criteria, including but not limited to, failure consequence type(s) or Level(s) and equipment type or service conditions (use/location data). FIG. 59 is an exemplary set of steps used to generate an analytical report within ERP/EAM system 100. FIGS. 60-67 are exemplary GUI screen displays illustrating the generation of an analytical report. First, a report selection variant is called from within ERP/EAM system 100—Step 3100. FIG. 60 illustrates the selection screen ("Selection of Notifications") from which Analytical reports are called. Next, the user specifies the Malfunction data set to be selected based on the consequence criteria—Step 3200. From the "Selection of Notifications" screen in FIG. 60, the user selects the Notification multiple selection pushbutton and then selects search mode "Find Objects in Class," which returns an initial search screen shown in FIG. 61. The user inputs a Class Identification value 511 of "MI_FD" from a drop down menu (not shown) for Classification ID 510 and a Class Type value 521 of "015" for Class Type 520 as search criteria. On enter, as shown in FIG. 60, the ERP/EAM system 100 displays a set of Characteristic Descriptions 543 for Characteristic set 542 and allows the user to select/input Characteristic Values 547 into Characteristic Value Fields 546. On selection of the "Find in initial class" pushbutton shown in FIG. 61, the system returns a set of Notification IDs 611. The user may select one or more Notification values 611 from the table list and return them into the "Selection of Notifications" selection screen.

Figure 64:
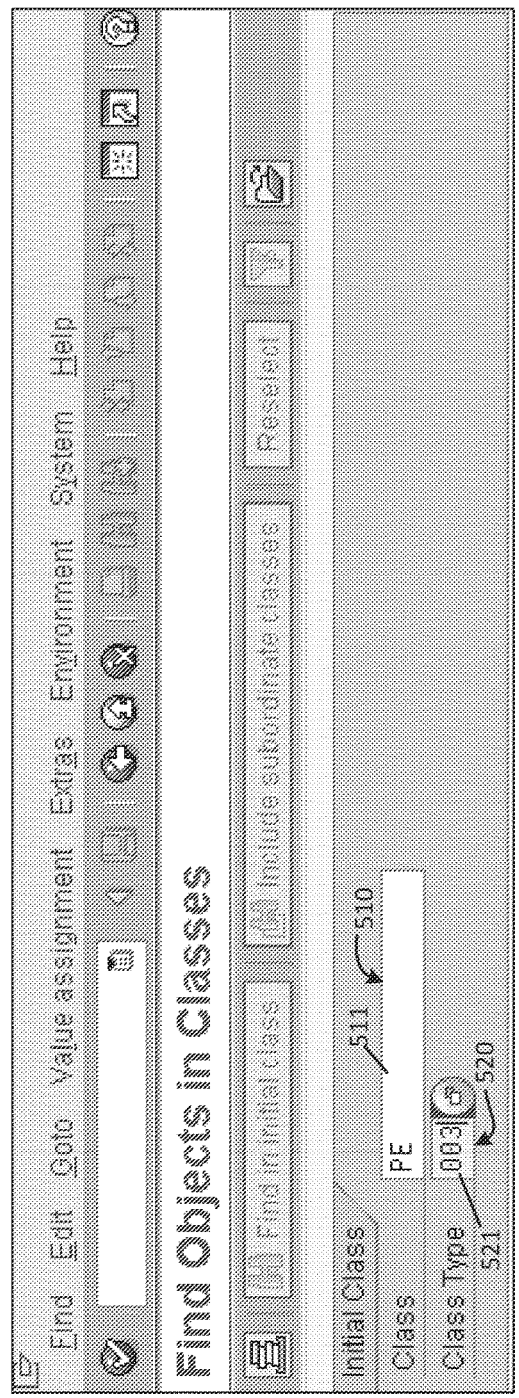
Figure 65:
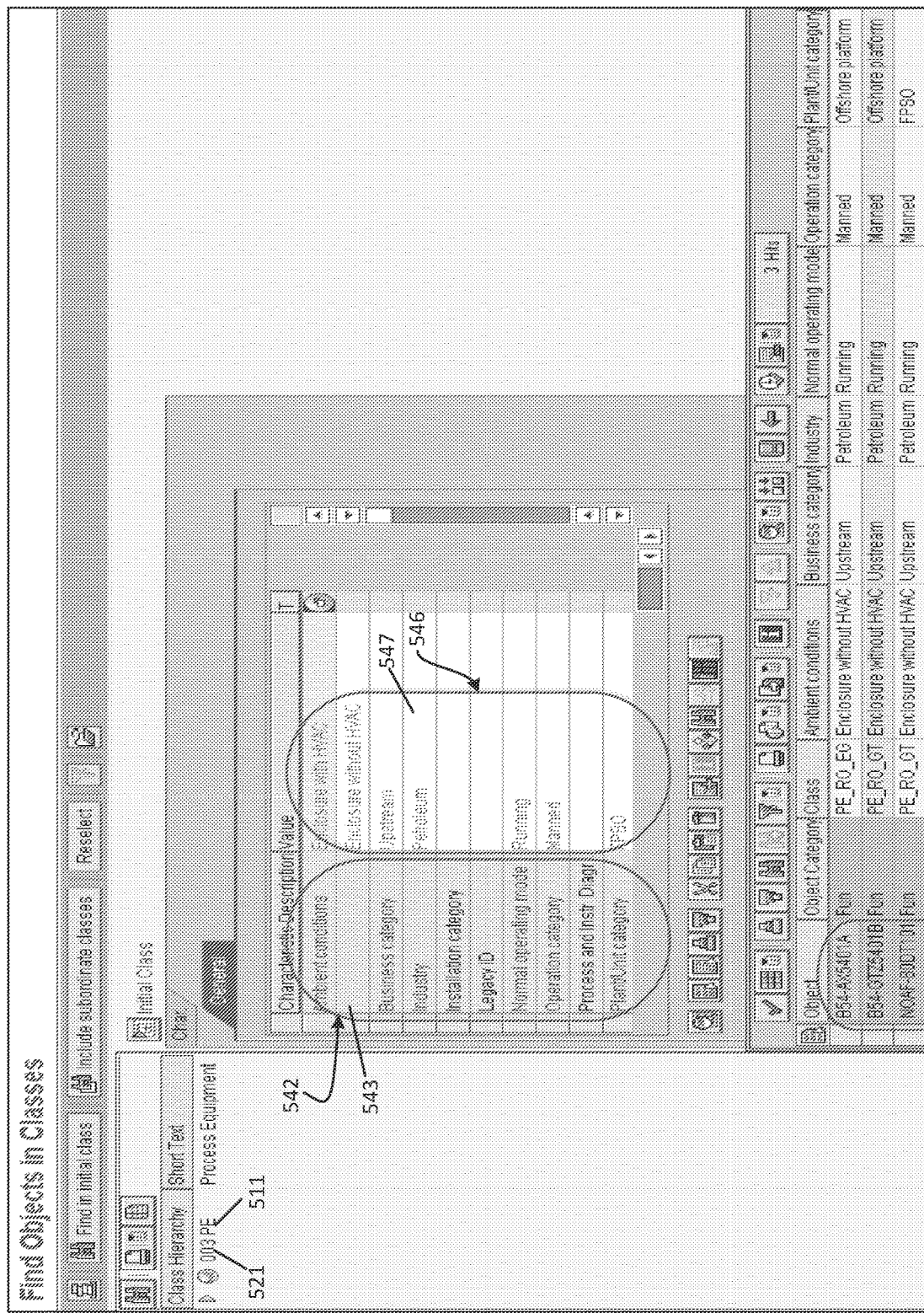
Figures 66, 67:
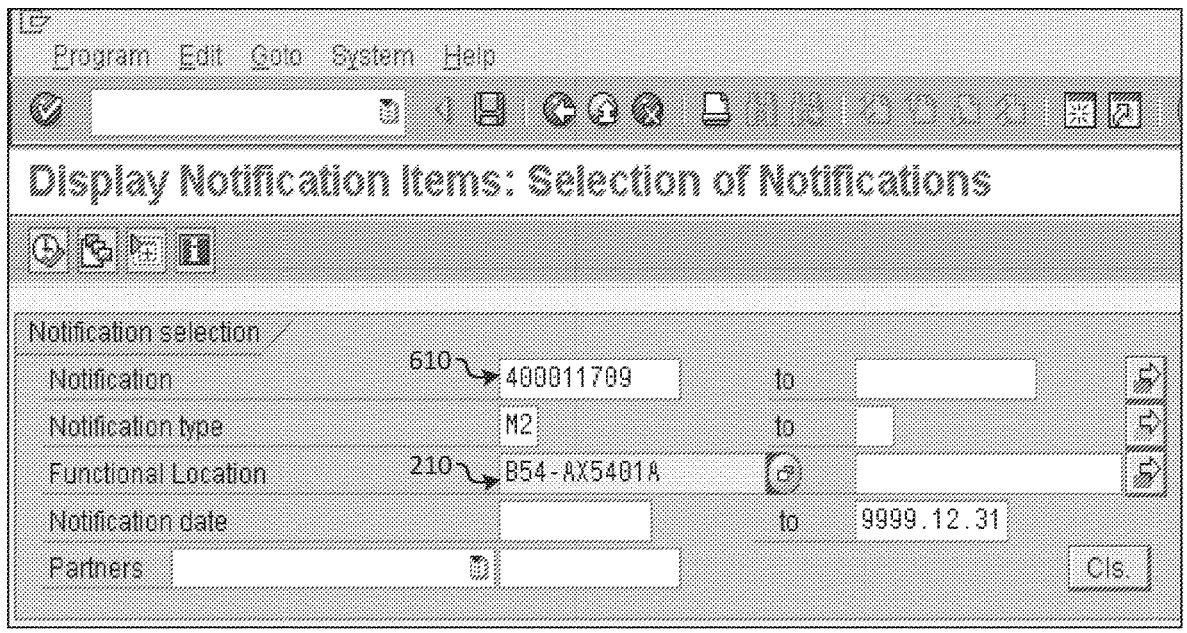
Figure 68:
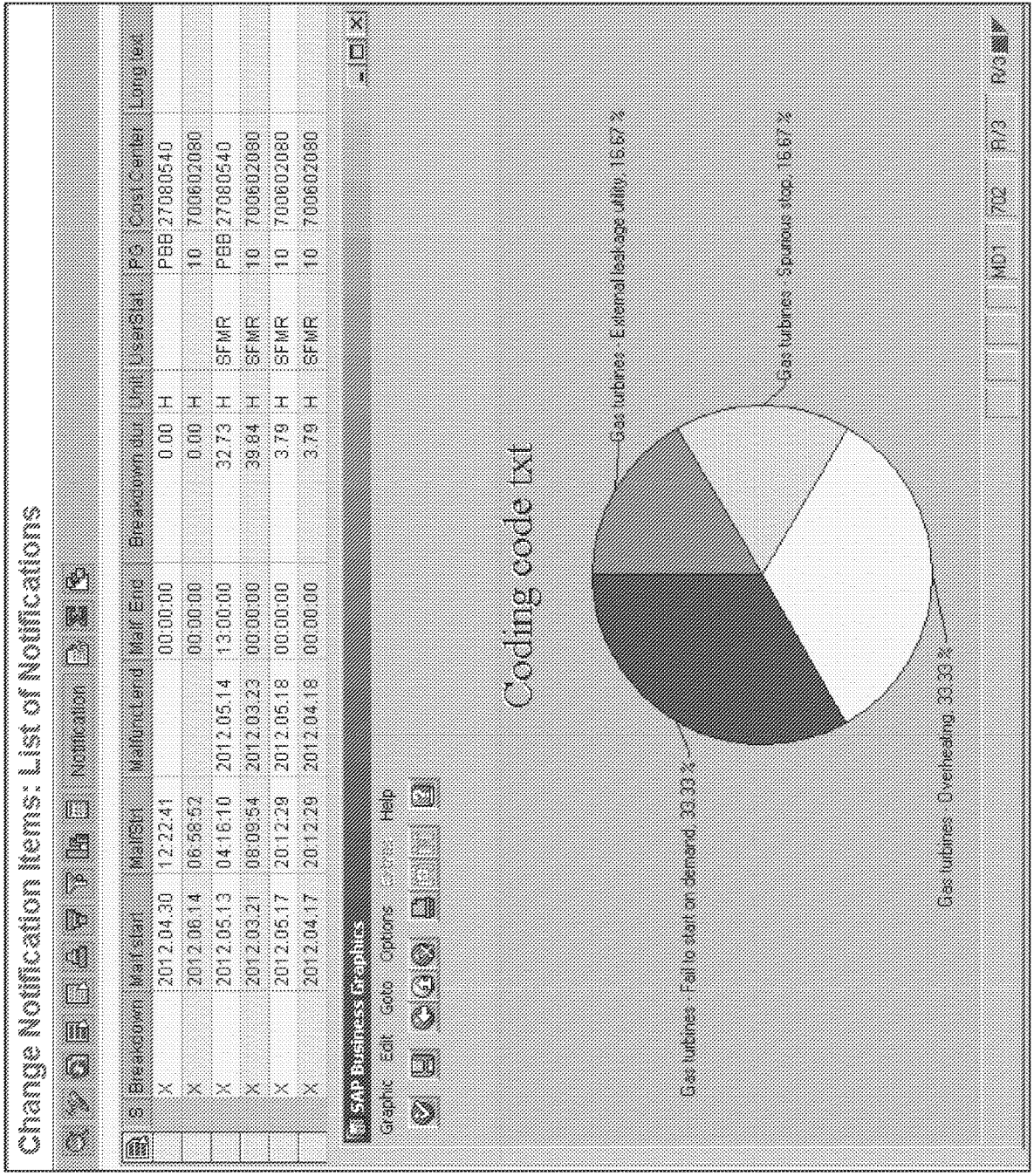

Referring to FIG. 59, the user next specifies Functional Equipment Locations in similar duty by specifying use/location data characteristics—Step 3300. From the ("Selection of Notifications") screen in FIG. 62, the user selects the Function Location multiple selections pushbutton and then selects search mode "Find Objects in Class," which returns an initial search screen shown in FIG. 63. The user inputs a Class Identification value 511 of "PE" from a drop down menu (not shown) for Classification ID 510 and a Class Type value 521 of "015" for Class Type 520 as search criteria. On entering, as shown in FIG. 64, the system displays a set of Characteristic Descriptions 543 for Characteristics set 542 and allows the user to select/input Characteristic Values 547 into Characteristic Value Fields 546. On selection of the "Find in subordinate classes" pushbutton shown in FIG. 64, the system returns a set of Functional Locations IDs 211. The user may select one or more Functional Location values 211 from the table list and return them into the "Selection of Notifications" selection screen. The result is shown in FIG. 65. Finally, the analytical report is executed—Step 3400, which generates the transactional failure metrics. FIG. 66 shows the returned transactional list report and FIG. 67 shows the results of one of many possible graphs generated from the Transactional list report.

Data Validity

Figure 69:
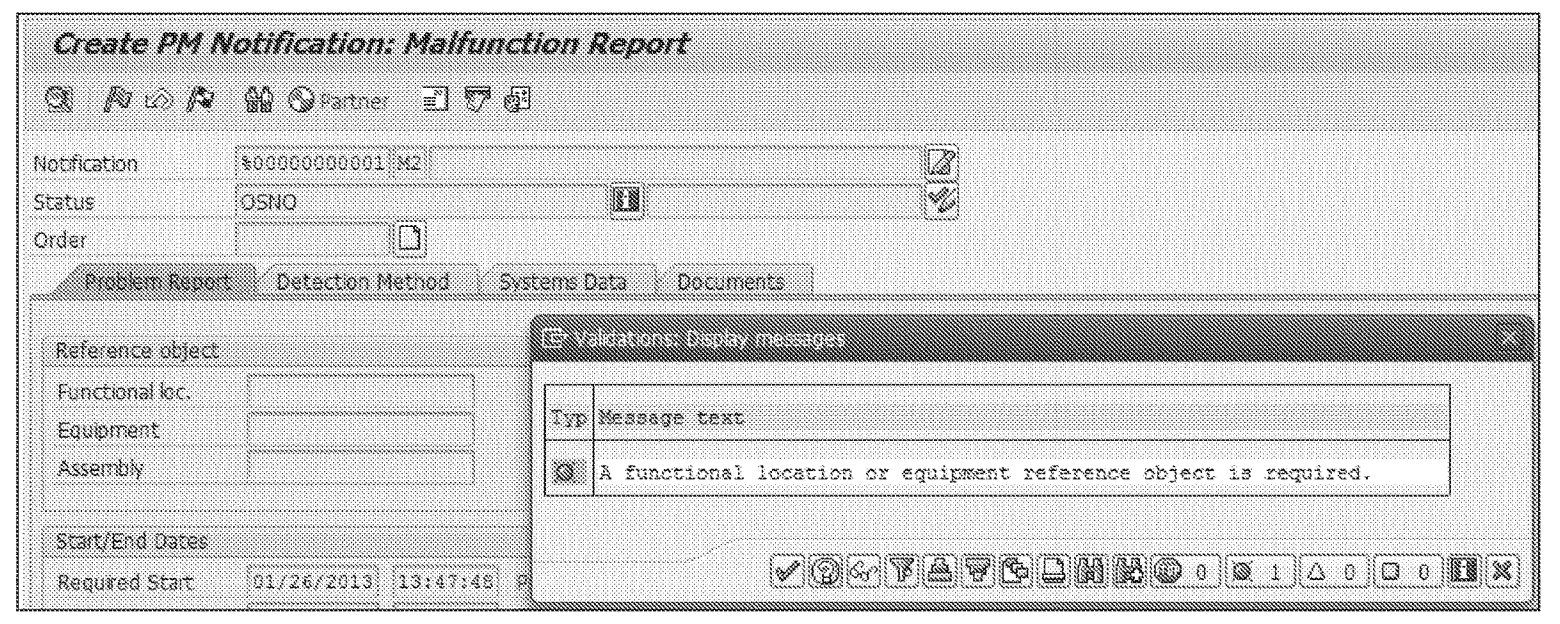
Figure 70:
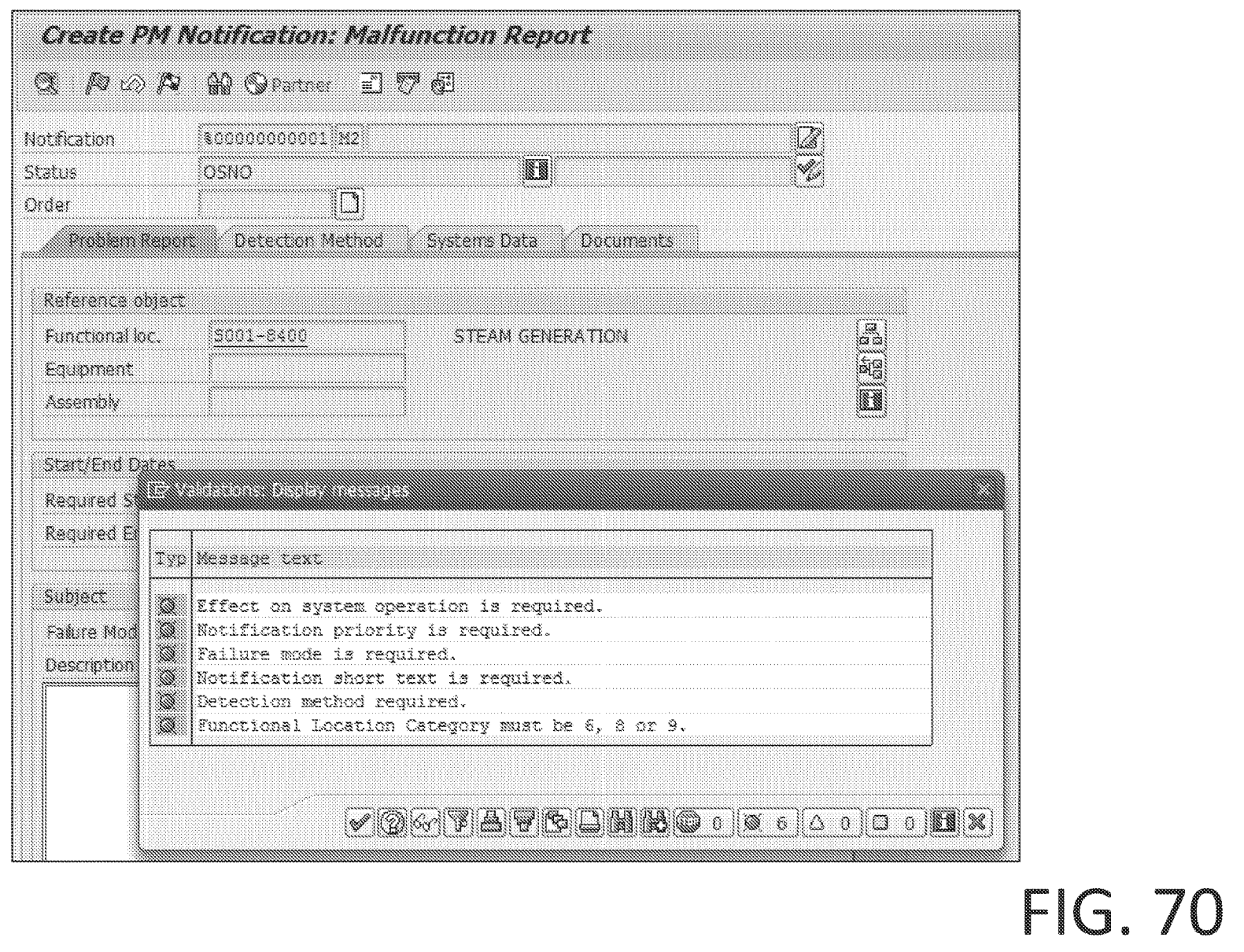
Figure 71:
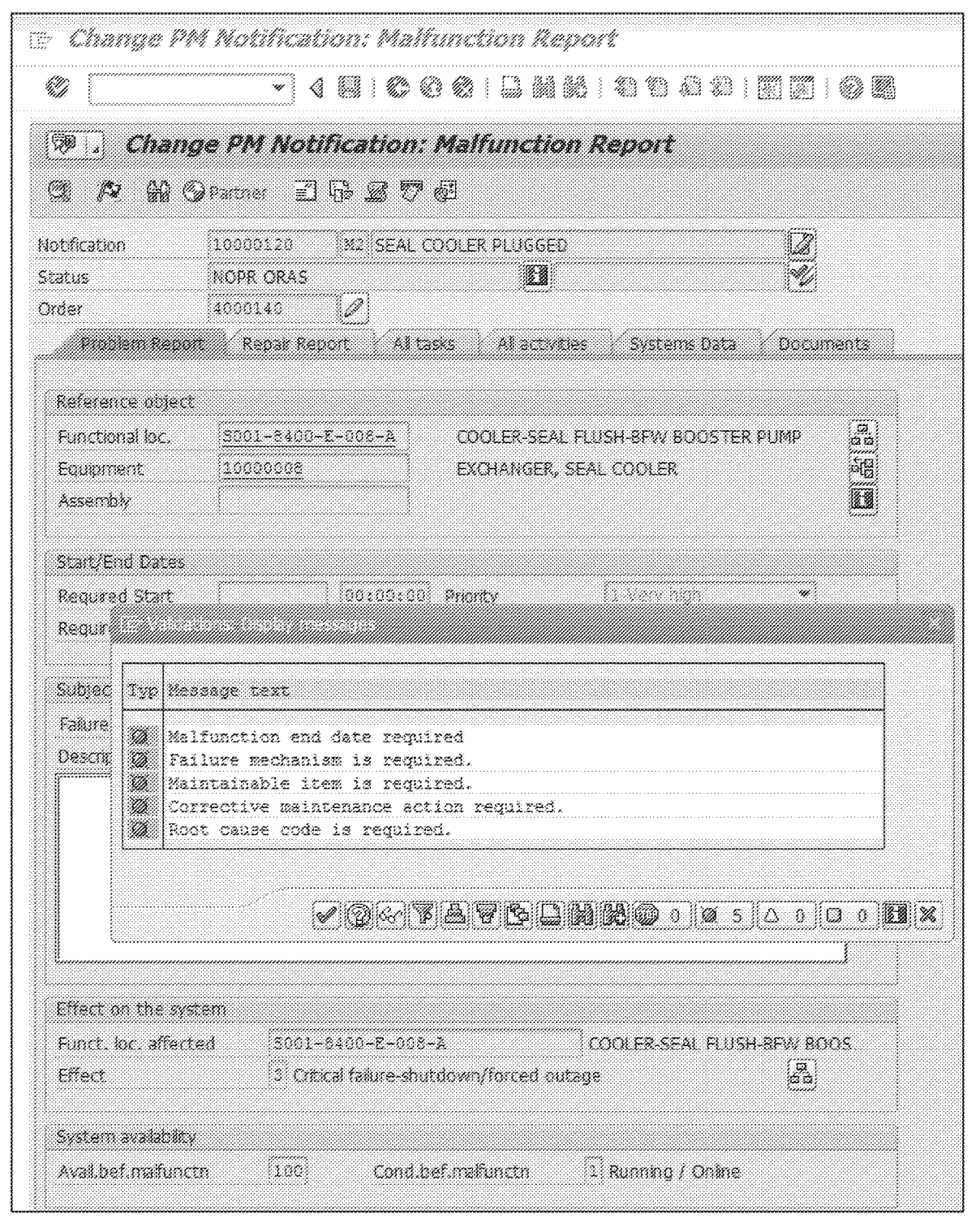
Figure 72:
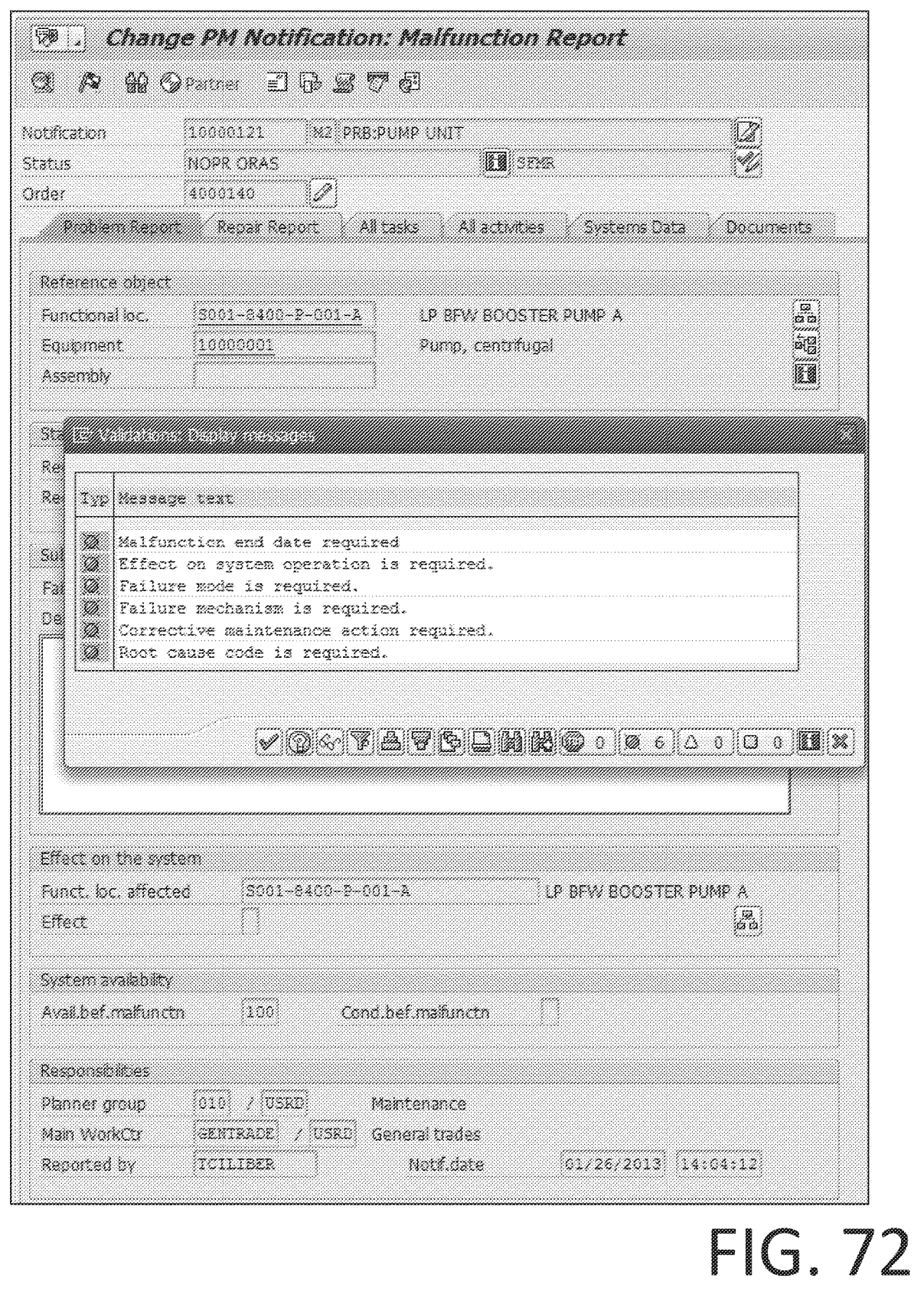
Figure 73:
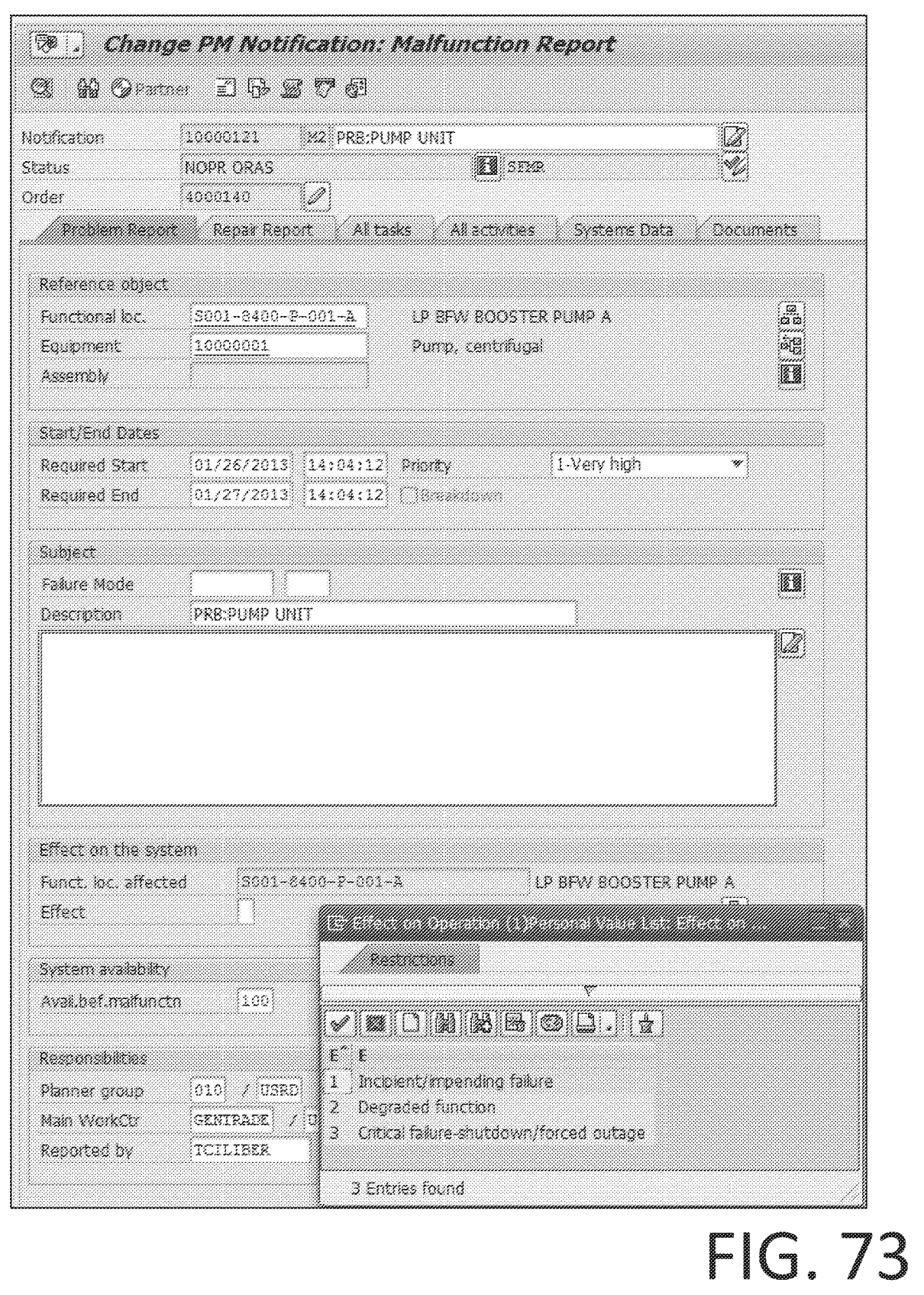
Figure 74:
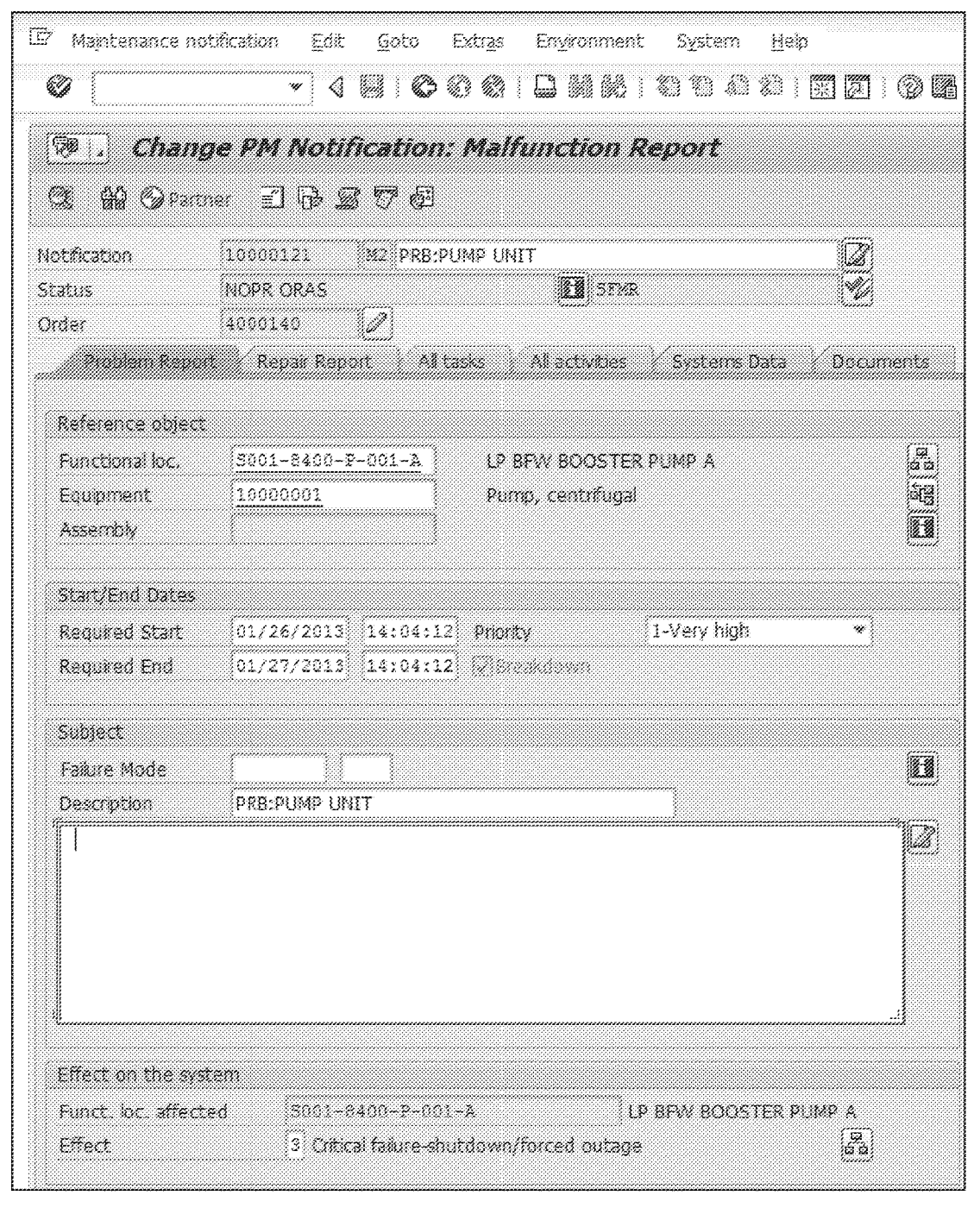

ERP/EAM system 100 also provides data validity checks for Malfunction Reports to ensure they are completed properly by users. FIGS. 69-74 show examples of error messages generated by the ERP/EAM system 100 as the result of data issues. The error message examples shown and described herein are not intended to be an exhaustive listing of such error messages or the other data validity features of the ERP/EAM system 100. FIG. 69 shows an exemplary error message that the ERP/EAM system 100 generates if the user fails to input a value for Functional Location ID 210 within the "Create PM Notification: Malfunction Report" entry screen. FIG. 70 shows possible exemplary error messages that the ERP/EAM system 100 generates on completion of a Native Malfunction Report 602. FIG. 71 shows possible exemplary warning messages that the ERP/EAM system 100 generates on completion of an FEL Malfunction Report. FIGS. 73 and 74 shows that ERP/EAM system 100 automatically sets the Breakdown Indicator 640 when the user inputs a Effect on Operation value 651 is "3—Critical failure-shutdown/forced outage."

Advantages

One skilled in the art will note several advantages provided by the ERP/EAM system and Equipment Taxonomy of this invention. The ERP/EAM system of this invention provides an information solution for managing enterprise equipment assets within the operations and maintenance life-cycle phase of capital facilities. The ERP/EAM system provides a comprehensive equipment taxonomy that logically represents equipment assets across an enterprise and serves as an enterprise-wide data infrastructure for standard equipment failure data collection, merging, and assessment processes. The ERP/EAM system greatly improves quality and accessibility of equipment reliability data with standard data collection processes and by structuring data in a relational format. Integrated and comprehensive data structures enable fast and comprehensive analyses. Whereas non-relational failure data (typical of traditional solutions) must be analyzed one record at a time, the ERP/EAM system of this invention can simultaneously query thousands of failure event records.

The ERP/EAM system aids companies in maximizing production throughput and minimizing hazards through integrated equipment reliability data. With ERP/EAM, companies can quickly identify and address bad actor and pattern equipment failures that affect production or cause hazards. Whereas traditional solutions account for only actual equipment repair costs, ERP/EAM gives companies the tools to account for all consequences related to each equipment failure: production loss, health, safety, and environmental incidents, and repair costs. The ERP/EAM system also allows companies to account for potential "near-miss" consequences.

The equipment taxonomy of this invention maps materialized physical objects to functional physical objects within a hierarchy of functional locations within the enterprise for all enterprise assets in accordance with applicable industry standards, particularly as defined in ISO 15926-2: FIGS. E.9 and E.10. The equipment taxonomy also provides standardized coding under applicable industry standards, such as ISO 14224 Annexes A and B by using catalog profiles to define equipment boundaries and by specifying codes to equipment class in accordance with such standards. The equipment taxonomy provides a logical and systematic process for representing P&ID tag numbers within the ERP/EAM system and an infrastructure for standardized equipment failure data collection, merging and assessment.

The ERP/EAM system make advanced reliability metrics available with standard ERP reporting. This is done by structuring equipment in such a manner that the ERP system can interpret complex interrelationships between different equipment objects and between equipment and components. In addition, the ERP/EAM system defines a standard reporting level for equipment with equipment taxonomy and differentiation between component level and equipment level failure details within the failure reporting process. These methods are consistent with the methodology promulated by ISO 14424:2006 and ISO 15926-2:2003. The ERP/EAM system also facilitates the classification of individual failure events by consequence of failure, lost production, affected equipment/units and other criteria as defined by the user. Equipment selection by use/location data can be searched by Equipment Classification. The selection scope can range from one populations of equipment across an enterprise. Failure data for selected objects can be analyzed in a variety of ways using the full suite of standard ERP reports.

It should be apparent from the foregoing that an invention having significant advantages has been provided. While the invention is shown in only a few of its forms, it is not just limited but is susceptible to various changes and modifications without departing from the spirit thereof. The embodiment of the present invention herein described and illustrated is not intended to be exhaustive or to limit the invention to the precise form disclosed. It is presented to explain the invention so that others skilled in the art might utilize its teachings. The embodiment of the present invention may be modified within the scope of the following claims.

I claim:

1. In an enterprise asset management system for presenting and managing a plurality of technical objects including functional location objects and equipment objects of an enterprise, where each of the functional location objects has a hierarchical relationship within the enterprise and a level of hierarchical structure in accordance and consistent with a defined uniform standard for hierarchically structuring functional location objects and where the functional location objects include functional equipment location (FEL) objects that represent equipment functions, functional area location (FAL) objects used for grouping the technical objects and functional component location (FCL) objects that represent component functions, a method within the system for constructing, populating and displaying information related to the technical objects in a functional location hierarchy that defines equipment boundaries, and defines equipment interrelationships between the functional location objects, such that the functional equipment location (FEL) objects and the functional component location (FCL) objects are subordinate to at least one of the functional area location (FAL) objects, the method comprising the following steps:

creating sequential structural levels for technical objects arranged in a hierarchy;

identifying user defined equipment boundaries including the functional location objects consistent with industry conventions, where each of the defined equipment boundaries has exactly one top-level functional equipment location (FEL) object and has any number of subordinate functional location objects, where each of the defined equipment boundaries contains any number of functional area location (FAL) objects, each of which defines any number of subunits, and all of which are subordinate to the top-level functional equipment (FEL) object with at least one functional component location (FCL) object included in the subunit, and where each of the defined equipment boundary is independent of others of the defined equipment boundaries;

assigning within the enterprise asset management system for each technical object a unique record identifier within a data structure of the system;

mapping within the enterprise asset management system the unique record identifier of each technical object to one of the structure levels;

defining within the enterprise asset management system a set of category values representing a taxonomic classification for each of the functional location objects, the set of category values include a set of FAL values, a FEL value, and a FCL value, where the set of FAL values specifies the taxonomic classification of the functional area location (FAL) objects, the FEL value specifies the taxonomic classification of the functional equipment location (FEL) objects, and the FCL value specifies the taxonomic classification of the functional component location (FCL) objects;

identifying each of the functional location technical objects as one of the functional area location (FAL) objects, the equipment location (FEL) objects, and the functional component location (FCL) objects;

identifying for each of the functional location objects another functional location object directly superordinate to that functional location object;

mapping within the enterprise asset management system the unique record identifier of each functional location object to one value selected from the set of category values where each category value is unconstrained by and independent of the structural level mapped to the unique record identifier of that functional location object, so that the category value mapped to the record identifier of each functional location object within each of the defined equipment boundaries identifies that functional location object as one of the top-level functional equipment location (FEL) object, one of the functional area location (FAL) objects, the functional component location (FCL) objects of one of the defined equipment boundaries; and displaying within the enterprise asset management system the unique record identifier for each technical object along with the one structural level of each technical object in a first visual branching hierarchical representation and the category value of each technical object in a second visual non-sequential representation within the first visual branching hierarchical representation, such that all interrelationships between functional objects, including equipment boundaries are entirely displayed graphically within the enterprise asset management system.

2. The method of claim 1 wherein the set of category values are alpha-numeric values.

3. The method of claim 1 and the following additional steps:

defining equipment categories for each of the functional equipment location (FEL) objects;

defining equipment classes within each equipment category;

defining class types within each equipment class;

defining subunits within each equipment class;

defining maintainable items within each subunit;

defining failure modes for each equipment class;

defining characteristics for each equipment class;

assigning a catalog profile to each equipment class and class type for each of the functional equipment location (FEL) objects; and mapping one of the catalog profiles to the unique record identifier of each of the functional equipment location (FEL) objects.

4. The method of claim 3 and the following additional steps:

identifying a malfunctioning technical object, where the malfunctioning technical objects has one of the unique record identifiers;

initiating a native malfunction report for the malfunctioning technical object;

selecting the unique record identifier of the malfunctioning technical object within the native malfunction report;

generating a malfunction report from the native malfunction report for the unique record identifier of the malfunctioning technical object;

mapping the catalog profile for the unique record identifier of the malfunctioning technical object into the native malfunction report; and selecting a specific failure mode from the catalog profile mapped to the unique record identifier of the malfunctioning technical object within the native malfunction report.

5. The method of claim 4 and the following additional step:

generating an FEL malfunction report for the one top-level functional equipment location (FEL) object when the malfunctioning technical object specified in the native malfunction report is within the defined equipment boundary of the malfunctioning technical object.

6. The method of claim 5 and the following additional steps:

determining the unique record identifier of the one top-level functional equipment location (FEL) object within the defined equipment boundary of the malfunctioning technical object, specifying the unique record identifier for the malfunctioning technical object within the FEL malfunction report;

mapping of the catalog profile for the unique record identifier for the malfunctioning technical object into the FEL malfunction report; and specifying a specific failure mode from the catalog profile mapped to the unique record identifier of the malfunctioning technical object within the FEL malfunction report.

7. The method of claim 5 wherein initiating an FEL malfunction report for the malfunctioning technical object includes inputting relevant failure data from the native malfunction report.

8. The method of claim 6 and the step of aggregating all failure data within the defined equipment boundaries to the one top-level functional equipment location (FEL) object.

9. The method of claim 6 where the native malfunction report and the FEL malfunction report are represented hierarchically within the enterprise asset management system, with the native malfunction report for the malfunctioning technical object being mapped superordinate to the FEL malfunction report for the one top-level functional equipment location (FEL) object within the defined equipment boundary of the malfunctioning technical object.

* * * * *